(12) United States Patent
Lawrence et al.

(10) Patent No.: US 7,962,917 B2
(45) Date of Patent: Jun. 14, 2011

(54) SYSTEM DATA INTERFACES, RELATED ARCHITECTURES, PRINT SYSTEM DATA INTERFACES AND RELATED PRINT SYSTEM ARCHITECTURES

(75) Inventors: Mark A. Lawrence, Kirkland, WA (US); Adrian F. Maxa, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1246 days.

(21) Appl. No.: 11/077,514

(22) Filed: Mar. 10, 2005

(65) Prior Publication Data
US 2006/0206903 A1 Sep. 14, 2006

(51) Int. Cl.
*G06F 13/10* (2006.01)
(52) U.S. Cl. ........ 719/313; 719/316; 709/223; 358/1.15
(58) Field of Classification Search .................... 719/313
See application file for complete search history.

(56) References Cited

U.S. PATENT DOCUMENTS

| | | | |
|---|---|---|---|
| 6,901,596 B1* | 5/2005 | Galloway ...................... 719/330 |
| 7,178,150 B1* | 2/2007 | Ahmad et al. ................ 719/313 |
| 7,206,807 B2* | 4/2007 | Cheenath ...................... 709/203 |
| 7,206,843 B1* | 4/2007 | Allavarpu et al. ............ 709/226 |
| 7,324,220 B1* | 1/2008 | Cheatham et al. ........... 358/1.13 |
| 7,468,802 B1* | 12/2008 | Johnson et al. .............. 358/1.15 |
| 2003/0053129 A1* | 3/2003 | Morooka et al. ............. 358/1.15 |
| 2004/0070779 A1* | 4/2004 | Ferlitsch ....................... 358/1.13 |
| 2004/0194087 A1* | 9/2004 | Brock et al. .................. 718/100 |
| 2005/0038886 A1* | 2/2005 | Garg ............................. 709/224 |
| 2005/0179936 A1* | 8/2005 | Sedky et al. ................. 358/1.15 |

FOREIGN PATENT DOCUMENTS

WO W09802809 1/1998

OTHER PUBLICATIONS

Ananda, et al., "A Survey of Asynchronous Remote Procedure Calls", Operating Systems Review, vol. 26, No. 2, Apr. 1992, pp. 92-109.
Ananda, et al., "ASTRA—An Asynchronous Remote Procedure Call Facility", IEEE, 1991, pp. 172-179.
European Search Report for Application No. EP06000310, dated Oct 24, 2007, 6 pgs.

* cited by examiner

*Primary Examiner* — Andy Ho
*Assistant Examiner* — Syed Roni
(74) *Attorney, Agent, or Firm* — Lee & Hayes, PLLC

(57) ABSTRACT

A system data interface and related architectures are described. Various embodiments can provide one or more of the following capabilities: a generic data model, asynchronous client and server dispatch, cancellation, batching, transactional invocation, parallel invocation, interception or reflection. In one embodiment, the system data interface is employed in the context of a print system.

10 Claims, 17 Drawing Sheets

SYSTEM DATA INTERFACES, RELATED ARCHITECTURES, PRINT SYSTEM DATA INTERFACES AND RELATED PRINT SYSTEM ARCHITECTURES

TECHNICAL FIELD

This invention pertains to system data interfaces and related architectures and, in particular embodiments, to print system data interfaces and related architectures.

BACKGROUND

Some systems can include servers that process data and communicate with various types of clients. One particular type of system is a print system which can include print servers that provide access to job, device, logical server and forms data from various clients. Many current systems, such as print systems, have an inflexible underlying network interface that must be modified whenever new classes of data need to be supported. In addition, some interfaces require much more communication than may be necessary and can create context on the server, both of which can limit server performance in whatever context in which the server is employed, such as print systems and others.

Other problems that plague many systems can lead to inflexibility, difficulty in extensibility and limitations insofar as being protocol specific.

Accordingly, this invention arose out of concerns associated with providing improved systems, including improved data interfaces and related architectures.

SUMMARY

A system data interface and related architectures are described. Various embodiments can provide one or more of the following capabilities: a generic data model, asynchronous client and server dispatch, cancellation, batching, transactional invocation, parallel invocation, interception or reflection.

In one embodiment, the system data interface is employed in the context of a print system.

DETAILED DESCRIPTION

Overview

Figure 1:
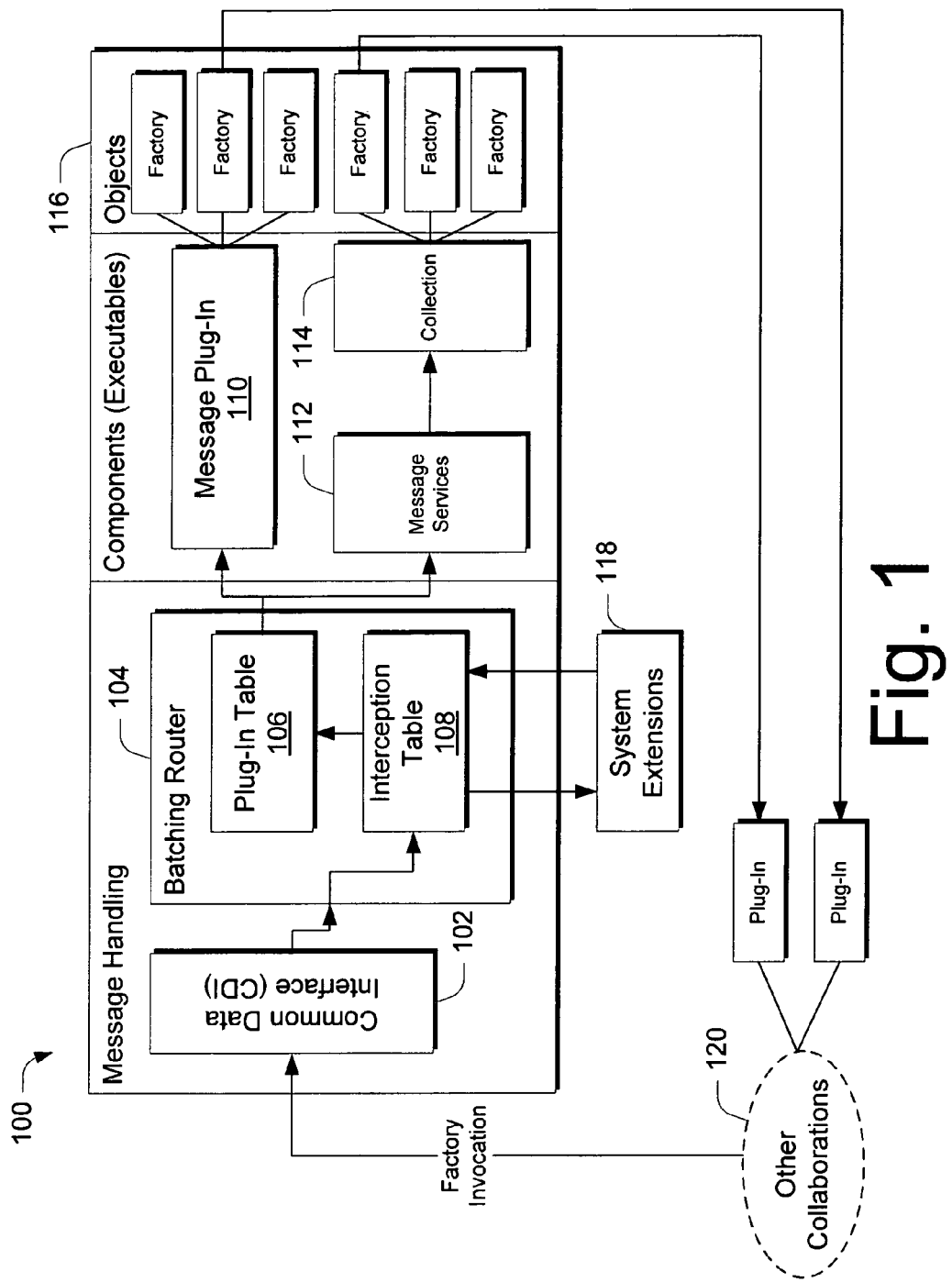
FIG. 1 is a high level block diagram that illustrates various components of a data interface in accordance with one embodiment.

In the discussion that follows, a novel system is provided that addresses many of the shortcomings of current systems. In one embodiment, the system, its data interfaces and related architectures are described in the context of a print system. It is to be appreciated and understood, however, that the inventive features described below can be employed in systems other than print systems, without departing from the spirit and scope of the claimed subject matter.

While the described print system does many things, fundamentally the described print system accomplishes a couple of primary tasks. First, the print system manages data including a set of objects and their properties. Second, the print system schedules print jobs first for rendering, and then sends the print jobs to the appropriate print device for printing. The process of rendering a document can be accomplished by retrieving configuration information from a data interface which specifies which components to invoke to process the job. Thus, the way the print system represents data can be fundamental to its operation.

To accomplish these primary tasks, the inventive print system utilizes a specific interface and related components. This interface and print systems of which it is a part can provide a number of advantages over current print systems. In the discussion that follows, various advantages are described to provide a preliminary appreciation of the print system and interface. Following this discussion, a section entitled "Exemplary Embodiment" discusses a specific implementation example of the print system and, in particular, the data interface.

The data interface described below supports the following capabilities, each of which is discussed and appears under its own heading: a generic data model, asynchronous client dispatch, asynchronous server dispatch, cancellation, batching, transactional invocation, parallel invocation, interception and reflection.

Generic Data Model

The described data interface supports and can be used in connection with what can be considered as a generic data model. The data model can support classes of objects with the following capabilities:

Properties—any object can have an arbitrary set of properties. The client can specify any set of properties to retrieve from any object. Only the properties the client is interested in will be retrieved.

Commands—any object can support a set of commands with an arbitrary set of parameters.

The wire format does not need to be modified in order to arbitrarily extend the class, commands and properties available from the server to the client.

Asynchronous Client Dispatch

Asynchronous client dispatch refers to the ability of the data interface application program interface (API) to allow a client or client application to begin a data request which immediately returns control to the client thread, as will be appreciated by the skilled artisan. When the result of the operation is complete, the client is informed via a call-back or a system event being signaled and it can the retrieve the result of the data. In the illustrated and described embodiment, this capability is not provided as a trivial wrapper that spins a thread which blocks synchronously and allows the client to proceed. Rather, the asynchronous dispatch is extended down to the device level. At a low level, the result of the call is interrupt driven by the network card. Utilizing this model simplifies designing client user interfaces that remain responsive while retrieving data from the server. It also reduces the number of threads required on a client. This is particularly advantageous when the client system is a print system acting as a bridge to another print system.

Asynchronous Server Dispatch

Coupled with the ability of a client to dispatch requests asynchronously to the server, the server can service requests asynchronously from the client. If an action that a client requests the server perform is IO bound (e.g., it needs to write data to a disk, or request data from another server), a plug-in component can issue another asynchronous call, return control to the server side data interface, and then complete the call when the IO completes. This mechanism can dramatically reduce the number of threads running on the server and can ensure that all threads are fully utilizing the system CPU.

Every thread executing on a system takes a large amount of "non-paged pool" from the system (non-paged pool is memory that cannot be written out to disk when physical memory become limited). Each thread running in the system that acquires system locks also creates a large amount of "contention" in the system (this is the amount of time and CPU resource required to switch between threads of execution). Thus, reducing the number of threads running in the system is an important mechanism to improve system performance.

Cancellation

In the embodiment described below, calls which are in progress on the server can be cancelled by the client at any time. This helps a client provide an interactive user interface to a caller.

Batching

Batching refers to a client's ability to use the data interface to build up an arbitrary sequence of actions and have the sequence of actions sent to the server as a unit. This sequence is then processed and returned to the client in a single transfer response. The actions can include any type of action such as getting and setting properties, querying for a set of properties, issuing commands against server objects, and registering for notifications about server object property changes.

Transactional Invocation

Transactional invocation refers to a batch being assigned the semantics that it must execute entirely, or not change the state of the server.

Parallel Invocation

Parallel invocation refers to a batch being assigned the semantics that all items in the batch must execute in parallel. This allows the server to execute long-running actions in parallel, and it also provides the semantics that the batch will execute all actions regardless of what other actions fail.

Interception

Since the operations and properties that the system can support are represented by pure data transfers, other components can be inserted in the system that can monitor, synchronously respond to and modify the behavior of the system—referred to as interception. This allows monitoring software to be plugged into and removed from the system. It also allows an independent hardware vendor (IHV) to extend system behavior. For example, if a queue is stopped, an associated service might also need to be stopped. The "stop" command on the queue can be intercepted by the IHV and they can then ensure that the service is stopped before allowing the stop operation to complete. The interception mechanism can also provide transactional semantics.

Reflection

Reflection refers to the system's provision of a mechanism to retrieve which properties are supported by a given class of object, as well as other information associated with the object. Information that can be retrieved using this mechanism can include, without limitation:

the type name, field name and data-type of each property;
a human-readable description of the properties usage;
commands supported by an object, and the input and output parameters supported by the command. Each command has a human-readable description of the command's usage. For each parameter, the following data can be retrieved: the name and type of the parameter and a human-readable description of the parameter.

In the illustrated and described embodiment, the reflection capabilities of the system are protocol agnostic. In addition, the reflection capabilities can be used to and from both native code and managed code implementations of server plug-ins. Further, the reflection capabilities provide the ability to perform reflection over a network interface, and do not require the implementation of the server-side objects to be present on the client.

These and other capabilities will become apparent from the description below.

Exemplary Embodiment

In the discussion that follows, a high level discussion of the inventive interface is provided in connection with FIG. 1. Following this discussion, an implementation example is provided and contains implementation-specific information. It is to be appreciated and understood that the implementation-specific example is provided as but one example of how one might implement a print system that includes the capabilities described above. As such, other implementations can be utilized without departing from the spirit and scope of the claimed subject matter. The other implementations may or may not be employed in the context of print systems, as noted above.

FIG. 1 shows a system generally at 100 that includes a common data interface 102, a batching router 104 that includes a plug-in table 106 and an interception table 108. System 100 also includes a message plug-in 110, message services 112, a collection 114, various objects 116, system extensions 118 and so-called "other collaborations" 120, each of which is discussed below.

Common Data Interface (CDI)

The Common Data Interface (CDI) is the interface to the batching router 104 and allows messages to be built up and dispatched to the batching router. The CDI is also responsible for sending responses to the client.

Batching Router

Batching router 104 receives messages that are packaged and passed into the system by the CDI 102. Each message can include a number of operations that can be destined to a number of plug-ins. These messages are dispatched asynchronously and the results are retrieved by the batching router 104 in turn. Messages are routed based on an unambiguous path that identifies which collection the message should be sent to. A single message from the client's perspective might have multiple destinations.

Plug-In Table

The plug-in table 106 keeps track of all of message handling plug-ins which are responsible for a given collection of objects. Each collection is identified by a Globally Unique Identifier (GUID). A path to the object is inspected and looked up in the plug in table before the messages are passed down to it.

Message Plug-In

Once the appropriate collection has been identified, the set of messages are passed to the message plug-in 110. The message plug-in 110 might simply send these messages out remotely over the wire to another machine. More typically, however, the message plug-in 110 will interpret the messages and respond appropriately. In the illustrated and described embodiment, third parties can provide message plug-ins. However, when they do so, the services provided by the message services are not available to them. This will make plugging in at this layer much more difficult. A primary advantage of being a message plug-in is that the form of the original message is made available. This can be useful for allowing the entire message to be relayed to a remote machine by a plug-in collection. This could, in addition, be an advantage for an independent hardware vendor if they also had a remote system that supported batching and they wanted to be able to translate between the received message format and their own message format.

Message Services

Since one of the main problems in a message based system is the difficulty in maintaining state over message calls, a component—the message services 112—is provided to break down messages and translate them into a simpler sequence of calls on a collection interface. By way of example and not limitation, in the illustrated and described embodiment, the message services can perform the following tasks:

Assign messages to threads;
Allow messages to be responded to in multiple, deferred calls;
Retrieve the appropriate data from the objects in the collection to populate the message;
Handle operation cancellation correctly;
Caching of object instances over time;
Transparent locking of objects; and
Reflection services for the objects maintained in the collections.

Collections

Collections 114 maintain a homogenous set of objects. The system will provide a collection that allows objects to persist themselves easily. One advantage of using collections is that it allows independent hardware vendors to easily extend the system with arbitrary objects. In the illustrated and described embodiment, a collection is implemented as a COM interface that is retrieved from a dynamic link library (DLL). The DLL is looked up in a Global Assembly Cache and a direct call is made to DllGetClassObject, which allows one to avoid COM registration, as will be appreciated by the skilled artisan.

Objects

One goal of the system described above and below is to allow independent hardware vendors and other developers to largely be able to code at the level of classes, with direct support for their implementation language. The goal is to consolidate as much code as possible into the collections to reduce the total amount of code that independent hardware vendors and other developers have to write. An object 116 is a logical construct maintained by a collection. The message services 112 provide a layer where these objects correspond directly to C++ classes.

Interception Table

The interception table 108 provides a general, universal, extension mechanism to the print system. The goal here is to allow extensions to be able to intercept and modify messages targeted to any object in the system, to objects of a particular class or to a particular object instance.

System Extensions

As most everything in the system originates from a central message system and is represented by messages, system extensions 118 permit the system to be extended, and most especially monitored by third parties, in any way they see fit. These extensions also provide for useful monitoring extension by the spooler team itself.

Other Collaborations

It will be appreciated that not all of the system behavior can be expressed as a data-driven messaging system. As such, there are and will be other collaborations 120 between objects that create other sub-systems in the machine. These can include, for example, pipelines and the scheduler. The goal here is to make all of the collaborations as flexible as possible to allow other parties to plug into the system.

The way that these other sub-systems maintain coherency with the CDI view of the system is by invoking factory objects through the CDI that either create the object directly, or return the appropriate data to allow the object to be instantiated. Using this pattern has the result that system extensions can intercept these calls to the factory objects and they can implement the factory and wrap the original interface. This means that system extensions can monitor or modify any aspect of the system. This is very useful to allow plug-able monitoring components to be inserted in the system at arbitrary points.

Having now provided a high level discussion of the inventive interface, the following section describes an implementation example contains implementation-specific information. As noted above, it is to be appreciated and understood that the implementation-specific example is provided as but one example of how one might implement a print system in accordance with the inventive principles described herein. As such, other implementations can be utilized without departing from the spirit and scope of the claimed subject matter.

Implementation Example

Preliminarily, the following glossary of terms and acronyms will be used throughout the discussion that follows:

Action—See Batch.
Access Adapter—See Data Access Adapter.
Accessor—A method used to retrieve data from an object. A .Net property is an example of an accessor.
Batch—A sequence of Actions that are executed at one point after being accumulated. A batch will typically result in one network call. Actions can be Gets, Sets, Queries, Commands and Notification requests.
Batching Collection—The highest level interface that plugs into the Batching Router. It receives an appropriately routed Batch of Actions to perform.
Batching Router—The element in the CDI that selects which of a set of Collections to pass Actions in a batch to.
Canonical Name—A name that uniquely identifies an object instance in time and space. In the CDI this will be a collection GUID and an object GUID. The CDI routes based on Canonical name only. Applications should use canonical names where-ever possible when communicating with the system. See Friendly Name.

CDI—See Common Data Interface.

Class—In the CDI, a kind of object. A class could be a printer, a job or a server or any other logical division. A class consists of Types.

Client Collection—A collection of objects maintained on the client. The CDI populates the objects in the client collection based on their Type Maps.

Collection—A heterogeneous set of objects provided by one logical piece of code. The CDI routes requests to multiple collections based on canonical name.

Collection Adapter Service—A service that exposes a Batching Collection interface to the Batching Router and implements services to allow a set of objects to be exposed with less effort.

Command—A kind of Batch action that causes a Method on an object to be executed when the batch is finally sent to the server.

Common Data Interface—A component that allows access to objects via a canonical name. It also provides support for batching calls together and asynchronous or synchronous access to the objects.

Data Access Adapter—A data access adapter plugs into the CDI and translates its capabilities in some way. This could be to transform the interface exposed by the CDI to another one (an In-proc Adapter), or it could be to remote the CDI, in which case it is a Remote Access Adapter.

Display Name—See Friendly Name.

Embedded Types—An object in a Collection that is used to dynamically extend the properties supported by another object in another collection.

Field—A named piece of data.

Friendly Name—Also known as Display Name. A Friendly Name is the name that a user associates with an object (Fred's Printer) as opposed to the Canonical Name that is used by the system to identify the object instance. In order to allow Friendly Names to be converted to canonical names, the CDI provides a Name Resolution Pipeline.

Hierarchy—In the CDI it is an arbitrary relationship between parent and child objects that can be obtained by querying for Links from the parent object.

In-proc Adapter—A form of Data Access Adapter that runs in-proc with a CDI instance running in the application. These will typically just transform the data in some way. For example, by providing APIs to access the data.

Link—A special reserved Class that is used for querying for hierarchical relationship between objects.

Metadata—Not to be confused with reflection in the CLR. Metadata can be queried from any object to discover the Types, Fields and Commands it supports. It can be retrieved whether a corresponding assembly is available on the client or not.

Method—An actual piece of code on an object that gets executed when you call that object. See Command for a slightly different concept.

Name Resolution Pipeline—A sequence of elements called Resolvers that run in the application space to convert a friendly name to a canonical name.

Optimized Type Map—A sequence of gets and sets to be performed against two objects to transfer a set of fields from one object to the other. This is built be combining the fields of a client object's Type Map and a server object's Type Map.

Persistent Object Collection Service—A service that plugs into the Collection Adapter Service that allows objects to be persisted to a database.

Query—In the context of the CDI, a request for a set of objects of a given class with an optional filter and an optional Query Base.

Query Base—The conceptual point at which a query begins. For example, a base might be the local machine or a given server.

Remote Access Adapter—A remote access adapter allows the interface exposed by the CDI to be remoted between machines. It does this by appearing as a collection of objects to one CDI and a Data Adapter to the CDI being remoted.

Resolver—An element in the Name Resolution Pipeline. Each resolver is associated with a Collection and knows how to identify elements inside it.

Type Map—A table of fields and their correlated Accessors that describes how to retrieve data from an object or apply it to an object. Type maps can be dynamic or static. Two type maps are combined by comparing fields to produce an Optimized Type Map.

Type—Analogous to an interface. A type is a logical group of Fields and Commands that must always be implemented completely.

Common Data Interface

The common data interface (CDI) provides functions that include locating an object by name (friendly or preferably canonical), obtaining data from the object or applying data to the object, supporting notifications on object changes and issuing a command to an object. The CDI address and overcomes many limitations of contemporary architectures including, without limitation, the use of synchronous interfaces, the lack of extensibility, name based routing and lack of batching, to name just a few.

The CDI does this by allowing an arbitrary number of uniquely identifiable collections to be plugged into the system. These collections can support any kind of object that they wish. The interface itself is reasonably complex in order to support asynchronous operations and batching, but services are provided and allow plugged in collections to be written more easily.

Router Re-Architecture

A large number of the fundamental problems in current spooler architectures derive from the router. This includes the use of a synchronous API set, the necessity to load all of its providers (and monitors) at start up, the inability to rename objects, the inability to unload any of the spooler components and the inability to shut down the system. This section describes a replacement architecture for routers in the inventive print system.

Figure 2:
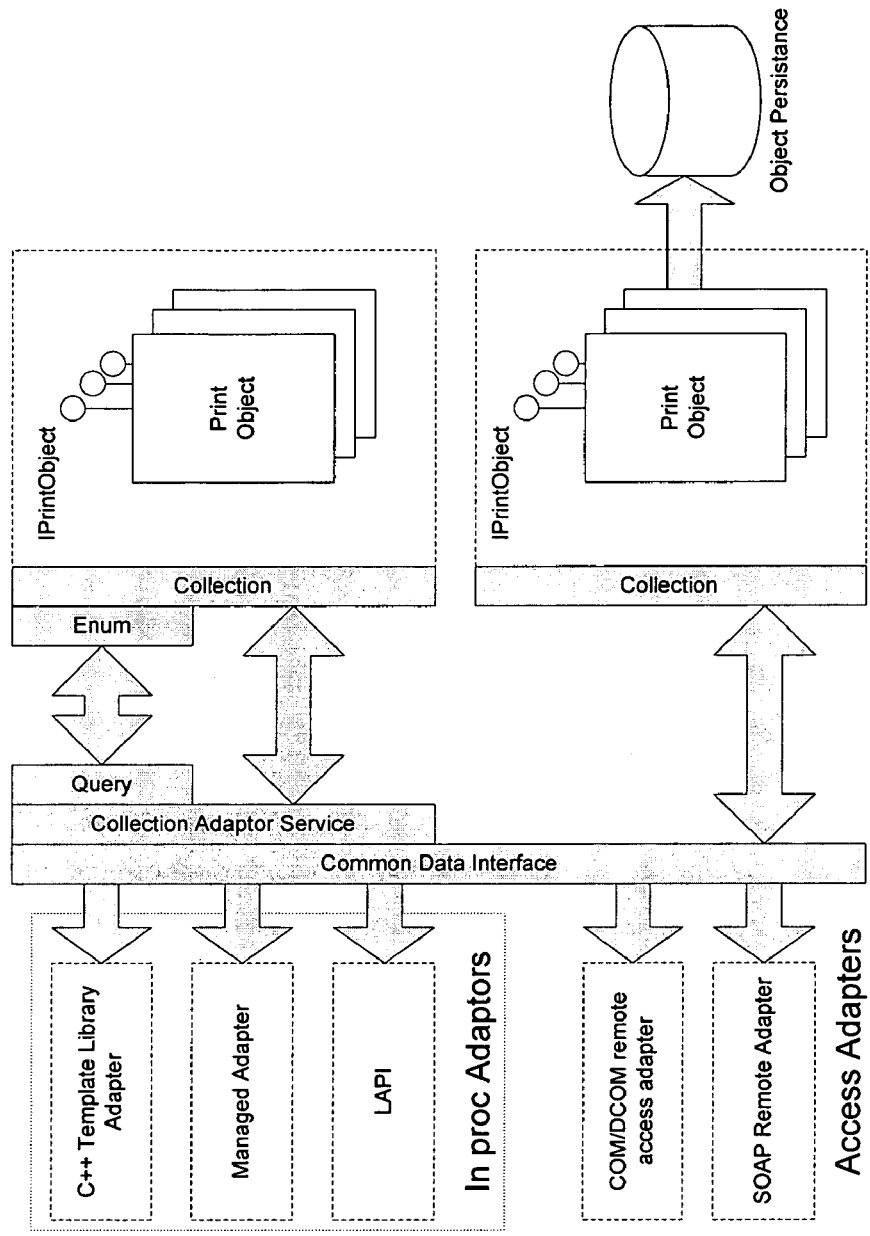
FIG. 2 is a high level block diagram of a printing data access interface in accordance with one embodiment.

The following discussion is based on the overview diagram shown in FIG. 2. In this example, the router is replaced by a much more flexible data access mechanism, the Common Data Interface (CDI). The CDI fundamentally is a routing and service layer between an Access Adapter and a Collection. It provides for the ability to locate print objects on any system via multiple protocols and it also provides a set of services to allow all objects to have the same semantics. These semantics are the ability to retrieve and set a subset of the objects data, the ability to query all objects for their status, the ability to issue commands to the object and the ability to send change notifications consistently from all objects in the system. The data access Adapters are divided into in-proc Adapters and remote access Adapters.

Figure 3:
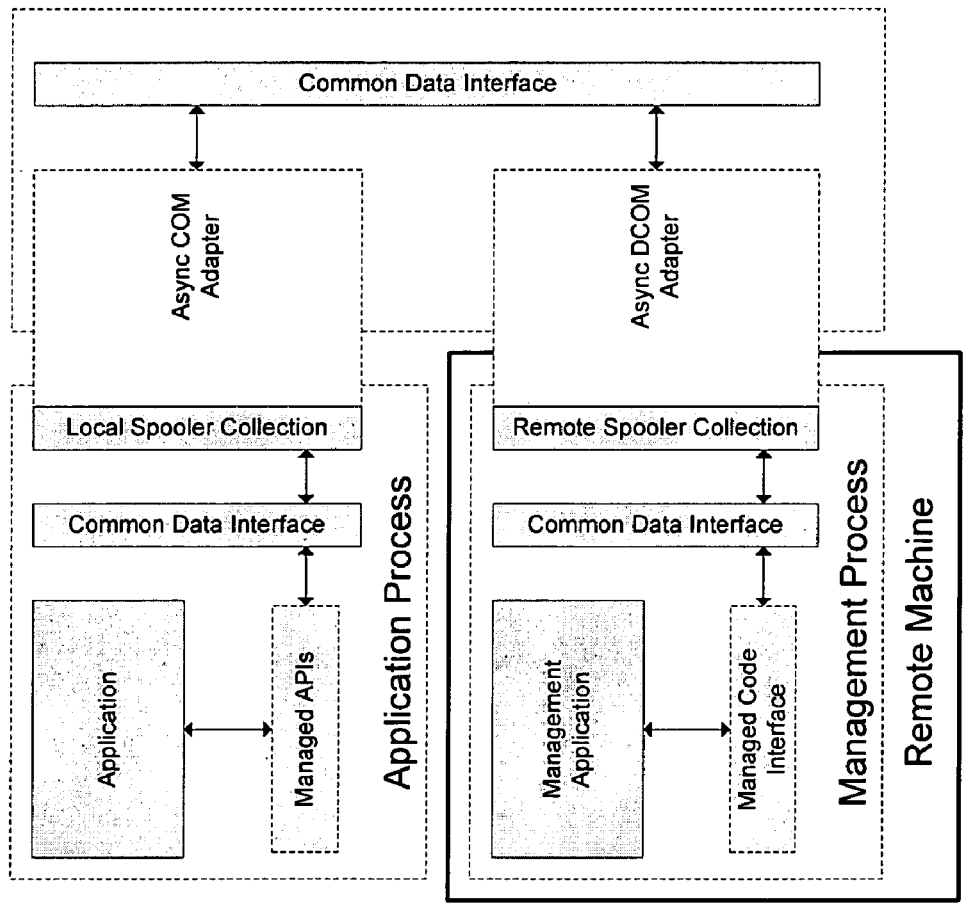
FIG. 3 is a block diagram that illustrates aspects of out of process communication in accordance with one embodiment.

In the illustrated and described embodiment, all internal components and applications (except for Collection Providers and Access Adapters) interface only with the In-proc Adapters. For communication across process boundaries and client-server communication the COM/DCOM remote access adapter is used. For web-service based scenarios, a SOAP adapter is used. Adapters appear in turn as collections in other process spaces, or on other machines. This allows any access Adapter that can fully support the Common Data Interface to always be accessible through an in proc Adapter. The overview of this connectivity scheme is shown in FIG. 3.

Down-Level and Up-Level Protocol Access

An up-level Adapter is any Adapter that can entirely encapsulate the full Common Data Interface—the only full in-proc Adapter will be the attribute based managed code Adapter. The Managed APIs to the system will only represent a useful application subset of the system capabilities. There will be two types of full remote access Adapters including the out of proc COM Adapter used for communication on the local machine and in client-server based scenarios and the SOAP remote access Adapter which will provide access to the data via a web service.

Other candidates for Adapters are Adapters that can use the full power of the Common Data Interface, themselves only expose limited data types, but where these can be mapped in an entirely data driven way. For example, the mapping between a MOF file data-type and a Common Data Interface data-type could be made entirely data driven. MOF files are used by the Windows® Management Instrumentation (WMI) system to describe system objects.

Other, less flexible, protocols would most likely use the in-proc Adapter to communicate with the print system components, for example, RPC clients would communicate with the new print system via the C++ template library.

Support for down-level providers will be simplified by providing an in-memory collection and allowing a user to write a managed class and object adapter to provide data to the system. A down-level provider will have to support a certain limited subset of types to be useable by the system.

Common Data Interface Object Model

In the illustrated and described embodiment, the common data interface (CDI) has properties as follows. The CDI supports getting and setting individual properties on an object. It also supports querying for groups of objects based on a query filter and a set of properties to retrieve from each object. The CDI supports asking an object to execute a command, passing a set of parameters to it and receiving a set of return parameters from it. Further, the CDI supports requesting notifications for object changes. The notification includes a filter and a set of properties that the caller wishes to be notified about. In addition, the CDI is in-proc only, and the ability to remote the interface is provided by the appropriate plug-in Adapters. The CDI uses callbacks for notifications; notifications provide for some difficult trade offs since connections maintained by clients dramatically reduce server scalability. To solve this problem, two classes of notification can be used: first, management notifications can maintain a connection to the server using an asynchronous interface. These notifications will be used for frequently changing data that tend to have a management purposes, for example a view of the jobs in a logical queue; second, status change notifications can use a TTL scheme and a messaging system (e.g. MSMQ) to send less frequent notifications with delivery guarantees. Since the notification mechanism will support server side queries, commonly needed user notifications will be implemented by specifying a server side query and using a guaranteed delivery mechanism.

Further, the CDI is based on Accessors. It does not expose a dictionary interface. Rather, query mechanisms are provided to obtain data and the ability to retrieve object metadata to emulate a dictionary interface. The CDI also aggregates a number of collections of objects together. Up-level collections are used to provide full query support. Down-level collections are used to provide enumeration support, since all print collections should look alike; a query is built by enumerating all objects and applying a filter to them. Any method that is not CPU bound, can be called asynchronously.

The common data interface allows access to collections of objects. All CDI objects are accessed through a collection. Every collection allows access to a set of object classes. An object class identifies the class of object, for example, a logical device, a protocol adapter, a logical server. An object class is identified by a programmatic name. The programmatic name must be of the form <Company>.<Class>[.<Version>]. This name can be used in any locale to identify the object. The string can be implemented as a Unicode string, although in other implementations it can comprise an English identifier.

In the illustrated and described embodiment, a particular class of object will always be identified by the same programmatic name over the entire lifespan of is the system, including any previous versions of the server, or any collections representing a down-level server.

A given object class consists of a number of types. A type is identified by a Programmatic Name in the same way that an object class is. A type consists of a number of fields—each field is identified by a programmatic field name and a field type. The fields in a type must be invariant across all versions of the operating system and on any platform. A type also encapsulates commands as well as fields. A command is identified by a string and it takes a number of ordered input and output arguments.

The CDI will allow the interception and extension of the messages sent through the CDI by third parties. This will allow these parties to monitor and extend the object capabilities. Objects will also be allowed to redirect certain calls to contained objects.

Object Naming

In the illustrated and described embodiment, objects always have a unique canonical name that identifies precisely that instance of the object—the only exception to this rule will be for collections that represent objects on a down-level server.

An object is identified by an object path. The object path always begins with the GUID of the collection instance in which it is contained, so: {XXXXXXX}\{YYYYYY} refers to the object with GUID {YYYYY} in collection {XXXXX}. For objects on an up-level server, the path would be: {WWWWW}\<server>\{XXXXX}\{YYYYY} where {WWWW} is the remote collection GUID, and {XXXXX} is the remote collection in which the object {YYYYY} is located.

Every CDI instance supports the concept of a default collection which is analogous to the current path in the file system. Thus, a CDI hosted in the application space can have its default collection set to the spooler on the local machine, as could all of the satellite sandbox processes and app-domains. Any object canonical name without a fully qualified path will automatically be searched for in the default collection. If a collection implemented in the application space (for example, direct network access to a server bypassing the local service) is to be accessed, then a fully qualified path (i.e. one beginning with a '\') should be used.

In the illustrated and described embodiment, the following are reserved characters in an object path: '\', ':', '"', '^' and '.'.

The caret character (^) is used to escape a succeeding character and allows any character to be represent-able in a string. Valid escapes are shown in the table just below.

| Character Escape | Resulting Character |
|---|---|
| ^\ | \ |
| ^: | : |
| ^" | " |
| ^^ | ^ |

Thus, in order to separate an object name that must contain a '\' in the path, the '\' could be escaped by '^\'..

Friendly Names and Name Resolution Pipelines

Objects can also optionally be given a friendly name (or display name). Objects should always be located using the following mechanism:

- For display purposes, a baseless query for the object class should be made against the service. All local objects matching this class will be returned. The UI from then should use the canonical name of the returned objects and show the class display name.
- For names that might be directly typed into the user interface (including remote server UNC names), a sequence of pluggable components called name resolvers can be provided. The application calls these in order to resolve a "friendly name" to a canonical name. Existing APIs will use the name resolver to convert friendly name based calls such as OpenPrinter and ClosePrinter into the canonical name form (since name resolution is likely to be slow, a caching layer will have to be introduced).
- The sequence of name resolvers will imply the priority of a given name mapping. For example, when a remote UNC name is upgraded to a connection, the same name will resolve to the logical queue object in the local collection rather than the queue object representing the remote queue.
- The application can choose to only have the most full featured name binding returned to it or to have all the name bindings for a friendly name returned to it. It will be more expensive to return all the possible name binding since it might require loading many collections to resolve.
- Having the name resolution elements prevents the entire collection being loaded unnecessarily, unlike in the current router architecture. Every collection wanting to support a friendly name for their objects will have to implement a name resolving element too.
- The application will also be allowed to specify intent when it performs the name resolution. For example, a management application might specify that it only wants non-cached information. In this case, a non-cached object will be returned even if it is less capable that the cached version.

Security

In the illustrated and described embodiment, security is intimately tied into the service layer that will be provided by the system. But an overview of how security will work is presented here because it is an important topic and a global overview of the model is desirable before the implementation is discussed.

Figure 4:
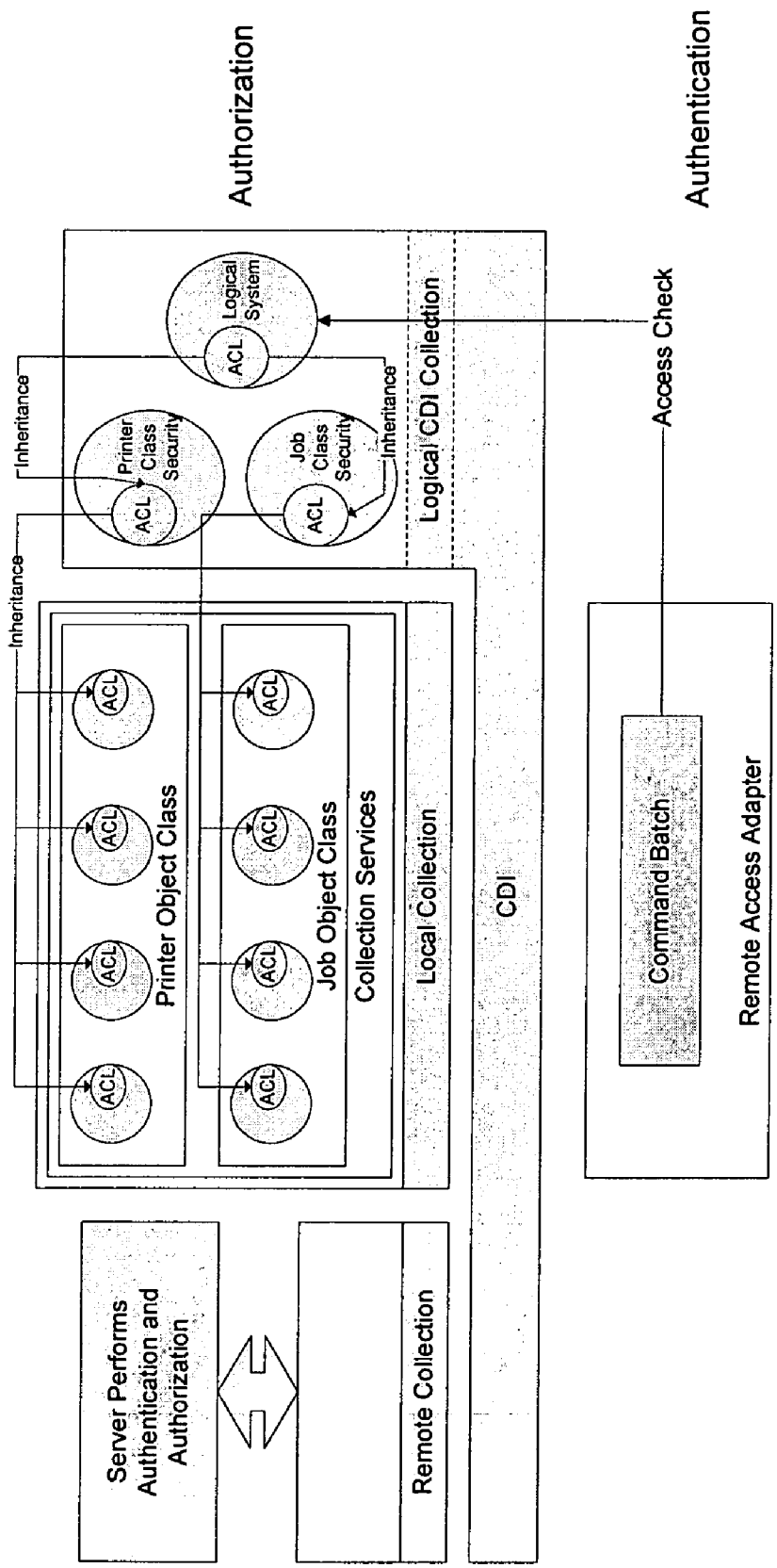
FIG. 4 is a high level block diagram that illustrates an overview of a security model in accordance with one embodiment.

FIG. 4 shows a conceptual diagram of a new spooler security model in accordance with one embodiment. One goal of the new spooler security model is to keep the CDI as a light-weight internal interface to objects, so it does not perform any authentication function. In addition, the CDI can route data via a remote collection to a server. Authorization is then performed by the server. So, in accordance with this embodiment, the CDI routing layer will not provide an authorization function. Finally, the CDI will also execute in the application space where neither authentication nor authorization are required.

Thus, authentication is performed by a remote access adapter in a way that is consistent with the access transport and protocol and authorization is performed by the appropriate collection service (or deferred to the remote server). One consequence of this approach is that the CDI and all of the collections can be access by an un-authorized user. To help alleviate this, a Logical System object provides an access control list (ACL) that controls access to the entire print system for the machine. When a batch of commands is received by the remote access Adapter it performs an access check on the logical system object. The commands (as well as gets, sets and queries) are only allowed to execute if the access check succeeds. This operation is performed once for any batch command received by the remote access Adapter. In the illustrated and described embodiment, the logical system ACL defaults to "Everyone" (but not "Anonymous"). The administrator is allowed to change the logical system permissions to restrict access to the entire print sub-system.

In the illustrated and described embodiment, there is a special reserved system reset command on the logical system object that the remote access adapter is required to pass through without authorization to the Logical Machine object. The Logical Machine Object allows only Administrators to execute this command and it adds Administrators back to the Logical Machine ACL. This mechanism prevents an Administrator from denying him or herself permission to the Logical Machine object which would result in the Administrator never being able to access the subsystem again.

In the illustrated and described embodiment, every object in the local collections has an ACL associated with it. An access check on an object consists precisely in checking access against its ACL. Each object instance has a class object that will provide a default inheritable ACL for a new object of that class, and the CDI maintains a collection of the class objects. The administrator is free to modify the class ACL which will provide a default ACL for any new object of the given class. This allows the administrator to delegate creation rights to an object to another user, but still apply a default ACL to the object when created.

In the illustrated and described embodiment, the CDI provides a service layer to allow a local collection of objects to be written as easily as possible. The service layer provides the security infrastructure to any object implementation that uses it for free.

Not shown in FIG. 4 is a permissions agent which recursively applies a new ACL to all participating classes when a permission changes. This agent is responsible for propagating changes to the class object to instances of the class and it is also responsible for propagating any administrative hierarchy changes to the object instances.

The CDI Accessor Model

One of the more fundamental aspects of this interface is the Accessor model. This mechanism allows the Common Data Interface and a collection to populate the caller's data structures. In the illustrated and described embodiment, the CDI accessor model is unmanaged since the print spooler with which it is intended to operate consists of an unmanaged core service. Since some components of the print system will be managed and will want full access to the data in the print system, there is also a managed code access layer.

The idea behind the CDI Accessor model is that the CDI is a broker between a collection of client objects and multiple collections of server objects. It provides an efficient mechanism for the client and the server to exchange this information using only fields that each party wants to transfer.

Figure 5:
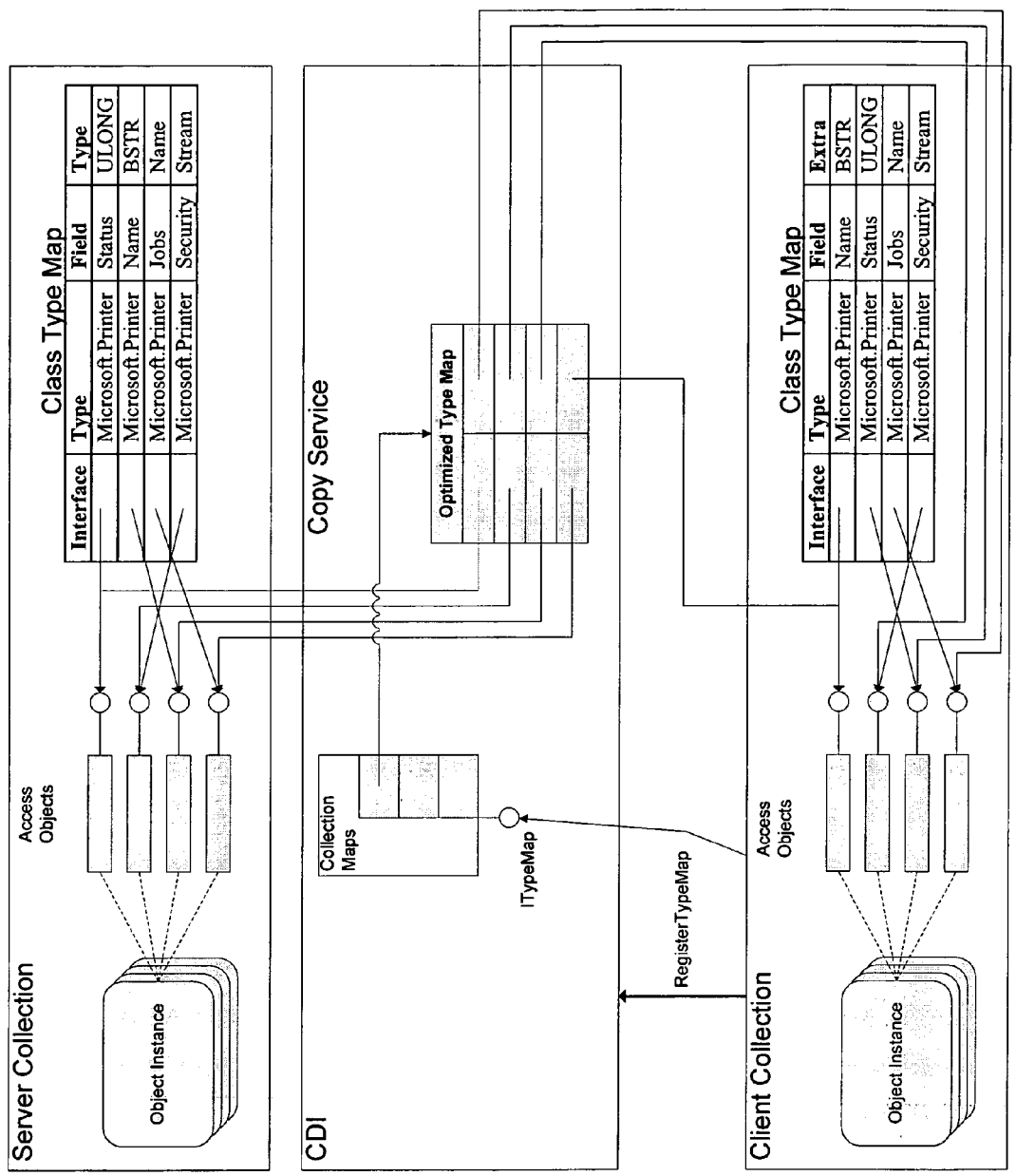
FIG. 5 is a block diagram that illustrates a type mapping mechanism in accordance with one embodiment.

As an example, consider FIG. 5 which shows aspects of how this functionality can be implemented, in accordance with one embodiment, in the context of a server collection, a client collection and the CDI.

In this example, the server and the client both describe the data they wish to expose or retrieve via the same mechanism—a type map. A type map describes the various subtypes and fields that each object supports. For each field, an interface is provided that knows how to get or set the given property for every instance of the class that it describes. So, given a type map, all of the properties of a class instance can be accessed.

Given a description of a client and a server class, the CDI can perform an elegant optimization. Specifically, the CDI can match each field and type from the client type map and server type map and create an optimized type map which consists only of the access interfaces. When this optimized type map is executed on two object instances, all of the requested data is transferred between the two objects without any intermediate storage, or any look up of data. The goal of the optimized type map is to take advantage of the fact that the target objects have a regular structure. For a given collection, the server side objects have a regular structure. And, for a given query, the same data is generally desired from all of the objects in the system. Thus, the binding between a particular class of a source object and a particular class of destination object is always the same. In addition, since the source and destination objects are ultimately system components and are themselves regular structures, each object instance can be stored in a lightweight way.

Consider further that this would be sufficient if there were only one server object that data could be retrieved from. In practice however, there could be a number of implementations of a compatible server object and each will have a type map. Thus, when the client registers its type map with the CDI, the CDI creates a storage space for optimized type maps that can be looked up by GUID. The server side then stores each optimized map as necessary. The goal is that the client registers its maps at application start up time. The system then builds up a set of optimizations around that particular client type as the client starts retrieving data.

Template Derived Type Maps

Creating the access objects for a class instance can result in a lot of code being written because each instance behind each interface knows how to access only one property. A good deal of work can be saved by allowing each instance to access properties in the server and client using data (for example, field offsets can be used to access fields generically across many objects). Doing this dramatically reduces the number of access object implementations that must be coded.

In the illustrated and described embodiment, the CDI also provides a template library that allows a user to define a class, create a number of methods or fields and then write a table exposing any fields or methods they want defined. The template mechanism extracts the type information directly from the class field types or method signatures and builds the access object instances automatically. This allows a client (or server) to expose an object without having to write IDLs. The object can then be supported across any transport supported by the print system and will automatically receive the benefits of asynchronous invocation.

The code excerpt just below shows the simplest mechanism to define a structure that the client wants to retrieve from the server, error handling is omitted.

```
#include <iatl.h>
struct ClientPrinter
{
    ULONG       Status;
    BSTR        Name;
    BSTR        Location;
    BSTR        Comment;
};
IMG_ATTR_TABLE_BEGIN(ClientPrinter, TypeMap)
    Type("Micrsoft.Printer.Basic"),
        Field(IMG_ATTR_FIEL(Status)),
        Field(IMG_ATTR_FIELD(Name)),
        Field(IMG_ATTR_FIELD(Location)),
        Field(IMG_ATTR_FIELD(Comment)),
IMG_ATTR_TABLE_END
void
InitializeTypeMap(
    Void
    )
{
    IImgCommonData   *pICDI = NULL;
    IImgTypeMap      *pITypeMap = NULL;
    CoCreateInstance(CLSID_ImgCommonData,
                NULL,
                CLSCTX_INPROC_SERVER,
                IID_IImgCommonData,
                Reinterpret_cast<void **>(&pICDI));
    Img::iatl::RegisterTypeMap(pICDI,
    IMG_ATTR_TABLE(ClientPrinter, TypeMap), &pITypeMap);
    //
    // Do stuff with the type map.
    //
    pICDI->Release( );
    pITypeMap->Release( );
    return 0;
}
```

The type map mechanism will also allow the caller to specify methods. The code excerpt below illustrates how methods can be defined in this case, error handling omitted.

```
Class ServerClass
{
    IMG_ATTR_TABLE_FRIEND( ServerClass, TypeMap);
private:
    HRESULT
    SetComment(
        BSTR       newComment
        )
    {
      BSTR   tempComment = SysAllocString(newComment);
      if (tempComment)
      {
        SysFreeString(Comment);
        Comment = tempComment;
        Return S_OK;
      }
      return E_OUTOFMEMORY;
    }
    BSTR
    GetComment(
        Void
        )
    {
        return Comment;
    }
    BSTR          Comment;
};
IMG_ATTR_TABLE_BEGIN(ServerClass, TypeMap)
    Type("Microsoft.Printer.Basic"),
        Field(IMG_ATTR_METHOD(ServerClass::SetComment),
        "Comment", gGetMethod),
```

```
        Field(IMG_ATTR_METHOD(ServerClass::GetComment),
    "Comment", gSetMethod),
        .........
        IMG_ATTR_TABLE_END
```

In the illustrated and described embodiment, the template library supports a core set of mappings from CDI types to C++ types. The library is extendable by third parties, so new types can be introduced or refined at any time without changing any part of the template library at all.

Using the Common Data Interface

The material presented in this section expands upon the material described above, but does so at a much lower level. The remainder of the document is devoted to a low level description of the use and implementation of the CDI in accordance with one embodiment.

CDI Types

The CDI type system is designed to support a number of standard types that the system provides guarantees for (for example, they will work over any protocol supported by the system and most can be used for queries). The CDI type system also provides mechanisms to create new types at design time and use them in the system at run time.

To this end, an ImgVariant type is defined as shown in the code excerpt just below. Like the system variant, it has a type and an unnamed union. However it supports a very different set of basic types to a system variant, as shown by the table that follows.

```
//
// This is the basic variant type of the copier. It is used only in transition
// between two objects.
//
typedef struct _tagImgVariant
{
  ImgType       type;
  union
  {
    ULONG             uLongVal;
    ULONGLONG         uLongLongVal;
    BSTR              bstrVal;
    IImgImutableString *refStrVal;
    DOUBLE            doubleVal;
    IStream           *pXMLStreamType;
    IImgCanonicalName *pINameVal;
    IImgMultiValuedName *pIMultiNameVal;
    ImgMultiString    multiStringVal;
    //
    // These two types allow other users of the system to store their own
    // data in an ImgVariant. Any value type up to 128 bits is guaranteed
    // to be supported, or a pointer.
    //
    void              *pOtherVal;
    unsigned char     space[16];
  };
} ImgVariant;
```

| Type | Use |
|---|---|
| BSTR | Basic string type |
| ULONG | 32 bit unsigned integer |
| ULONGLONG | 64 bit unsigned integer |
| DOUBLE | 64 bit floating point value |
| XML Stream | A stream encapsulating an XML Document. |
| IImgImutableString | An efficient immutable string. |
| IImgCanonicalName | A reference to another object via name. |
| IImgMultiValuedName | A multi-valued reference by canonical name. |
| ImgMultiString | An array of BSTRs. |
| ImgVariant | A variant can't contain a variant, but a caller can indicate that is will accept any variant types. |

Another difference is that the ImgVariant type is extensible. This is accomplished by defining the ImgType not as a union, but as a pointer. This declaration is shown in the code excerpt just below.

```
//
// Structure used to reserve a type instance.
//
typedef struct
{
    ULONG       dummy;
} ImgTypeReservation;
//
// A type is described just as a pointer to a reserved piece of memory.
//
typedef ImgTypeReservation *ImgType;
```

In order to reserve an enumeration for a new type, one defines an ImgTypeReservation global variable, and its address becomes a guaranteed unique identifier for the defined type. Similarly the system will define its own types as globally unique pointers. This uses the loader to guarantee that the types do not collide across any address space.

In the illustrated and described embodiment, the print system provides the following methods to manipulate variants.

```
interface IImgCommonData : IUnknown
{
    HRESULT
    VariantInitialize(
        IN   OUT   ImgVariant   *pImgVariant
    );
    HRESULT
    VariantCopy(
        [in, out]  ImgVariant      *pVariantDest,
        [in]       const ImgVariant *pVariantSource
    );
    HRESULT
    VariantClear(
        IN OUT ImgVariant          *pImgVariant
    );
    HRESULT
    VariantConvert(
        [in, out]  ImgVariant      *pVariantDest,
        [in]       const ImgVariant *pVariantSource,
        [in]       ImgType          desiredType
    );
};
```

New CDI Primitive Types

The CDI ImgVariant type itself can contain some new types defined by the CDI. These are, in order:

IImgImutableString

This is a ref-counted string. This type will be freely converted to or from a BSTR by the CDI and it provides for efficient manipulation of strings. Its interface and creation function is shown in the code excerpt just below.

```
typedef enum
{
   FreeThreaded,
   SingleThreaded
} EImgThreading;
[local]
interface IImgImutableString : IUnknown
{
   const wchar_t *
   Value(
      void
   );
   HRESULT
   NewInterface(
      [in]   EImgThreading       clientType,
      [out]  IImgImutableString  **ppINewString
   );
};
interface IImgCommonData : IUnknown
{
   HRESULT
   ImgCreateString(
      IN    const wchar_t        *string,
      OUT   IImgImutableString   **ppIString
   );
}
```

The Value method returns a pointer to the string maintained inside the immutable string. The caller must not modify the value, but is free to read it. Its address will not change and it will not be freed or modified while the string reference is maintained.

The NewInterface method allows the caller to request a new interface to the same string. This is useful to isolate reference counting problems. The caller can request a single threaded interface to the string. In this case, the reference counting on the new interface will not be interlocked. If a caller knows that it will be doing a lot of manipulation of the string in a single threaded context, this can allow them to improve their performance. The initial string created by ImgCreateString is always free threaded.

IImgCanonicalName

This type is used internally and by plug-ins to provide a canonical name reference to other types. This type is illustrated in the code excerpt just below.

```
typedef enum
{
   AbsolutePath,
   RelativePath,
   ObjectRelative,
   CollectionRelative,
   ServerRelative
} EImgPathType;
[local]
interface IImgCanonicalName : IUnknown
{
   ULONG
   PathFieldCount(
      void
   );
   HRESULT
   PathField(
      [in]   ULONG                cElem,
      [out]  IImgImutableString   **ppIString
   );
   HRESULT
   Path(
      [out]  BSTR                 *pbstrPath
   );
   EImgPathType
   PathType(
      void
   );
   HRESULT
   NewInterface(
      [in]   EImgThreading        clientType,
      [out]  IImgCanonicalName    **ppINewCanonicalName
   );
};
interface IImgCommonData : IUnknown
{
   HRESULT
   CreateCanonicalName(
      [in]   const wchar_t        *path,
      [out]  IImgCanonicalName    **ppICanonicalName
   );
   HRESULT
   CreateCanonicalNameFromStrings(
      [in]   EImgPathType         pathType,
      [in]   ULONG                cElems,
      [in]   IImgImutableString   **paString,
      [out]  IImgCanonicalName    **ppICanonicalName
   );
}
```

A canonical name consists of the parsed elements of an object path. Each element is stored as an immutable string. The canonical name can be created either from a path, or it can be directly constructed from a set of immutable strings. For example, for the path "\{GUID}\abc^def", the canonical name will consist of the two strings: "{GUID}" and "abc\def". The interface also allows a caller to construct a path from the substrings of a canonical name, for example, they could create the canonical name with the strings "ab\\cd", "efg" and then get the path "ab^^cd\efg".

Like the immutable string, a canonical name is immutable, and you can obtain new aliased interfaces from it, for threading or reference counting purposes.

IImgMultiValuedName

The multi-valued name is used to return a reference by canonical name to a number of different objects. It is used to represent a 1-N or an N-N relationship between two object classes. Its interface is shown in the code excerpt just below.

```
typedef struct
{
   ULONG              cNames;
   [size_is(cNames)] BSTR  *abstrNames;
} ImgMultiString;
[local]
interface IImgMultiValuedName : IUnknown
{
   ULONG
   NameCount(
      void
   );
   HRESULT
   NameField(
      [in]   ULONG                cElem,
      [out]  IImgCanonicalName    **ppIName
   );
   HRESULT
   GetNamesAsStrings(
      [out]  ImgMultiString       *MultiString
   );
   HRESULT
   NewInterface(
      [in]   EImgThreading        clientType,
      [out]  IImgMultiValuedName  **ppINewMultiValuedName
   );
};
interface IImgCommonData :IUnknown
```

```
{
    HRESULT
    CreateMultiValuedName(
        [in]    ULONG               cNames,
        [in]    IImgCanonicalName   **ppINames,
        [out]   IImgMultiValuedName **ppIMultiValuedNames
    );
    HRESULT
    FreeMultiString(
        [in]    ImgMultiString      *String
    );
    HRESULT
    CreateMultiValuedNameFromMultiString(
        [in]    const ImgMultiString *Strings,
        [out]   IImgMultiValuedName  **ppIMultiValuedNames
    );
}
```

A multi-valued name can be constructed from a set of canonical names and each canonical name can be retrieved. Like the immutable string and the canonical name interfaces, it is immutable, and you can obtain a new interface to it for reference counting or threading reasons.

Since navigating these interfaces could be somewhat complex to a caller, the multi-valued name provides a mechanism to get the entire enclosed canonical name as an array of BSTR paths through the GetNamesAsStrings interface. In order to free the returned multi-string, the ImgFreeMultiString call is used. In addition, the caller can go straight from a multi-string of paths to a Multi-name. This could be especially useful for constructing a multi-valued name from a set of static paths.

Registering New Variant Types

The standard variants will always marshal correctly over the wire and all have support in the query language used by the system. However, especially for the inproc-case, it can be very useful to extend the variant types. This allows one to create new value types, such as points, or printable areas that do not need to be converted to strings. Alternately, it allows one to define an interface that can be retrieved and manipulated as part of a command. To this end, the CDI provides a mechanism for extending the variants that can be handled by VariantCopy, VariantClear and VariantConvert.

This interface is shown in the code excerpt below.

```
interface IImgVariantExtender : IUnknown
{
    HRESULT
    VariantCopy(
        [in, out]   ImgVariant          *pDest,
        [in]        const ImgVariant    *pSrc
    );
    HRESULT
    VariantClear(
        [in]        ImgVariant          *pVariant
    );
    HRESULT
    VariantConvert(
        [in, out]   ImgVariant          *pDest,
        [in]        const ImgVariant    *pSource,
        [in]        ImgType             desiredType
    );
}
typedef struct
{
    ImgType                             inputType;
    ImgType                             outputType;
} ImgVariantTypeConversion;
typedef struct
{
    ULONG                               cImgVariantTypes;
    [size_is(cImgVariantTypes)] const ImgType  *aTypes;
    ULONG                               cImgVariantConversions;
    [size_is(cImgVariantConversions)] const ImgVariantTypeConversion
                                        *aTypeConversions;
} ImgVariantTypeExtensionData;
interface IImgVariantExtensionRegistration : IUnknown
{
};
interface IImgCommonData : IUnknown
{
    HRESULT
    RegisterVariantExtension(
        [in]    const ImgVariantTypeExtensionData   *ExtensionData,
        [in]    IImgVariantExtender                 *pIExtender,
        [out]   IImgVariantExtensionRegistration    **ppIRegistration
    );
}
```

Here, one needs to supply in IImgVariantExtender interface that knows how to perform all the operations on the types that are registered. One then also supplies the set of types supported by the interface and the set of conversions the interface will perform. The system will then extend its handling of variant types to include calling these interfaces for the types that have been specified.

If conversions are provided to and from the standard variant types, then the remoting layer will also correctly marshal that appropriate data across the wire. This allows for use of the type transparently within the same process as the server object or across the wire.

Registering Type Maps

Once a client type map is constructed, it is registered with the CDI and an interface is returned to the client representing that type map registration. This object accumulates the optimized type maps used to bind to various collection classes. The intent is to allow a process to register all of the types that it intends to use up front and then to be able to use the given type map from then on. As the optimized type maps are built, the time required to query data from an object becomes very small since no fields have to be compared. The full interface for registering a type map is shown in the code excerpt just below.

```
interface IImgAccessor;
typedef enum
{
    //
    // Bind-time discoverable errors.
    //
    SourceTypeDoesNotExist       = 0x00000001,
    SourceFieldDoesNotExist      = 0x00000002,
    SourceFieldTypeIncompatible  = 0x00000004,
    //
    // Dynamic errors and properties.
    //
    SourceDataDoesNotExist       = 0x00010000,
    Private                      = 0x00020000,
    Modified                     = 0x00040000,
    CollectHistory               = 0x00080000
} EImgCopyFlags;
typedef struct
{
    EImgCopyFlags               flags;
} ImgExtraCopyData;
typedef struct
{
    [string] const wchar_t      *type;
    [string] const wchar_t      *field;
    ImgType                     fieldType;
    IImgAccessor                *pIAccessor;
```

-continued

```
    [string] const wchar_t    *description;
    int_ptr                   tag;
} ImgFieldAccess;
typedef struct
{
    ULONG                     cAccessors;
    [size_is(cAccessors)]     ImgFieldAccess    *aAccessors;
} ImgFieldAccessors;
typedef struct
{
    ImgFieldAccessors         inputFields;
    ImgFieldAccessors         outputFields;
    ImgCommandsDescription    commands;
} ImgClassDescription;
[local]
interface IImgAccessor : IUnknown
{
    HRESULT
    Function(
        [in]       void               *pObject,
        [in, out]  ImgVariant         *pData,
        [in, out]  ImgExtraCopyData   *pExtra
    );
};
[local]
interface IImgTypeMap : IUnknown
{
};
[local]
interface IImgCommonData : IUnknown
{
    HRESULT
    RegisterTypeMap(
        [in]    ImgClassDescription   *ClassDescription,
        [out]   IImgTypeMap           **ppITypeMap
    );
};
```

Since there are a number of types used for this interface, each one is explored below.

EImgCopyFlags

These flags are associated with a copy operation and let the client know about any issues that were encountered when copying data. Most of the flags are self-explanatory. Some of the more interesting flags are:

Private—The data should not be copied outside of the system. Other processes considered part of the system could receive the data. The data will never be sent across the wire.

NotModified—Indicates that the data hasn't been modified from that on the server. This can be useful for optimizing a set operation.

CollectHistory—This indicates to the CDI that the history of the changes to this field should be collected. The default behavior is to collapse the history of a field.

ImgExtraCopyData

This is passed to the accessor to allow flags to be modified or inserted by the accessor. It is also used to pass a change handler to the accessor when a set is being performed, which allows the change handler to send changes if the property value changes.

ImgFieldAccess

This specifies a field. Most of the structure fields are self-explanatory. The description does not have to be specified on the client. On the server, this field can be used for reflection. The tag is used on the server to allow a particular field to be referenced cheaply. It is the responsibility of whoever propagates the structure to keep the tag unique.

ImgFieldAccessors

This specifies a set of field accessors.

ImgClassDescription

This describes a class, specifies the get accessors and the set accessors.

IImgAccessor

This interface allows access to a particular field. The ImgVariant stores the data temporarily, and allows many different types of data to be passed.

IImgTypeMaps

This interface can be released by the client. In turn, all of the accessor interfaces passed in at registration time will be released.

IImgCommonData

This is the central interface that can be used to register a type map. This interface can be released and the type map registration will remain valid.

Batching Interface

The remaining sub-sections (i.e. Object Queries, Object Commands and Notifications) deal with the data access interface in a large amount of detail. This section deals with what an object is and how the client gets, sets and queries objects.

The interface used by the client to access these objects is shown in the code excerpt just below.

```
typedef enum
{
    Serial,
    Parallel,
    Transactional,
} EImgBatchSemantics;
interface IImgAsyncResult;
interface IImgCallCompletion;
interface IImgBatch;
interface IImgCommonData;
interface IImgClientCollection;
typedef enum
{
    ActionCompleted,
    ActionPartiallyCompleted,
    ActionFailed,
    ActionDidNotExecute,
    ActionBatchDidNotExecute
} EImgCompletionStatus;
[local]
interface IImgAsyncResult : IUnknown
{
    void *
    GetCookie(
        void
    );
    void
    SetCookie(
        [in]        void            *cookie
    );
    HRESULT
    GetWaitHandle(
        [out]       HANDLE          *pWaitHandle
    );
    BOOL
    CompletedSynchronously(
        void
    );
    BOOL
    DidComplete(
        void
    );
}
[local]
interface IImgCallCompletion : IUnknown
{
    HRESULT
    Done(
        [in]        IImgAsyncResult *pIResult
```

```
        );
};
[local]
interface IImgBatch : IUnknown
{
    HRESULT
    GetObjectData(
        [in, string]        const wchar_t       *objectPath,
        [in]                IImgTypeMap         *pITypeMap,
        [in, out]           void                *pObject,
        [out, unique]       ULONG               *pulActionIndex
        );
    HRESULT
    SetObjectData(
        [in, string]        const wchar_t       *objectPath,
        [in]                IImgTypeMap         *pITypeMap,
        [in]                void                *pObject,
        [out, unique]       ULONG               *pulActionIndex
        );
    HRESULT
    IssueCommandToObject(
        [in, string]        const wchar_t       *objectPath,
        [in, string]        const wchar_t       *pType,
        [in, string]        const wchar_t       *pCommand,
        [in]                ULONG               cParams,
        [in, size_is(cParams)] ImgVariant       *aimgVariant,
        [out, unique]       ULONG               *pulActionIndex
        );
    HRESULT
    QueryObjectData(
        [in, string]        const wchar_t       *objectBase,
        [in, string]        const wchar_t       *objectClass,
        [in, string]        const wchar_t       *queryString,
        [in]                IImgClientCollection *pIClientCollection,
        [out, unique]       ULONG               *pulActionIndex
        );
    HRESULT
    Execute(
        void
        );
    HRESULT
    BeginExecute(
        [in, unique]        IImgCallCompletion  *pICallCompletion,
        [out, unique]       IImgAsyncResult     **ppIAsyncResult
        );
    HRESULT
    EndExecute(
        [out]               EImgCompletionStatus *pCompletion
        );
//
// Call these methods to retrieve extra output information from each call.
//
    HRESULT
    ResultGetObjectData(
        [in]                ULONG               ulIndex,
        [out]               EImgCompletionStatus *pCompletion
        );
    HRESULT
    ResultSetObjectData(
        [in]                ULONG               ulIndex,
        [out]               EImgCompletionStatus *pCompletion
        );
    HRESULT
    ResultIssueCommand(
        [in]                ULONG               ulIndex,
        [out]               EImgCompletionStatus *pCompletion,
        [out, unique]       ImgReturnParams     *pParams
        );
    HRESULT
    ResultQueryObjectData(
        [in]                ULONG               ulIndex,
        [out]               EImgCompletionStatus *pCompletion
        );
    HRESULT
    ExtendedErrorResult(
        [in]                ULONG               ulIndex,
        [out]               IErrorInfo          **ppIErrorInfo
        );
//
// Method to cancel any pending operations on a batch.
//
    HRESULT
    Cancel(
        [out]               EImgCompletionStatus *pCompletion
        );
};
[local]
interface IImgCommonData : IUnknown
{
    HRESULT
    GetDataBatch(
        [in]                EImgBatchSemantics  semantics,
        [out]               IImgBatch           **ppIBatch
        );
};
[local]
interface IImgClientCollection : IUnknown
{
    HRESULT
    AllocateObject(
        [out]               void                **ppObject
        );
    void
    FreeObject(
        [in]                void                *pObject
        );
};
```

This access interface exposes new concepts which, by way of example and not limitation, include:
A batching interface (IImgBatch)
An asynchronous programming mechanism (IImgAsyncResult).
A client collection interface (IImgClientCollection).

Each of these interfaces will be discussed in abstract first and then an example of a potential call sequence will be shown in order to make these ideas more concrete.

All actions issued to the data access interface are batched. The batching interface is returned from a call to IImgCommonData::GetDataBatch( ), then a set of actions are issued to the batching interface, and lastly the batch is executed. If the caller wants to issue a single action, they just create a batch request of one action.

None of the actions are executed until the Execute method is called. Execute can either be called synchronously or asynchronously (depending on whether Execute or BeginExecute is called). The caller can pass in a completion interface, or they can use a wait handle returned from the IImgAsyncResult interface. The rule is that if the caller does pass in a completion interface, then they cannot retrieve a wait handle. The caller can associate extra data with the call through the cookie interface. The CDI guarantees that the Done method will be called in the call completion interface to allow the cookie to be freed if necessary. The caller must call the EndExecute call to retrieve the result of the batching call.

The caller can open the batch either as a serial, a parallel or a transactional batch. A non-transactional batch might have a partial success return while a transactional batch will not. Unfortunately, not all collections will support transactions (they might communicate to a down-level system that does not support transactions), and if any of the batch's actions cross to a non-transactional collection, the entire batch will fail. Thus, in accordance with one embodiment, transactional batching can be mainly performed inside the system or only once the server version has been positively identified.

For some batch-able actions like "Pause all printers" it does not make sense to be transactional since one would rather have half the queues paused than none because one queue failed to pause. If the semantics of the batch are serial, then the actions in the batch are guaranteed to be executed sequentially. If the semantics of the batch are parallel, then the system might execute the actions in parallel, if there are sufficient resources or if it is otherwise optimal to do so. This means that for parallel batch semantics any of the actions could fail in any order. Transactional batches also imply sequential semantics.

Each action in the batch returns an incrementing index. The caller can ignore the index if they do not need to retrieve the result of the batch call. (It could be a transactional batch and the status of the batch is the status of the action). The result of each call can be retrieved by calling the corresponding "Result" method of the batch interface. If the call reports an error, extended error information can be returned from the batch.

The synchronous and asynchronous forms of execute are the same except that in the asynchronous case, the return status is returned from the EndExecute call. Since batch commands could execute in parallel, a batch can have a partial failure result. Each index can then be queried to determine precisely which call failed, and why, if the caller desired.

In accordance with one embodiment, the methods on the batching interface are summarized below:

GetObjectData—this retrieves data from the given object name using the given type map and caller specified object.

SetObjectData—this writes data to the given object using the given type map to make the write (the Accessors between the client collection and the server collection are reversed) and the object to retrieve the data from. Note that if the data is being sent to a remote destination, the contents will be copied out early from the object. If the data is being set against a local object, the contents will be copied out later when the actual set occurs.

QueryObjectData—This issues a query against a certain object class. Queries are discussed in more detail below. A query is conceptually very much like a Get command except that many objects will be allocated from a collection in order to satisfy the query rather than just a single object.

IssueCommandToObject—This issues a command against an object. Commands are discussed in more detail below. A command is issued to a particular type on a given object. The command itself is a unicode string and it receives an ordered list of input arguments. The output parameters can be retrieved by the caller through the ResultIssueCommand call.

Execute—This causes all of the commands to be batched thus far to be executed.

Cancel—This cancels any actions that are currently in progress after the execute call. It also flushes any commands from the batching interface before the call was executed.

A batching interface can only be re-used after a Cancel call returns, or after the synchronous Execute call completes or the asynchronous EndExecute call returns.

Figure 6:
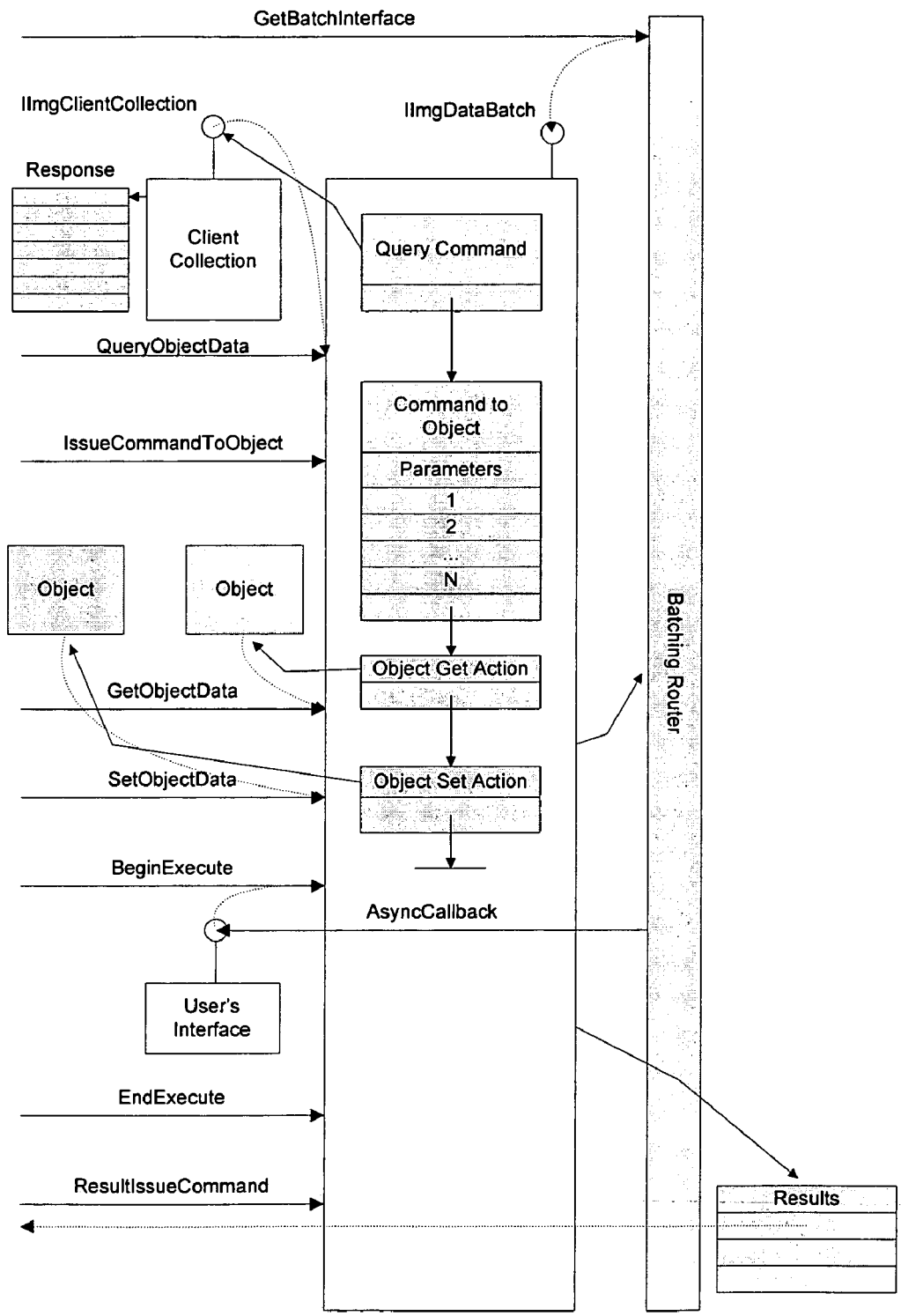
FIG. 6 is a block diagram of common data interface object access interface in accordance with one embodiment.

FIG. 6 illustrates a diagram of a batch call command. This assumes that the IImgDataBatch interface builds up a list of commands to be executed.

Queries, Commands and Notifications are covered in detail in subsequent sections. Accordingly, a sample code snippet that gets the state of an object and then changes the name and comment of the object and applies the changes again is shown below. The code is written in the asynchronous callback form to illustrate the asynchronous batching interface, but it really does not need this complexity.

```
struct ClientPrinter
{
    ULONG       Status;
    BSTR        Name;
    BSTR        Location;
    BSTR        Comment;
    ClientPrinter(
        void
        )
    {
        ZeroMemory(this, sizeof(*this));
    }
    ~ClientPrinter(
        void
        )
    {
        SysFreeString(Name);
        SysFreeString(Location);
        SysFreeString(Comment);
    }
};
IMG_ATTR_TABLE_BEGIN(ClientPrinter, TypeMap)
    Type("Micrsoft.Printer.Basic"),
            Field(IMG_ATTR_FIELD(Status)),
            Field(IMG_ATTR_FIELD(Name)),
            Field(IMG_ATTR_FIELD(Location)),
            Field(IMG_ATTR_FIELD(Comment)),
IMG_ATTR_TABLE_END
class Operations : public IImgCallCompletion
{
public:
    Operations(
        IN      IImgDataBatch       *pIBatch,
        IN      IImgTypeMap         *pITypeMap
        )
    {
        m_pIBatch = pIBatch;
        m_pITypeMap = pITypeMap;
        m_pIBatch->AddRef( );
        m_pITypeMap->AddRef( );
    }
    ~Operations(
        void
        )
    {
        m_pIBatch->Release( );
        m_pITypeMap->Release( );
    }
    //
    // Insert your favorite IUknown implementation here.
    //
    void
    StartOperation(
        Void
        )
    {
        //
        // We would get this object canonical name through a query
            typically.
        //
        m_pIBatch->GetObjectData(L"{4810742c-c8d9-44c3-81bb-
                c3ff5f83d762}\"
                L"{f5ddca93-06f9-40c3-8c7f-a61c3e390fae}",
                m_pITypeMap,
                &m_clientPrinter,
                NULL);
        //
        // We don't need the asynchronous result, we just pass our own
        // interface in to the batch.
        //
        m_pIBatch->BeginExecute(this, NULL);
    }
    //
    // IImgCallCompletion implementation.
    //
    STDMETHODIMP
    Done(
        IN      IImgAsyncResult         *pIResult
        )
    {
```

-continued

```
        m_pIBatch->EndExecute( );
        //
        // Change the name and comment.
        //
        SysFreeString(m_clientPrinter.Name);
        SysFreeString(m_clientPrinter.Comment);
        m_clientPrinter.Name = SysAllocString(L"New Name");
        m_clientPrinter.Comment = SysAllocString(L"There is a
          comment here.");
        //
        // Apply the change, synchronously this time.
        //
        m_pIBatch->SetObjectData(L"{4810742c-c8d9-44c3-81bb-
                  c3ff5f83d762}\"
                  L"{f5ddca93-06f9-40c3-8c7f-a61c3e390fae}",
                  m_pITypeMap,
                  &m_clientPrinter,
                  NULL);
        m_pIBatch->Execute( );
    }
private:
    IImgDataBatch    *m_pIBatch;
    IImgTypeMap      *m_pITypeMap;
    ClientPrinter    m_clientPrinter;
}
int main(void)
{
    IImgCommonData   *pICDI = NULL;
    IImgTypeMap      *pITypeMap = NULL;
    CoCreateInstance(CLSID_ImgCommonData,
               NULL,
               CLSCTX_INPROC_SERVER,
               IID_IImgCommonData,
               Reintpret_cast<void **>(&pICDI));
    Img::iatl::RegisterTypeMap(pICDI,
        IMG_ATTR_TABLE(ClientPrinter, TypeMap), &pITypeMap);
    IImgDataBatch    *pIBatch = NULL;
    pICD->GetDataBatch(NonTransactional, &pIBatch);
    Operations *pOperations = new Operations(pIBatch, pITypeMap);
    pOperations->StartOperation( );
    //
    // Sleep for 10 seconds to allow get and set to proceed.
    //
    Sleep(10000);
    pOperations->Release( );
    pIBatch->Release( );
    pICDI->Release( );
    pITypeMap->Release( );
    return 0;
}
```

Object Queries

This section describes object queries. The interface exposed by IDataAccessBatch is shown just below.

```
[local]
interface IImgBatch : IUnknown
{
    HRESULT
    QueryObjectData(
        [in, string]    const wchar_t    *objectPath,
        [in, string]    const wchar_t    *objectBase,
        [in, string]    const wchar_t    *objectBaseClass,
        [in, string]    const wchar_t
*desiredObjectClass,
        [in, string]    const wchar_t    *queryString,
        [in]            IImgClientCollection *pIClientCollection,
        [out, unique]   ULONG            *pulActionIndex
    );
    HRESULT
    ResultQueryObjectData(
        [in]            ULONG               ulIndex,
        [out]           EImgCompletionStatus *pCompletion
    );
};
```

The typeMap and ClientCollection parameters have already been discussed. The queryString parameter controls the query. If it is null, then the query requests all objects of the given type as specified by the query base. If it is not null, then it specifies the filter for the query. A query consists of a query base, a query class and a query string. The query string is dealt with a little later. The query base is the root object for the query, i.e. it is the object under which the other objects can be thought to exist (the query base for a job enumeration could be a printer or a server object). The query base relationship is not typically hierarchical but relational (i.e. you cannot enumerate objects two levels below a query base). However, unlike a strict hierarchy, an object can be located under many different query bases. This reflects the fact that the underlying store is relational. The main reason for supporting query bases is to allow down-level enumeration based implementation of a query to easily find the root object for the enumeration. Query bases complicate the parsing of a query for the up-level case, however.

A sample list of queries and types is shown in the table just below. Note that objects in a collection may not use the programmatic name of a collection. They should use the name resolution mechanism for friendly names and then internally use the numeric object name to refer to the object. The collection is allowed to be specified using the programmatic name for queries since the string is more likely to be assembled by a human.

| Query Object | Meaning |
| --- | --- |
| {XXXXX} | Search collection {XXXX}. |
| Microsoft.LocalObjects | Search the local collection. |
| {XXXXX}\{YYYY} | Search the collection {XXXX} for objects contained by object {YYYY}. |
| {RRRRR}\<server> | Search all the collections on the remote server that support the given class. |
| {RRRRR}\<server>\{XXXX} | Search the collection {XXXX} on the remote server. |

Note that remote collections are not required to return any objects for a query against the local machine. It would be too inefficient for them to query all servers. The query string is a filter that specifies the attributes that the given object must have. A field takes the form:

Programmatic.Type.Name.Version:FieldName.

Future queries might be allowed to access data within an XML document embedded in the data. These queries would have the form:

Programatic.Type.Name.Version:
  FieldName\Node\Node\Property.

The valid operators and their precedence are shown in the table just below.

| Operator | Precedence | Meaning |
| --- | --- | --- |
| ( ) | 0 | Parentheses |
| = | 1 | Equal. |
| <> | 1 | Not Equals. |
| > | 1 | Greater than. |
| < | 1 | Less than. |
| >= | 1 | Greater than or equal to. |
| & | 1 | Bitwise and |
| CONTAINS | 1 | Value contained in array. |

| Operator | Precedence | Meaning |
| --- | --- | --- |
| NOT | 2 | Logical NOT |
| AND | 3 | Logical AND |
| OR | 4 | Logical OR |

Fields can only be compared against constants. The following are valid constants:

Any integer. Integers may be expressed in decimal or hexadecimal form.

Any floating point number.

Any string literal demarcated with quotes. If a quote needs to be a part of the string, then a BASIC style " " is used.

Valid queries are shown in the table just below. To simplify the semantics of some commonly accessed objects, there can be well defined query bases that allow easier interoperability with down-level servers. These will include—

Print queue queries—Query Base should be the server object that contains the print queue.

Job Object queries—Query base should be the queue or server object that contains the jobs.

| Query String | Meaning |
| --- | --- |
| Microsoft.Printer.Basic:Server = "Fred" | Find all printers with server "Fred". |
| Microsoft.Printer:Server = "Fred" AND Microsoft.Printer.Extension:ColorDepth > 1 | Find all objects on server "Fred" where the ColorDepth is greater than 1. |
| (Microsoft.Job.Queue = "{YYYYY}" OR Microsoft.Job:Queue = "{ZZZZZ}") AND Microsoft.Job:Status & 0x04 | Find all jobs on queue {YYYY} or queue {ZZZZZ} where the status has bit 2 set. |

The following constraints apply to a query in accordance with one embodiment:

If the query compares the field against a numeric type (either integer or floating point) then the actual field must be numeric (32 bit integer, 64 bit integer or double).

If the query compares the field against a string type and the comparison operator is not CONTAINS then the only valid field types are a BSTR or an IImgImutableString.

The CONTAINS operator only works on string types. For single valued strings, it amounts to checking for equality. For a canonical name, it amounts to checking that the path is the same. For a multi-string, it evaluates the checking if any of the strings in the multi-string are equal. For a Multi-Valued Name, it is equivalent to checking if any of the paths expressed by any of the canonical names in the multi-valued name are equal to the string the contains operator refers to.

The bitwise AND operation only applies to integral types.

To make this discussion more concrete, the code excerpt just below presents a sample. This queries for a set of print objects and then enumerates them. This sample uses the waitable form of the IAsyncResult interface. Again, in this case this is not needed, but it shows another usage of the interface. Note that we use a feature of the template library that automatically builds an IImgClientCollection and enumerator for the caller. Error handling is omitted for brevity.

```
struct ClientJob
{
    ULONG       Status;
    BSTR        DocumentName;
    ClientJob(
        void
        )
    {
        ZeroMemory(this, sizeof(*this));
    }
    ~ClientJob(
        void
        )
    {
        SysFreeString(DocumentName);
    }
};
IMG_ATTR_TABLE_BEGIN(ClientJob, TypeMap)
    Type("Micrsoft.Job.Basic"),
        Field(IMG_ATTR_FIELD(Status)),
        Field(IMG_ATTR_FIELD(DocumentName)),
IMG_ATTR_TABLE_END
int main(void)
{
    IImgCommonData      *pICDI = NULL;
    IImgTypeMap         *pITypeMap = NULL;
    CoCreateInstance(CLSID_ImgCommonData,
            NULL,
            CLSCTX_INPROC_SERVER,
            IID_IImgCommonData,
            reinterpret_cast<void **>(&pICDI));
    Img::iatl::RegisterTypeMap(pICDI,
        IMG_ATTR_TABLE(ClientJob, TypeMap), &pITypeMap);
    Img::iatl::TClientCollection<ClientJob> *pClientCollection = new
        Img::iatl::TClientCollection<ClientJob>( );
    IImgDataBatch      *pIBatch = NULL;
    pICD->GetDataBatch(NonTransactional, &pIBatch);
    //
    // Query for all jobs on the local machine belonging to Toe Knee
    // Heart with a length of more than 120kB.
    //
    pIBatch->QueryObjectData(NULL,
            L"Microsoft.Job",
            L"Microsoft.Job.Basic:UserName =
            \"Toe Knee Heart\" AND"
            L"Microsoft.Job.Basic:Size > 120000",
            pClientCollection,
            NULL);
    IImgAsyncResult      *pIAysncResult = NULL;
    pIBatch->BeginExecute(NULL, &pIAsyncResult);
    HANDLE      hEvent = NULL;
    //
    // Get a waitable handle, it will be signaled when the data is ready.
    //
    pIAsyncResult->GetWaitHandle(&hEvent);
    //
    // You could do whatever you like here while the Query is pending.
    //
    WaitForSingleObject(hEvent, INFINITE);
    EImgBatchCompletionStatus status;
    pIBatch->EndExecute(&status);
    Img::iatl::TClientCollection<ClientJob>::Iterator i(pCollection);
    For(i.Init( ); !i.Done( ); i.Next( ))
    {
        ClientJob      *pClientJob = i.Current( );
        wprintf(L"Document : %s – Status : %d\n",
                pClientJob->DocumentName,
                pClientJob->Status);
    }
    pIAsyncResult->Release( );
    pClientCollection->Release( );
    pIBatch->Release( );
    pICDI->Release( );
    pITypeMap->Release( );
    return 0;
}
```

Object Commands

As well as querying for a collection of objects, commands can be issued to a given object.

A command on an object is tied to the type, including any embedded types from other collections that the object might have. This allows the command set of an object to be extended or a per-instance basis.

In accordance with one embodiment, commands have the following it properties:

Commands are never cached, data can be cached.

Commands can return parameters to the caller beyond a failure exception.

A command has a fixed set of ordered input and output parameters. Commands can not be overloaded or extended. The semantics of a command can never change across new versions of the system. (Commands might be made obsolete and eventually support may be discontinued.)

Commands will be used for object construction and for object deletion. For object deletion, a predefined type and method is defined—"Microsoft.GenericObject.1", command "Delete". The delete command takes no parameters and returns no parameters. All delete-able objects are required to expose this command. All embedded objects are also required to expose this command. When the containing object of an embedded object is deleted, it will request all of the embedded objects to delete themselves.

Another command that all securable objects will be required to expose is "Microsoft.GenericObject.1" command "AccessCheck", this will take a single parameter—a permission object and return true or false. This command is used by embedded types to ensure that they enforce the same security semantics as their embedding object when they are accessed through their own collection.

The lifetime of the parameters returned from a command call result is the same as that of the batch. When the batch is Released, Canceled or another action is performed on the batch then the command parameters will be cleared up.

Finally, a sample usage of the command interface is presented just below. This requests a stream object from an already discovered print queue.

```
int Main(void)
{
    IImgCommonData    *pICDI = NULL;
    CoCreateInstance(CLSID_ImgCommonData,
            NULL,
            CLSCTX_INPROC_SERVER,
            IImg_ICommonData,
            reinterpret_cast<void **>(&pICDI));
    pICDI->GetDataBatch(NonTransactional, &pIBatch);
    ULONG             ulIndex = 0;
    ImgReturnParams   params;
    EImgCompletionStatus  completion;
    pIBatch->IssueCommandToObject(L"{4810742c-c8d9-44c3-81bb-
                    c3ff5f83d762}\"
            L"{f5ddca93-06f9-40c3-8c7f-a61c3e390fae}",
            L"Microsoft.Printer.Basic",
            L"GetJobStream",
            0, NULL,
            &ulIndex);
    pIBatch->Execute( );
    pIBatch->ResultIssueCommand(ulIndex, &completion, &params);
    //
    // Check the job parameters and types.
    //
    if (completion == ActionCompleted && params.cParams == 1 &&
        params.aParams[0].type == CustomTypeJobStream)
    {
        IJobStream    *pIJobStream =
        (IJobStream)params.aParams[0].pOtherVal;
        pIJobStream->AddRef( );
        //
        // Do something with the job stream.
        //
        pIJobStream->Release( );
    }
    pIBatch->Release( );
    //
    // Params will now point to garbage.
    //
    pICDI->Release( );
    return 0;
}
```

Notifications

Notifications can also be received from an object, an object class, a server, or a collection. This interface is also batched from the client. The interface is shown just below.

```
typedef enum
{
    NotifyAddNewObject,
    NotifyAddMatchedFilter
} EImgNotifyAddReason;
typedef enum
{
    NotifyRemoveDeletedObject,
    NotifyRemoveDoesNotMatchFilter
} EImgNotifyRemoveReason;
typedef enum
{
    NotifyUpdatePopulate,
    NotifyUpdate
} EImgNotifyUpdateReason;
[local]
interface IImgBatch : IUnknown
{
    HRESULT
    RegisterNotificationCollection(
        [in, string]  const wchar_t            *objectBase,
        [in, string]  const wchar_t            *objectClass,
        [in, string]  const wchar_t            *queryString,
        [in]          IImgNotificationCollection
                                               *INotificationCollection,
        [in]          IImgTypeMap              *pITypeMap,
        [in, unique]  IImgCallCompletion       *pICallCompletion,
        [out]         ULONG                    *pulActionIndex
    );
    HRESULT
    ResultNotificationCollection(
        [in]          ULONG                    ulIndex,
        [out]         EImgCompletionStatus     *pCompletion,
        [out]         IImgNotificationChannel  **ppIChannel
    );
};
[local]
interface IImgNotificationChannel : IImgAsyncResult
{
    HRESULT
    Populate(
        void
    );
    HRESULT
    Update(
        void
    );
}
[local]
interface IImgNotificationObject : IUnknown
{
    HRESULT
    BeginNotifyChanges(
        [in]  EImgNotifyUpdateReason  reason
    );
    HRESULT
    EndNotifyChanges(
        void
```

```
        );
    HRESULT
    GetRealObjectAddress(
        [out]       void            **ppObject
        );
};
[local]
interface IImgNotificationCollection : IUnknown
{
    HRESULT
    AddObject(
        [in]        EImgNotifyAddReason      reason,
        [out]       IImgNotificationObject   **ppIObject
        );
    void
    RemoveObject(
        [in]        EImgNotifyRemoveReason   reason,
        [in]        IImgNotificationObject   *pIObject
        );
};
```

This interface exposes a number of new concepts among which are included, by way of example and not limitation, a notification collection, a notification object, notification filters and a notification channel. This interface extends the batch interface with another two other actions RegisterNotificationCollection and ResultNotificationCollection.

A notification collection is a client collection with slightly richer semantics. It is a collection of homogenous client objects. Each object can be described with a type map. When a notification for a particular object change occurs or if an object is added, the object is retrieved, and then populated. When the new data for the object has been placed in it, the EndNotifyChanges method on the object is called allowing the implementer to perform any processing necessary once the object has been updated.

The notification collection specified by the caller will always be updated serially (i.e., it could be called by multiple threads, but only one thread will call it at a time). The notification collection will only be updated when the Populate or Update calls are made on the channel. Thus, the caller can protect their objects by placing the appropriate locks around the Populate or Update calls, if they are performing multi-threaded access on their objects. If the caller specified a callback for the notifications, then only a single thread is guaranteed to execute in the callback at a time.

Notifications work in the following way. When the Populate call is made on the channel, the objects will be allocated from the specified collection through the Add method. Then the objects will be called with the BeginNotifyChanges call, and whether this is an update cycle or a populate cycle at this time will be passed into the object.

Then, notifications are received through the notification channel. If the caller specified a callback, then the callback will be called when new updates are received (or when the channel develops an error). If the caller did not specify a callback, then a wait handle will be available or the channel can be polled for the IsCompleted method. The notifications are received by the subsystem, but are not applied to the client objects until the Update method is called on the channel. If the channel broke down for some reason, then an update will return an appropriate error.

During the call to Update, the client objects will be updated with whatever properties have changed on the server. If any new objects are either created on the server or if they now match the notification filter, then the collection will receive a call to the Add method and will be told if the reason for the notification is that the object now matched a filter or if the object is new.

Similarly if any object now does not match the filter, or if they have been deleted then the Remove method on the collection is called.

The objects are updated through direct calls to their properties. The updates will be bracketed by calls to the BeginNotifyChanges and EndNotifyChanges methods.

When the caller wants to stop receiving notifications, they release the INotificationChannel interface that they received.

Sample code that receives notifications for two fields from all local objects in a collection is shown just below. This sample code receives the changes for the Status and Name fields for all of the printers in the local collection. It is assumed that the printers are updated on the screen as a result of the query. Error Handling is omitted for readability.

```
class MyNotificationObject : public IImgNotificationObject
{
    //
    // Insert your favorite IUnknown implementation here.
    //
    STDMETHODIMP
    BeginNotifyChanges(
        IN    EImgNotifyUpdateReason    reason
        )
    {
        return S_OK;
    }
    STDMETHODIMP
    EndNotifyChanges(
        void
        )
    {
        //
        // Write my object state out to the screen.
        //
        return S_OK;
    }
    STDMETHODIMP
    GetRealObjectAddress(
        OUT   void                      **ppvObject
        )
    {
        *ppvObject = this;
        return S_OK;
    }
    IMG_ATTR_TABLE_FRIEND(MyNotificationObject, TypeMap);
private:
    BSTR            Name;
    ULONG           Status;
};
IMG_ATTR_TABLE_BEGIN(ClientJob, TypeMap)
    Type("Micrsoft.Printer.Basic"),
            Field(IMG_ATTR_FIELD(Name)),
            Field(IMG_ATTR_FIELD(Status)),
IMG_ATTR_TABLE_END
class MyNotificationCollection : public IImgNotificationCollection
{
public:
    //
    // Insert your favorite IUnknown implementation here.
    //
    STDMETHODIMP
    AddObject(
        IN    EImgNotifyAddReason       addReason,
        OUT   IImgNotificationObject    **ppIObject
        )
    {
        MyNotificationObject *pNotifyObject =
            new MyNotificationObject;
        //
        // Display notify object in the UI for the first time.
        //
        *ppIObhect = pNotifyObject;
        return S_OK;
    }
    STDMETHODIMP_(void)
```

-continued

```
            Remove(
                    IN      EImgNotifyRemoveReason  remoteReason,
                    IN      IImgNotificationObject      *pINotifyObject
                    )
                    {
                            //
                            // Remote notify object from the UI. And remove any
                                references to it.
                            //
                            pINotifyObject->Release( );
                    }
}
int main(void)
{
    IImgCommonData       *pICDI = NULL;
    IImgTypeMap          *pITypeMap = NULL;
    ImgGetDataInterface(&pICDI);
    Img::iatl::RegisterTypeMap(pICDI,
        IMG_ATTR_TABLE(MyNotificationObject, TypeMap),
&pITypeMap);
    IImgDataBatch        *pIBatch = NULL;
    MyNotificationCollection   *pMyCollection =
    new MyNotificationCollection( );
    pICDI->GetDataBatch(NonTransactional, &pIBatch);
    ULONG       ulIndex = 0;
    //
    // Find out about all local printers, with no filter.
    //
    pIBatch->RegisterNotificationCollection(NULL,
                                            "Microsoft.Printers",
                                            NULL,
                                            pMyCollection,
                                            pITypeMap,
                                            NULL,
                                            &ulIndex);
    pIBatch->Execute( );
    IImgNotificationChannel *pIChannel = NULL;
    EImgCompletionStatus status;
    HANDLE       hEvent = NULL;
    pIBatch->ResultNotificationCollection(uLIndex, &status,
    &pIChannel);
    //
    // Get a wait handle from the Notification Channel.
    //
    pIChannel->GetWaitHandle(&hEvent);
    //
    // Populate the channel, at this point the collection will get all the
    // callbacks necessary to populate it.
    //
    pIChannel->Populate( );
    do
    {
            //
            // This will get signaled whenever there is a change.
            //
            WaitForSingleObject(hEvent, INFINITE);
            //
            // We know that the notification collection and objects won't
            // be touched until we call update. Any errors would be returned
                on this call.
            //
            pIChannel->Update( );
    } while(1);
    pIChannel->Release( );
    pMyCollection->Release( );
    pIBatch->Release( );
    pICDI->Release( );
    pITypeMap->Release( );
    return 0;
}
```

Client Collections

One aspect of the CDI interface, namely, the choice to populate a client collection and client object rather than write the data into some sort of intermediate data object and propagate the data set carries with it some advantages.

For example, doing so allows notifications and data population to be treated very similarly. What this means from a client perspective is that client objects can be re-used very easily between these two cases. Further, doing so allows the client code to be extremely efficient. Specifically, once the data has been collected into a client object, it is referenced natively as an offset within a structure. If the data is stored in an intermediate collection, then either the client has to in turn copy the data into some client objects to manipulate it, or the data has to be retrieved each time from the collection.

Further, populating a client collection and client object limits failure conditions in the client code to when the data is populated, not when it is copied from the collection. This has the potential to substantially decrease the complexity of the client code. When an intermediary collection is used, there is a potential for failure whenever the data in the collection is accessed.

In addition, populating a client collection and client object allows multiple kinds of intermediate collections to be used. Essentially, this mechanism encapsulates a completely flexible builder pattern. This means that a generic "client" can build a type map dynamically and map it to any sort of intermediate collection it likes. This could be used to build a Data Set object for a managed data provider. Alternately, it could be used to build an XML view of the data. This can be done without any loss of fidelity or performance caused by the interjection of an intermediate dataset. Further, a related property is that populating a client collection and client object allows a client collection to actually be an access Adapter that prepares the data in a form that can easily be remoted. On the negative side, however, it can force the client object to expose accessors for each property that it wishes to retrieve.

Dynamic Type Maps

The illustrated and described embodiment can be utilized to address the situation when a user wants to have one object instance, but wants to be able to retrieve different fields dynamically from the server objects depending on the calling conditions. There are two cases where this could occur-one, when there is a concrete object with many properties, but the actual properties the caller wants propagated in a given call are dynamic; and, the other is when the caller truly wants to treat the data completely dynamically. Each has a solution in the illustrated and described architecture.

To solve the first problem, the illustrated and described embodiment uses the tags that are associated with each property to build a subset dynamic type map from the class. These tags can also be specified as part of the template library. The template library will retrieve a partial type map matching only the tags specified. This solution is shown in the code excerpt shown just below.

```
struct ClientPrinter
{
        enum FieldTags
        {
                Status,
                Name,
                Location,
```

```
            Comment
        };
        ULONG       Status;
        BSTR        Name;
        BSTR        Location;
        BSTR        Comment;
};
IMG_ATTR_TABLE_BEGIN(ClientPrinter, TypeMap)
    Type("Micrsoft.Printer.Basic"),
        Field(IMG_ATTR_FIELD(Status),       ClientPrinter.FieldTags.Status),
        Field(IMG_ATTR_FIELD(Name),         ClientPrinter.FieldTags.Name),
        Field(IMG_ATTR_FIELD(Location),     ClientPrinter.FieldTags.Location),
        Field(IMG_ATTR_FIELD(Comment),      ClientPrinter.FieldTags.Comment),
IMG_ATTR_TABLE_END
void
InitializeTypeMap(
    Void
    )
{
    IImgCommonData      *pICDI = NULL;
    IImgTypeMap         *pITypeMap = NULL;
    int_ptr             Tags[ ] = { ClientPrinter.FieldTags.Name,
                                    ClientPrinter.FieldTags.Comment };
    ImgGetDataInterface(&pICD);
    Img::iatl::RegisterTypeMap(pICDI,
                            IMG_ATTR_TABLE(ClientPrinter, TypeMap),
                            tags,
                            &pITypeMap);
    //
    // Do stuff with the type map.
    //
    pICDI->Release( );
    pITypeMap->Release( );
}
```

Figure 7:
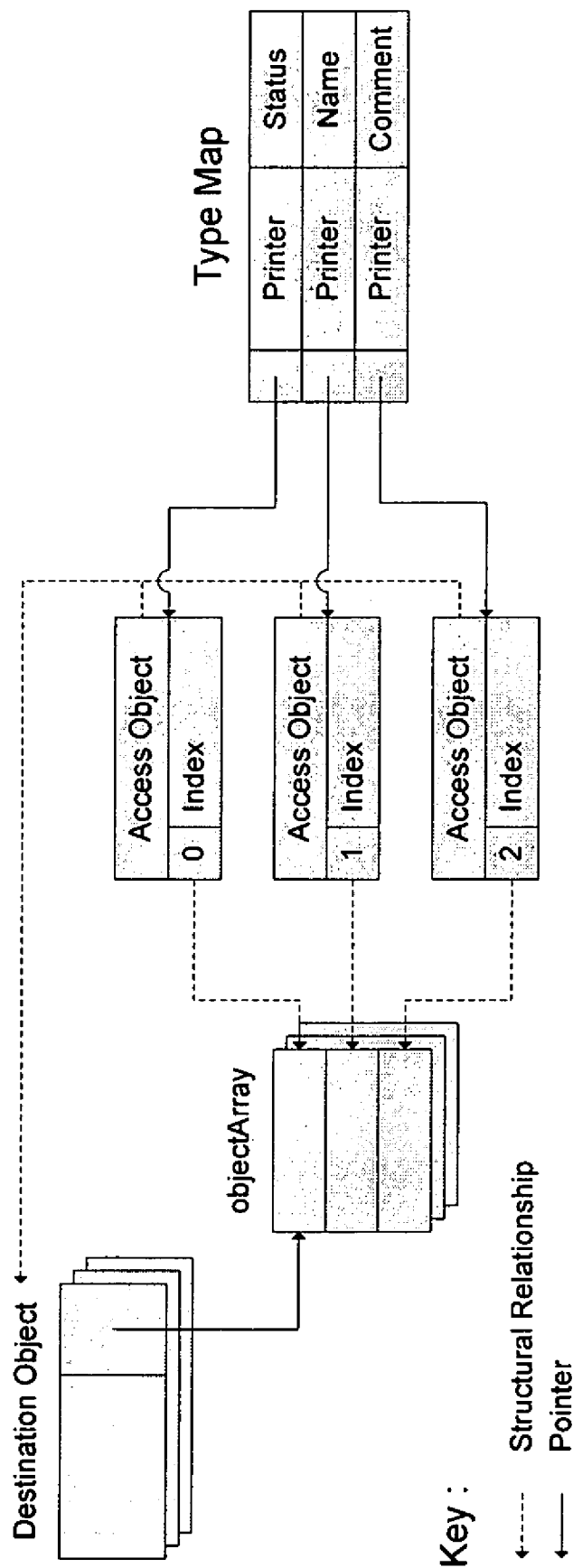
FIG. 7 is a block diagram of a dynamic type map in accordance with one embodiment.

Allowing a completely random set of completely run-time determined properties to be retrieved from a remote server can also be accomplished through the type map interface. In this case though, one cannot have just a set of properties bound to a class. It is in this case that the power and flexibility of the low level type map interface really comes into play. In this case, the caller can take advantage of the fact that every interface is also an object instance and use the variant type directly. This notion is shown in FIG. 7.

There, each interface actually points to an object, rather than to a static method or field. Each object maintains some sort of state about how it should manipulate the final destination object. In this case it maintains the index into the objects array that the destination objects maintain. The size of the destinations object's array is variable and both the delegate objects and type maps can be built dynamically. Thus, this mechanism allows to caller to bind to any source object, and allows any source object to be built on the fly.

In the illustrated and described embodiment, this mechanism is actually completely generic. There is no particular reason why the interfaces cannot participate in building an XML document, creating a dataset or writing data to the screen. It can also be used to build collections of objects in any form. This is extremely useful when bridging to the longhorn APIs or other data access APIs.

The code to implement this scheme is shown just below, including accessing one object through the batch interface (error handling omitted).

```
class DestinationObject
{
public:
        DestinationObject(
            int     arraySize
            )
        {
            m_apVariant = new ImgVariant[arraySize];
            m_apSize = arraySize;
        }
        ~DestinationObject(
            void
            )
        {
            for(int i = 0; I < m_apSize; i++)
            {
                ImgVariantClear(&m_apVariant[i]);
            }
            delete[ ] m_apVariant;
        }
private:
        friend class ObjectAccessor;
```

```
            ImgVariant    *m_apVariant;
            int           m_apSize;
};
class ObjectAccessor : public IImgAccessor
{
public:
        ObjectAccessor(
                Int            index,
                IImgCommonData *pICDI
                ) : m_index(index),
                    m_pICDI(pICDI)
        {
            m_pICDI->AddRef( );
        }
        ~ObjectAccessor(
                )
        {
            m_pICDI->Release( );
        }
        //
        // Standard IUnknown implementation of choice.
        //
        //
        // IImgAccessor
        //
        STDMETHODIMP
        Function(
                IN      void              *pObject,
                IN OUT  ImgVariant        *pData,
                IN OUT  ImgExtraCopyData  *pExtra
                )
        {
            DestinationObject *object = reinterpret_cast< DestinationObject*>(pObject);
            return m_pICDI->VariantCopy(&object->m_apVariant[m_index]);
        }
private:
        int              m_index;
        IImgCommonData   *m_pICDI;
};
int main(void)
{
    IImgCommonData   *pICD = NULL;
    CoCreateInstance(CLSID_ImgCommonData,
                     NULL,
                     CLSCTX_INPROC_SERVER,
                     IImgCommonData,
                     reinterpret_cast<void **>(pICDI));
    //
    // Build a mechanism to access Microsoft.Printer.Basic:Location,
    // Comment and Status.
    //
    ImgFieldAccessor Accessors[ ] =
    {
        {"Microsoft.Printer.Basic", "Location",   ImgVariantType, new ObjectAccessor(0, pICDI)},
        {"Microsoft.Printer.Basic", "Comment",    ImgVariantType, new ObjectAccessor(1, pICDI)},
        {"Microsoft.Printer.Basic", "Status",     ImgVariantType, new ObjectAccessor(2, pCDI)},
    };
    ImgClassDescription ClassDescription =
    {
        { COUNTOF(Accessors), Accessors },
        { 0 },
        { 0 },
    };
    IImgTypeMap      *pITypeMap = NULL;
    IImgBatch        *pIBatch = NULL;
    ImgGetDataInterface(&pICD);
    pICD->RegisterTypeMap(&ClassDescription, &pITypeMap);
    //
    // Now we can use the type map on Destination Object.
    //
    pICD->GetBatch(&pIBatch);
    DestinationObject destObj(3);
    pIBatch->GetObjectData(L"{8e677748-cd3e-440f-ae30-eecec8c8017f}\62756091-4744-4896-b077-
73ad0974d923}, pITypeMap, &destObj, NULL);
    pIBatch->Execute( );
    //
    // Now. . . destObj will have the Location, Status and Comment in it.
    //
    pICD->Release( );
    pITypeMap->Release( );
```

```
    pIBatch->Release( );
    Accessors[0]->pIAccessor->Release( );
    Accessors[1]->pIAccessor->Release( );
    Accessors[2]->pIAccessor->Release( );
    return 0;
}
```

Attribute Template Library and Inheritance

One of the interesting aspects of the template library is that it supports inheritance (including multiple inheritance) between objects. This is less useful on the client than it is in the server. On the server, this allows common functionality and the corresponding fields and methods to be stored in a base class and pulled into the derived class as necessary.

In addition to supporting inheritance, the library also correctly handles virtual methods. That is, virtual methods in the base class can be referenced in a base class type map and then will correctly call the derived class in the derived type map. An example of a working set of types is shown in the code excerpt just below. This code just shows the structure of the classes-any implementation is omitted for brevity.

```
struct TBaseClass
{
    BSTR
    Name(
        void
        );
    HRESULT
    set_Name(
        IN      BSTR        bstrName
        );
    virtual
    ULONG
    cJobs(
        void
        );
    virtual
    void
    set_cJobs(
        IN      ULONG       cJobs
        );
    ULONG                               m_Status;
};
IMG_ATTR_TABLE_BEGIN(TBaseClass, Img::iatl::TypeMap)
    Type(L"BaseClass"),
        Field(IMG_ATTR_FIELD(m_Status), L"Status"),
        Field(IMG_ATTR_METHOD(TBaseClass::Name), gGet),
        Field(IMG_ATTR_METHOD(TBaseClass::set_Name), L"Name", gSet),
        Field(IMG_ATTR_METHOD(TBaseClass::cJobs), gGet),
        Field(IMG_ATTR_METHOD(TBaseClass::set_cJobs), L"cJobs", gSet),
IMG_ATTR_TABLE_END
class TBaseClass2
{
public:
    IMG_ATTR_TABLE_FRIEND(TBaseClass2, Img::iatl::TypeMap);
protected:
    BSTR
    get_Location(
        void
        );
    void
    set_Location(
        IN      BSTR        location
        );
    virtual
    HRESULT
    get_Comment(
        IN  OUT BSTR        *pComment
        ) = 0;
    virtual
    HRESULT
    set_Comment(
        IN      BSTR        Comment
        ) = 0;
private:
    ULONG       ExtraStatus;
};
IMG_ATTR_TABLE_BEGIN(TBaseClass2, Img::iatl::TypeMap)
    Type(L"BaseClass2"),
        Field(IMG_ATTR_FIELD(ExtraStatus)),
```

```
            Field(IMG_ATTR_METHOD(TBaseClass2::get_Location), L"Location", gGet),
            Field(IMG_ATTR_METHOD(TBaseClass2::set_Location), L"Location", gSet),
            Field(IMG_ATTR_METHOD(TBaseClass2::get_Comment), L"Comment", gGet),
            Field(IMG_ATTR_METHOD(TBaseClass2::set_Comment), L"Comment", gSet),
IMG_ATTR_TABLE_END
class TDerived : public TBaseClass, public TBaseClass2
{
public:
    IMG_ATTR_TABLE_FRIEND(TDerived, Img::iatl::TypeMap);
    //
    // Override the implementation of set_cJobs.
    //
    void
    set_cJobs(
        IN          ULONG           cJobs
        );
protected:
    //
    // Implement get and set Comment.
    //
    HRESULT
    get_Comment(
        IN OUT BSTR         *pComment
        );
    virtual
    HRESULT
    set_Comment(
        IN          BSTR            Comment
        );
    ULONG                           ChainedJobs;
    ULONG                           Attributes;
};
IMG_ATTR_TABLE_BEGIN(TDerived, Img::iatl::TypeMap)
    Type(L"Derived"),
        Field(IMG_ATTR_FIELD(ChainedJobs)),
        Inherits(IMG_ATTR_INHERIT_TABLE(TBaseClass)),
        Field(IMG_ATTR_FIELD(Attributes)),
        Inherits(IMG_ATTR_INHERIT_TABLE(TBaseClass2)),
IMG_ATTR_TABLE_END
```

In this example, the derived class overrides one virtual method and implements two pure methods. All of the other fields and methods are pulled in from the base classes. The derived class's methods are still called even though the definition of the table is actually pulled in from the table defined in the base class.

The derived table pulls in the definitions of the base class tables with an "Inherits" field in its table. Any extensions to the base classes and base class tables will be immediately reflected in the derived class's tables. Thus the tables can be shown to implement true multiple inheritance.

Cursors

A cursor is an interface that allows a caller to retrieve data from the server a chunk at a time, rather than as a single request. This is especially useful when there are a large number of objects on the server that need to be enumerated. This reduces the amount of data that must be returned across the network in one call and it reduces the working set on the server side. For very large collections of objects, it can also allow the client to avoid having to store all of the objects in memory. Instead, the client can maintain a cursor into the table and retrieve more rows as required. In this particular implementation example, cursors are not currently implemented in the CDI for a number of reasons:

The number of objects maintained on the server isn't nearly the same order of magnitude as that stored in a typical database. It is extremely unlikely that a client will not have sufficient memory to store its copy of the data.

Many objects on the server are by necessity active because most queues will receive jobs. Thus, working set is less of a consideration than in a database.

The network traffic can be arbitrarily reduced by doing the query in two passes, an initial query which retrieves, the canonical name for each object and then a second set of GetObjectData calls to retrieve the data for each object. Since the GetObjectData calls can be chunked together arbitrarily you don't need a network round trip to retrieve data from each object.

Since the caller can specify an accurate query filter, the size of the data sets can be made much smaller. For example, the client spooler can enumerate on jobs belonging to the given user, rather than having to enumerate all jobs and then filter out those that don't belong to the given user.

Since the caller can specify precisely what fields they want to retrieve, the amount of data can be much reduced over the current system with its inflexible info level system. For example, currently to retrieve the number of jobs in a queue, the caller must specify a PRINTER_INFO_2, which also contains the default DEVMODE and the security descriptor.

The interface is currently stateless at the wire level except for notifications. Cursors tend to result in more server state. It might be that the overhead of maintaining the state necessary for a cursor exceeds the benefit derived from it, especially given the number of mitigations.

Nonetheless, it might become desirable to implement cursors at some point in the system, especially if the print system is scaled to do document archival, or if a very large print server can be made to handle a very large number of queues where a small number are active (avoiding pulling objects into memory unnecessarily becomes very important in this scenario). This section describes a mechanism that would result in a fairly cheap forward only cursor for queries.

With regard to notifications, consider that notifications would require no change to the client interface. The wire interface would send the populated data to the client in chunks and then would start updating the client objects. For optimal performance, the updates might be interleaved with the original populate.

With regard to a client cursor, consider the following. One goal of the illustrated and described system is to maintain a stateless wire protocol to whatever extent possible. Hence, we define what set of objects are retrieved by a cursor and then provide an implementation that fulfills these goals. Reasonable semantics for a cursor are as follows:

The cursor moves forward only.

The set of objects that will be retrieved by the cursor is the number of objects matching the query when the cursor is created, less the objects that are deleted subsequently. It does not include any objects that are created after the cursor is first created. This is to prevent a slow client from never terminating against a server with a rapidly changing set of objects.

The described solution is to keep an ever increasing sequence count with each object. When the cursor is established, the current maximum sequence count number is remembered by the client. The set of objects are returned and the maximum sequence count of the last object is remembered. When the next set of objects is retrieved it amounts to this query: retrieve the next CHUNKSIZE objects where Timestamp>last_max and Timestamp<initial_max.

It might turn out that the overhead of executing this query for each request on the server exceeds the average overhead of maintaining the necessary connectivity to maintain the cursor context on the server. A compromise solution is to keep a cache of cursors on the server identified by a GUID. The client submits the timestamps and the GUID to the server. If the server side cursor still exists in cache, that state is just used. Otherwise, it is recovered by executing the timestamp query and re-inserted in the cache. This allows the server to discard the state cheaply for slow clients.

If one assumes that the main goal is to reduce the size of the individual network requests and to reduce the working set required on the server for queries, then the CDI interface would not necessarily require any changes, the Remote Access Adapter and the Local Access Adaptor would just use a cursor to the server side transparently when the client issues a query.

For very large datasets, the client might want to manipulate the cursor itself so that it does not have to keep all of its state in memory at once. In this case, an interface representing the cursor would be retrieved from the CDI interface. It would not be necessary to make this call batched since by implication a single cursor retrieves a large amount of data.

Friendly Name Resolution

At various points the notion of converting a friendly name to a canonical name has been discussed. The friendly name is a human readable version of an object instance, for example, the notion that there is a server called server.mydomain.org is a friendly name. The canonical name is a completely unambiguous name that identifies the protocol use to communicate with the server, the physical server on which the logical server is hosted and a completely unambiguous reference to the logical server object instance. For example, the above friendly name might correspond to the following canonical name: "{63315ca9-bef6-4cc5-9152-05e369d3d691} \www.realhost.net\{4b6e956-dee0-46d0-b82c-7ffc8f814e95}\{f091b5a1-ad2a-4dfe-9d37-9592b1ae2512}". The canonical name has the advantage of being completely unambiguous, which is excellent for a computer. However, it is not readily input by a human.

Given a canonical name, it is easy to determine the friendly name of the object if this is relevant. The object will simply have a property such as "Object:Name" that can be retrieved from the object. However if the system has only the friendly name then it must be able to determine the canonical name. The application callable side of this interface is discussed in this section. Implementing a name resolver is discussed below in the section entitled "Friendly Name Resolution Plug Ins.". The client friendly name resolution interface is shown, in accordance with one embodiment, just below.

```
interface IImgCommonData : IUnknown
{
    HRESULT
    GetFriendlyNameResolver(
        [out]               IImgFriendlyNameResolver **ppINameResolver
    );
}
interface IImgFriendlyNameResolver : IUnknown
{
    HRESULT
    ResolveName(
        [in, string]        const wchar_t               *pszName,
        [in, string]        const wchar_t               *pszClass,
        [out]               IImgCanonicalNameIterator   **ppIterator
    );
    HRESULT
    BeginResolveName(
        [in, string]        const wchar_t               *pszName,
        [in, string]        const wchar_t               *pszClass,
        [in, unique]        IImgCallCompletion          *pICallCompletion,
        [in]                void                        *cookie,
        [out, unique]       IImgAsyncResult             **ppIAsyncResult
    );
    HRESULT
    EndResolveName(
        [in]                IImgAsyncResult             *pAsyncRes,
        [out]               IImgCanonicalNameIterator   **ppIterator
    );
    HRESULT
    RemoveName(
```

```
        [in, string]        const wchar_t           *pszName,
        [in, string]        const wchar_t           *pszClass
        );
}
interface IImgCanonicalNameIterator : IUnknown
{
    HRESULT
    Reset(
        void
        );
    void
    Next(
        void
        );
    BOOL
    IsDone(
        void
        );
    IImgCanonicalName *
    Current(
        void
        );
}
```

When a caller wishes to obtain a friendly name resolver, they call the GetFriendlyNameResolver method on the IImgCommonData interface. The friendly name exposes only two logical methods (and an asynchronous calling pattern for one of them):

ResolveName

Given the name to be resolved, e.g. "server.mydomain.org" and the class of the name, e.g. "Server", the name resolution interface calls the friendly name resolver plug-ins and returns all the valid results returned by the plug-ins as an IImgCanonicalNameIterator interface. The name iterator allows the caller to retrieve all the canonical names that correspond to the friendly name. The reason for allowing multiple canonical name returns is that the same object might be visible via different paths. For example, the same server might be accessible via both SOAP and RPC.

The ResolveName method can take a long period of time since it might have to query multiple protocols to see how a particular object can be accessed. Thus, the interface also provides an asynchronous invocation pattern in the form of the BeginResolveName and EndResolveName methods. These use the same asynchronous calling pattern as used by the batch BeginExecute and EndExecute methods. The caller can either specify a callback interface or can get a system wait-able handle returned via the IImgAsyncResult return. They will be notified when all of the corresponding canonical names have been resolved.

RemoveName

The name resolver maintains a cache of resolved names to friendly names since name resolution is potentially very slow and expensive. The cache will automatically be flushed over time. And if any name resolution subsequently fails to resolve the same names as are in the cache those name associations will be removed. The behavior is that after a certain amount of time, a name is considered stale. If the caller requests the name again, the stale name is returned by the name resolver, but it issues another round of name resolution to the name resolver plug-ins, if none of them return the name, the name will then be removed from the cache. This provides a very fast resolution on names, but it could result in a stale name binding being returned for a period of time.

The caller might resolve a friendly name and then independently determine that the name is stale since the canonical name fails when it is accessed via CDI. If they were to request the same friendly name again, they might get the same stale name back. In order to prevent this, the stale name can be explicitly removed from the cache through the RemoveName method. If the caller doesn't do this, the name will eventually be cleared, it is an optional optimization.

Extended Object Behavior

The goal of the previous section is to present the interface and basic concepts of the CDI. The goal of the presentation was to expose it mainly from a usage stand point. The interface as presented in the previous sections is powerful enough to allow any application writer to get, set, query and receive notifications for objects in the print system. The focus of this section is to present the extra behavior that can be exposed by objects to enable new security and discovery capabilities.

Object Factories, Object Cloning

Figure 8:
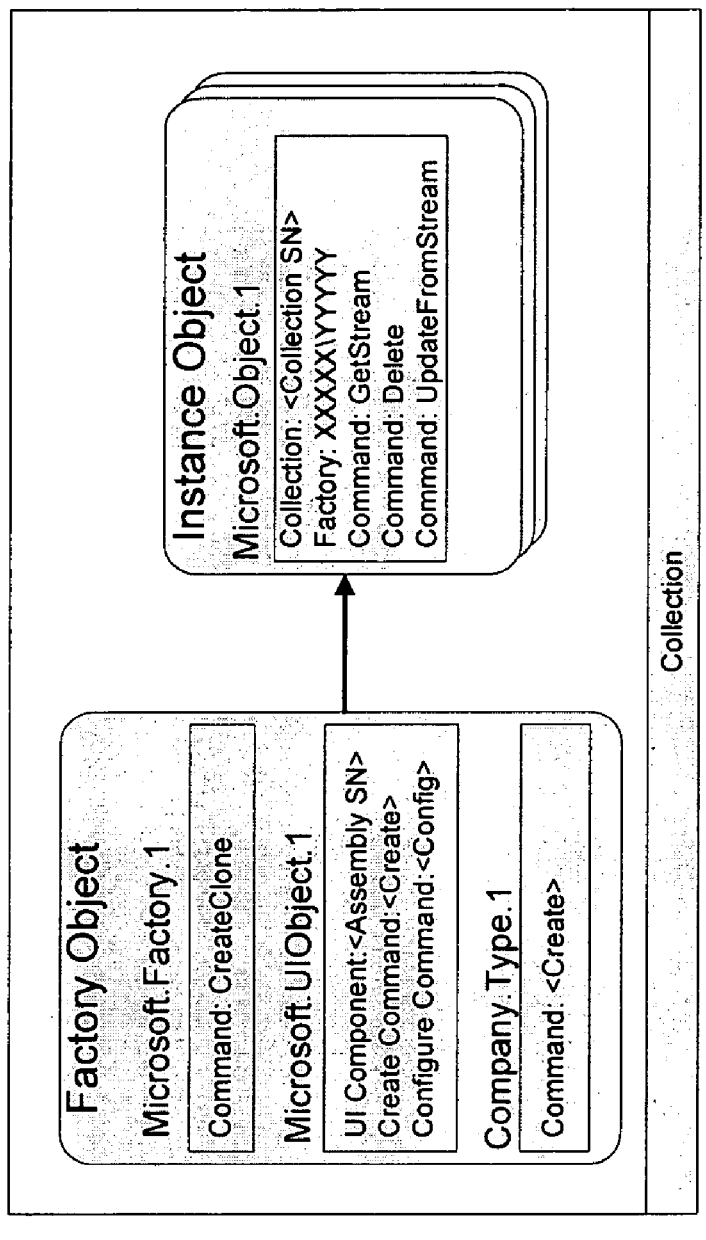
FIG. 8 is a block diagram that illustrates object creation and cloning in accordance with one embodiment.
Figure 8:
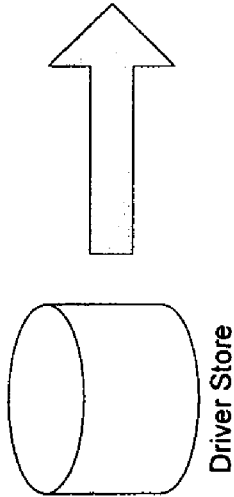

This section deals with the mechanism that can be used to create new objects in the system, transfer these objects (if applicable) to another system and allow a new object creation user interface (UI) to be inserted. All objects in the system except factory objects should support this mechanism. The mechanism is shown in FIG. 8 and serves as the basis for the discussion below.

The object creation and cloning mechanism assumes that there is a driver store that can:
1. Provide a UI assembly to the client or the server based on the UI assembly strong name.
2. Provide a collection assembly to the server side based on the collection assembly strong name.

The precise definition of a strong name and how it relates to versioning is another discussion. But, for contextual purposes, consider the following.

A strong name is a name which both uniquely identifies the actual instance of the assembly which is in use and the publisher of the assembly in one moniker. One implementation of this is to sign the contents of the assembly using Public Key Cryptography and then take a cryptographic hash of the signature (typically an MD5 hash) and embed the hash (or a part of the hash) into the name. Not only is this name actually tied to the contents of the assembly, but it is also tied to the publisher of the assembly. There is no known technique whereby someone could create another assembly with different functionality and use my assembly's strong name without creating a very large number ($10^{38}$ for a 128 bit hash) of assemblies and attempting the entire process on each one.

The essential idea is that each collection provides a well know object instance that acts as the factory object for a set of object instances. Since the construction parameters for a new object cannot be known in advance, the object implements a custom type (Company.Type.1 in this example) with a command called Create( ) that creates a new object instance. If the caller knows the factory object and the factory type, they can create an object of that class in the new spooler.

Cloning is supported by the object supporting the Microsoft.Object.1 type. The fields supported by the object include the Collection SN, the factory object instance used for its creation and three commands, GetStream, Delete and UpdateFromStream. GetStream retrieves the contents of the object into a stream, Delete deletes the object, and UpdateFromStream updates the object's state based on the stream passed to it. The object can support any type of stream, but for interoperability reasons, the stream should ideally be XML.

When an object is to be cloned, the object instance is queried for its collection SN and Factory object instance. These are stored in a stream, and subsequently the state of the object as represented by a stream is stored.

To restore an object, the collection is retrieved from the Driver Store and the factory object is located. The factory object is the passed the remainder of the stream through the CreateClone Command. This causes the factory to create an identical object instance.

Note, that all objects in the system should support decoupled UI creation and cloning. However, for brevity the factory objects and cloning interface are not shown in the remaining sections to simplify the discussion and diagrams.

Hierarchy

Hierarchy typically accomplishes two goals. First, it subdivides a search space to allow for efficient location of objects. The division of the CDI into multiple collections, the ability to only load a collection if it supports the given class and the ability to direct a set of actions to a given server already accomplishes this goal. Second, it provides for manageability and discovery of heterogeneous objects by allowing the system or an administrator to group objects in a logical hierarchy. Hierarchy enables discovery since every object is located somewhere in the hierarchy. Thus a browser can be built that allows a user to drill down into each object in turn until all objects in the system have been discovered. The hierarchy can also provide a view of the security of the system by allowing security changes to be applied to a sub-tree of objects by one administrative action. This mechanism is analogous to how the file system implements security.

Hierarchy is typically not useful for showing the relationship between objects. A pure hierarchy only allows an object to be located under precisely one other object. Thus, a job cannot belong to both a printer and a server. Hierarchy also cannot efficiently show a many to one relationship between objects. A relational model is much more powerful for indicating object relationship. The CDI effectively allows this through the QueryBase mechanism of the Query action on the batching interface (which returns the objects that can logically be considered to be contained by another object).

Since the first goal of hierarchy is already accomplished by the CDI and remote access adapter routing mechanism and since the relational mechanisms of the CDI are more powerful anyway for representing object relationships, we only require a method to support administration and discovery of heterogeneous objects in the system. Note that since the existing model is powerful enough for a large proportion of cases, not all objects will necessarily support hierarchy. The default persistable store provided by the service layer—will support hierarchy automatically. Thus, the simplest implementation for local objects will automatically support hierarchy. There will be cases where we will support discoverable hierarchy, but not modifiable hierarchy. For example, a remote Adapter supporting the current spooler RPC interface might allow a client to discover printers under servers and jobs under printers, but won't allow the organization to be changed.

Figure 9:
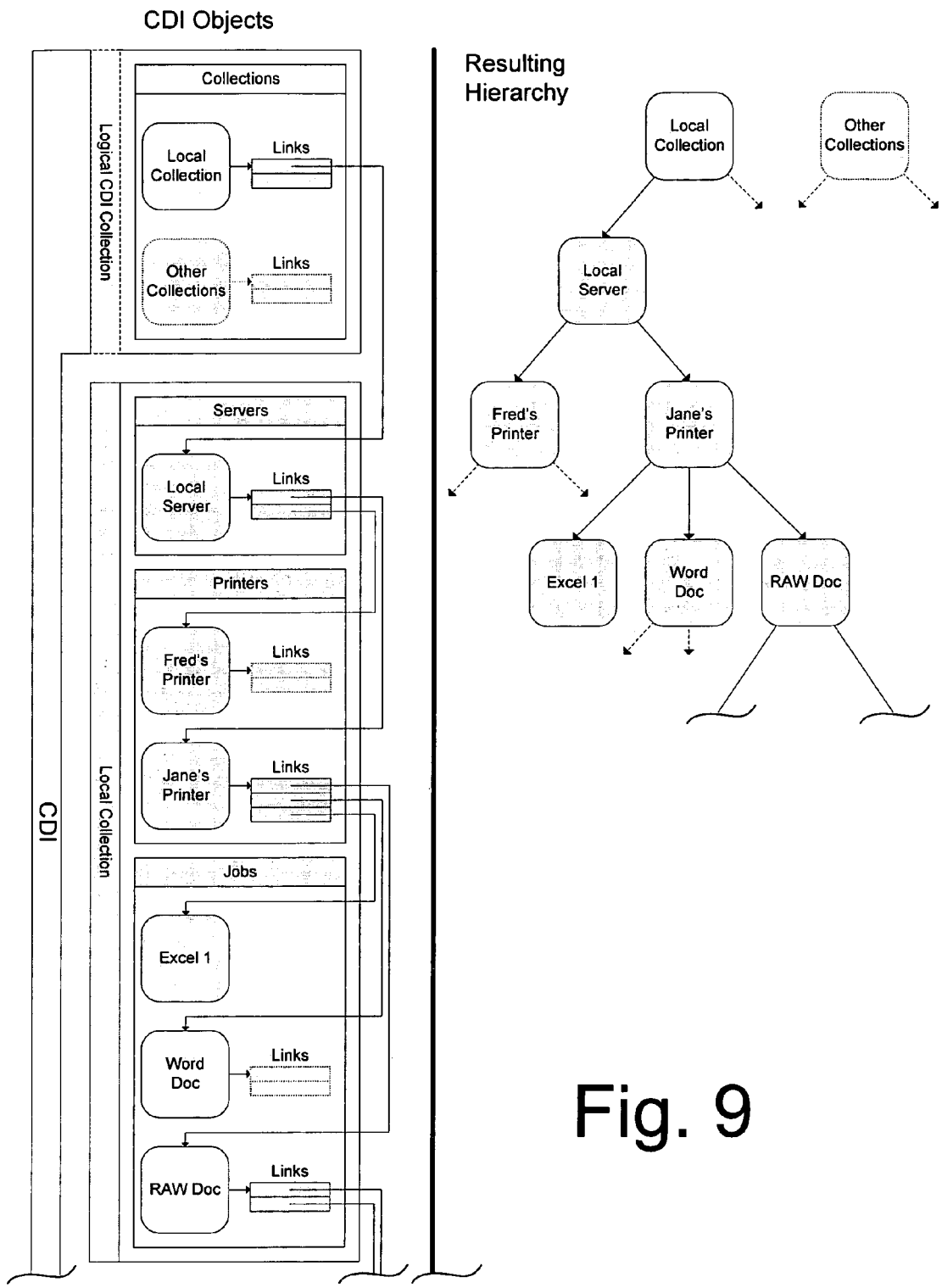
FIG. 9 is a block diagram that illustrates an abstract hierarchy in accordance with one embodiment.

Hierarchy can be expressed by introducing a new Class called the Link class which has one type, the link type with one property Object which is the canonical name of an object which can be considered "beneath" the current object in some way. When one wants to find out which object instances can be traversed to hierarchically from the current class, one queries for the Links class with the object instance that is being traversed from as the query base. An example of a number of objects set up in a hierarchy is shown in FIG. 9. This excludes the logical system object, which will be the root object on each and every machine.

The implementation of the links class query will be provided automatically by the persistent object collection service. But, any collection that wants to expose a discoverable hierarchy can populate the links query. For example, a collection that exposes DS objects could enumerate the children of each DS object and then populate the Distinguished Names of each object into the links tab when the parent object is enumerated.

Security and Hierarchy

Hierarchy provides for discoverability and security. The CDI provides a security agent which, when the security descriptor of an object is changed, will run through child objects to enforce security inheritance rules. Security will automatically be handled by the persistent object collection service and the security agent will run automatically on objects in this collection.

A special object called a logical group will be provided that an administrator can place any set of objects under. This allows the administrator to change the ACLs on a logical group and have them automatically apply to all objects under that logical group. This allows an administrator to apply an administrative hierarchy on their server that they find useful and then apply the security rules to that hierarchy.

Security and Class Mix-Ins

As well as controlling security by hierarchy, the system will also allow security to be controlled by class. This allows features such as providing Creator/Owner administrative access to all jobs created on the system. In the current system, the class rules are hard coded into the system, in the future; mix-ins will be available for any class.

Figure 10:
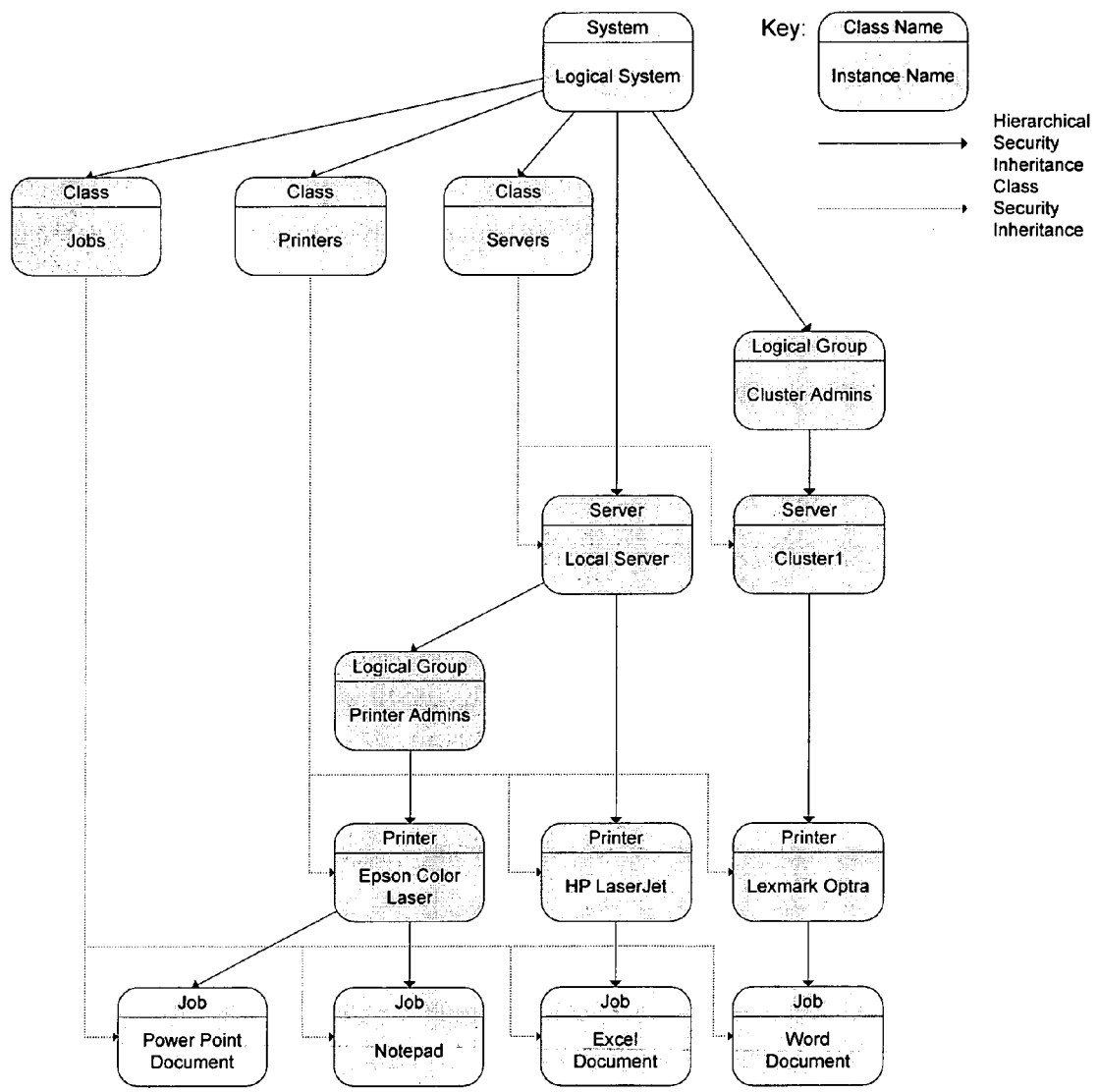
FIG. 10 is a block diagram that illustrates a class hierarchy and security in accordance with one embodiment.

As shown in FIG. 10, class inheritance is accomplished by exposing editable class objects in the security hierarchy. These will each contain initially a default Security Descriptor that will apply to each class on creation. Like all other objects they will inherit their descriptor from the logical system object that is used as the base object for the entire system. When an object of the appropriate class is created, both the parent object and the class object are used to derive its security descriptor. FIG. 10 also shows the effect of logical groups on the hierarchy. Here the administrator has created two logical groups, one to be able to control the access to any cluster server and another to control the access to a printer on the local server object. Although only one object is shown in each case here, any number of objects could be placed under each logical group.

Metadata

In the illustrated and described embodiment, the CDI provides the ability to bind any object to a remote object, but the caller must know the fields and commands that the object supports before it binds to it. Most of the time, the client knows the server objects and the interfaces that they support. If the client did not, then it would not be able to function correctly since it requires a-priori knowledge of the server object to function. The interface is geared towards optimizing this behavior, and classes that precisely know the context in which they will be called do not need to implement any metadata mechanism.

However, there are also cases where the client does not have a-priori knowledge about the class it is manipulating. For example, the client might be an access adaptor that translates the CDI calls into a Managed Data Provider interface. In this case, the data requested by its client cannot be known a-priori and the server objects that it is communicating with also cannot be know a-priori. Or, the client might be a generic administrative UI that allows all of the objects on the client or the server to be browsed and manipulated regardless of the object types.

To this end, the illustrated and described embodiment provides standard system types that allow a caller to query an object instance for its metadata. These types are the Type, Property, Command and Parameter types. Classes implemented using the collection adaptor service will automatically gain full metadata support for free. This will be retrieved from the server object type map that they will supply for each of their classes.

Figure 11:
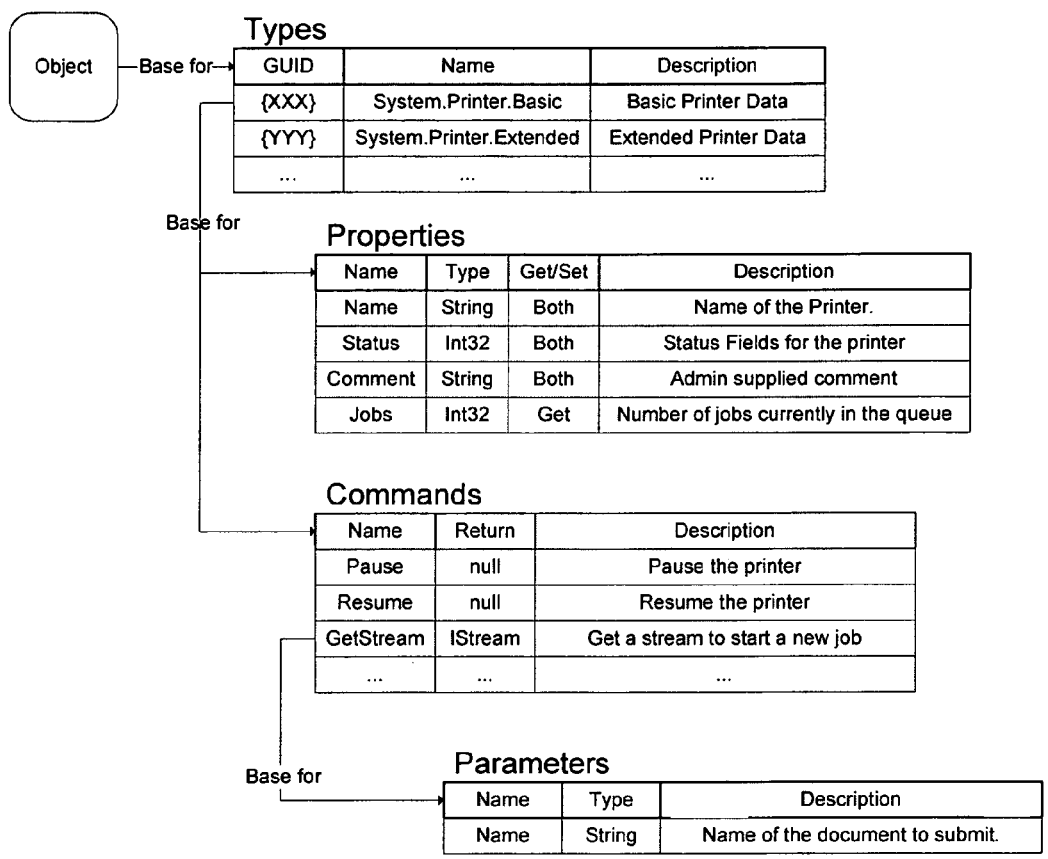
FIG. 11 is a block diagram that illustrates metadata that is retrieved from an object in accordance with one embodiment.

The types that can be queried with the object as a base to retrieve metadata are shown in FIG. 11.

Metadata is retrieved by first querying for the Types type with the object as the base of the query. The Types type provides a list of all of the types supported by the logical object instance. Since it is possible that in the future the system will allow objects to be embedded in or extend other objects, the types will include all of the aggregated types for that object instance, not just the underlying basic object. Each Type type can then, in turn, be queried for the commands or properties it supports. And, then each command can be queried for the parameters that it supports.

Query Bases

Query bases are an unusual design aspect in an otherwise un-hierarchical system. This section discusses why they are implemented at all and how they map to relational queries.

A query base specifies a source object, which the instances of the class being queried can be considered "Under" by some measure. This is provided for a number of reasons. First, it allows an enumeration of sub-elements to be constructed by someone who otherwise does not know how to express the relationship as part of a query. Second, it maps very well to down-level systems that are based on enumerations. The base of the query becomes very naturally the parent object in the enumeration. Thus, for down-level objects, a query base and a filter on the object state is a natural way to implement queries. Third, for objects that have highly variable composition (for example the metadata stored by an object), it is more logical to treat the query as a sequence of enumerations from a parent object.

However, query bases need some manipulation to map to a relational query. Fortunately, this is relatively easy to accomplish.

| Name | Server (class = "Server") | Printer (class = "Printer") | Description | Size |
|---|---|---|---|---|
| Fred's Job | {SSSS} | {PPPP} | Small Job | 120 KB |
| John's Job | {SSSS} | {QQQQ} | Large Job | 300 KB |
| Mary's Job | {TTTT} | {RRRR} | Largest Job | 1 MB |

For illustrative purposes, the table just above illustrates a number of jobs in a print queue. There are two fields (implemented as foreign keys in the underlying database) that store the canonical name of the object with which the job is associated. Each column that references a remote object knows the remote object class.

When a query comes in for a particular base object, the class of the object is correlated to a logical field in the object and then the query is extended to include this field having the correct value.

For example, if a query came in for Base="{SSSS}", Base Class="Server", with the query string "Jobs:Size<150 KB" then this would be translated to the following query:

Jobs: Server="{SSSS}" AND (Jobs: Size<150 KB).

This would return the correct result, Fred's Job. This translation will be performed automatically in the collection adapter service. It will require slightly more metadata in the server object type map since we will need to know what fields can serve as query bases and what classes they correspond to.

CDI Implementation

The previous section describes the behavior that is expected from objects and describes the interface exposed to clients. This section describes the implementation of the server side of the CDI. It describes the services provided by the CDI, and the plug in model.

Figure 12:
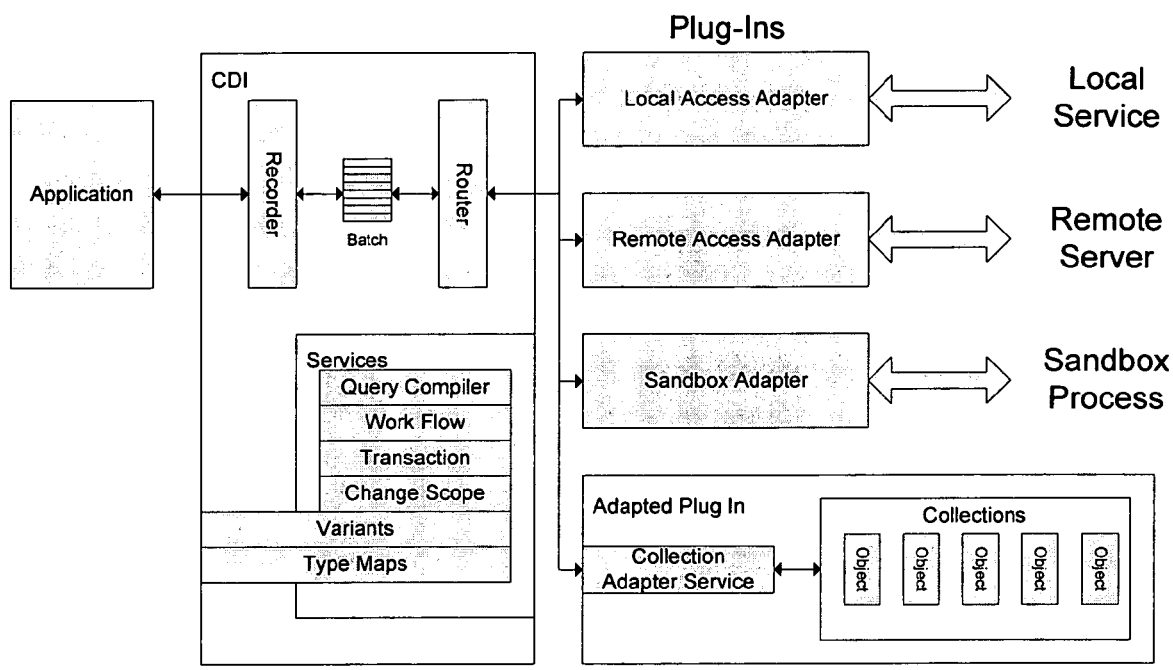
FIG. 12 is a block diagram of exemplary components of a common data interface in accordance with one embodiment.

FIG. 12 shows the major components of the CDI, as well as various plug-ins that are inserted into the system. Preliminarily, a description of each of the major components will be provided and then, a detailed description of the components in the CDI box itself will be provided. The collection adapter service is provided by the system, but it is considered a separate service hosted by the plug-in and is not part of the CDI per-se. The collection adapter service is discussed in the next section.

The Application

The interface to the application has been the primary focus of the previous sections. The application requests a batch interface from the CDI, records a number of actions and then executes them. When the execution is complete, the application can get the results.

The Router

Executing the actions results in the batch being routed by the router and passed to the plug-ins. The router finds contiguous ranges of the batch that are addressed to the same plug-in and passes those ranges to the plug-in in one call. Thus, the plug-in can still preserve batching behavior itself. Depending on the semantics invoked by the application, the sections can be passed to the plug-ins in parallel, sequentially or a transaction object can be associated the batch to allow the plug-ins to coordinate a transaction.

The Plug-Ins

The plug-ins are the interface exposed by a DLL in conjunction with the DLL manifest and configuration information. A single DLL can expose one or more plug-in interfaces. In the illustrated and described embodiment, the plug in interface consists of one factory interface with one method, and the plug in interface (IImgBatchCollection) with only two methods—AsyncProcessRequest and Shutdown. The plug-in interface still receives its operations as a batch. It is thus the logical interface to use for remoting to other systems that also support batches. To this end, in the illustrated and described embodiment, the following plug-ins are provided: a Local Access Adapter, a Remote Access Adapter, a Sandbox Adapter, and an Adapted Plug-in, each of which is discussed separately below.

The Local Access Adapter provides access to the local service or a per-user service. Currently this uses asynchronous COM, but there is no particular reason why any other remoting mechanism could not be used.

The Remote Access Adapter provides access to a remote machine and will largely use the same mechanisms as the Local Access Adaptor, with some differences to reduce per-client state on the server.

The Sandbox Adapter is used to preserve the work of the application insofar as grouping the requests into batches. This also means that the same universal plug-in model can be used in-proc or out-of-proc components, and even that we can sandbox system components if we wish. All parts of the system aside from the CDI will be exposed as plug-ins.

The Adapted Plug In is extremely simple in form, but it requires the plug-in to interpret the queued up batch operations, in an asynchronous call, which can be complex. For this reason, the Collection Adapter Service (CAS) is provided. The Collection Adapter Service allows multiple object collections (IImgObjectCollection) of objects (IImgObject) to be plugged into it and it, in turn, interprets the batched calls and translates these into calls on the supplied collections and objects. The Collection Adapter Service provides efficient handling of both synchronous and asynchronous implementation of these interfaces. The collection interface is broad enough that it can be used to access down-level protocols. There is no loss of performance in these cases since they typically do not support batching.

The Services

In the illustrated and described embodiment, the CDI provides a set of services. Most of these are only accessible from plug-ins. These services are public and are equally exposed to the CAS and any other plug-in. This allows independent software vendors or independent hardware vendors who find the CAS too limited to attain the same functionality themselves. An explicit goal is to allow the CAS to solve most scenarios and, all of the system supplied objects will use it. The services provided by the CDI include a query compiler, work flow, transaction, change scope, variants and type maps, each of which is separately discussed below.

The query compiler is capable of compiling the queries supplied by the application into one of two forms, a parse tree and filter. The parse tree is useful if the plug-in wants to translate the query into a query of another form—which is easier than trying to re-parse the query yourself because brackets and operator precedence will have been resolved and some basic well-formed-ness checks will have already been performed by the parser. The filter can be bound to an object and provides a method—"DoesMatch" that allows a caller to check whether a given object's state matches the query that was passed in.

The workflow is an interface that is instantiated whenever the application executes a call into the CDI. It corresponds to the logical execution of a user action. A work flow can schedule work, and will notify work items associated with it when the work flow is cancelled (typically because the original call from the user is cancelled). A work flow can keep track of a set of tokens to detect and prevent recursion. When a plug-in wants to make a call into the system as a result of a call from the CDI, it must use the same work flow as in the originating call. It does this through a special server-side only call (IImgCommonDataServer::RecurseDataBatch).

When performing a recursion, it must insert a token into the flow that it can use later to check if the same operation re-occurs on the same flow, and hence back out of the recursion. The work flow will also keep track of the original caller's token. When a plug-in asynchronously and independently calls into the CDI, it can do so either through the client interface, or it can create its own work flow and call RecurseDataBatch.

If the caller requests a transaction, this object is created and associated with the batch. The transaction provides a mechanism to associate one transactional collection and a set of dependent items with the transaction. It provides both a synchronous and an asynchronous interface to the transaction. When the batch finishes executing, the transaction is committed. The results are sent to the store and if the store updates correctly, the dependent items are run. In order to qualify as a dependent item, an item must not be able to fail the commit request. This is used to make live in-memory objects dependent on a state change being propagated to the store. If the plug-in wants to extend the transaction to include other objects (for example, in order to implement a "Delete" command that deletes other objects in turn), then it can specify the same transaction when calling back into the CDI via RecurseDataBatch. All the changes through each recursion will be held pending until the outermost batch completes successfully.

A change scope pertains to server side change handler that represents each channel. Change scopes can be inserted on transactions.

Variants have been covered in previous sections. Variants may be used by either the client or the server side.

Type Maps have also been covered in previous sections. The optimized maps are only visible to the server side.

Plug-In Interface

Figure 13:
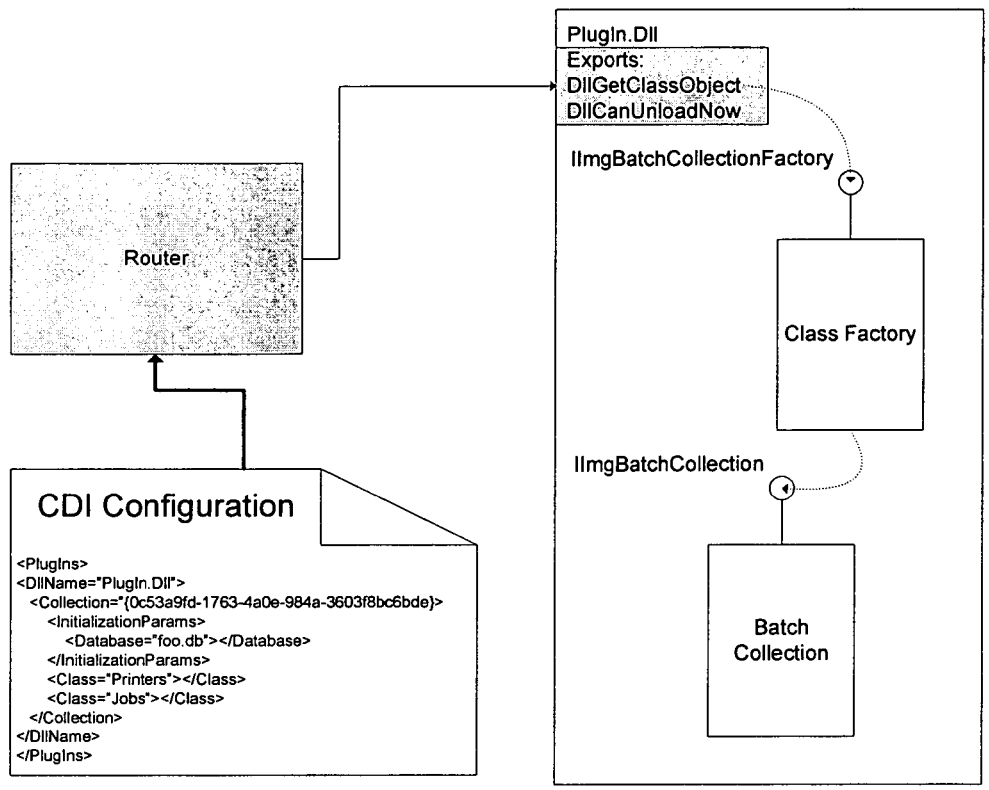
FIG. 13 is a block diagram of a plug-in model in accordance with one embodiment.

In the illustrated and described embodiment, plug-in interfaces are instantiated using a COM-like object instantiation model. It does not require the plug-in to register its class ids in the registry. The process of instantiating a plug-in is shown in FIG. 13.

In the illustrated and described embodiment, all of the plug-ins are stored in WMI.Config as part of the CDI configuration. Some of the plug-in data will be synthesized by WMI.Config from the plug-in DLL's XML configuration files (this is useful for a XCOPY based solution). The CDI configuration consists of a list of Plug-In DLLs. For each DLL, we list the collections GUIDs that each supports, as well as the classes supported in each logical collection. Each also has some associated initialization data. This will typically represent the location that the objects supported by the DLL will be persisted in and retrieved from. When the router wishes to instantiate the plug in interface, it retrieves the collection GUID, finds the corresponding DLL and then calls DllGetClassObject:

```
HRESULT
DllGetClassObject(
    IN          REFCLSID        rclsid,
    IN          REFIID          riid,
        OUT     VOID            **ppv
    );
```

We then request CLSID_IImgBatchCollection and IID_IImgBatchCollectionFactory. The DLL then returns a class factory that can return the various instances of IImgBatchCollection supported by the plug-in. IImgBatchCollectionFactory supports the following interface:

```
interface IImgBatchCollectionFactory : IUnknown
{
    HRESULT
    LockServer(
        [in]         BOOL         fLock
    );
    //
    // TODO: pInit should be replaced by a more sensible initialization
    // system based on WMI.Config.
    //
    HRESULT
    CreateInstance(
        [in]          IImgCommonDataServer   *pICommonDataServer,
        [in]          REFGUID                collectionGuid,
        [in, string]  const wchar_t          *pInit,
        [in]          REFIID                 riid,
        [out]         void                   **ppvObj
    );
}
```

The factory is passed the following information during CreateInstance:
- An IImgCommonDataServer interface. This interface inherits from IImgCommonData and also includes some plug-in specific methods that access server side services. Note: The plug-in should not call CoCreateInstance (CLSID_IImgCommonData), since this creates a client interface. The system shuts down when the last client interface is released, it will not shut down if a server side plug-in holds a client interface.
- A collectionGUID. This is the same GUID that is present in the CDI configuration. The factory could choose to instantiate different IImgBatchCollection interface depending on this GUID.
- Initialization Data—This data will be retrieved from WMI.Config. Currently this is represented by a string. The Plug-In uses this initialization data to choose where to obtain its objects from.
- Riid—This is the interface requested by the CDI. Currently only IID_IImgBatchCollection is requested, but future interfaces could be requested here.

The interface returned by the plug-in is the following:

```
interface IImgBatchCollection : IUnknown
{
    HRESULT
    AsyncProcessRequest(
        [in]    IImgServerItemCompletion   *pIItemCompletion,
        [in]    ULONG                      StartIndex,
        [in]    ULONG                      EndIndex,
        [in]    IImgBatchArray             *pIBatchArray
    );
    HRESULT
    Shutdown(
        [in]    EImgShutdownReason         eReason
    );
};
```

The AsyncProcessRequest interface is called if any data is destined to the plug-in from the batch. The collection is passed:
- A IImgServerItemCompletion interface. This interface supports a single method—"Done" that is called when the request has been completely processed. The caller can immediately return from AsyncProcessRequest. The caller must call "Done" unless they fail the AsyncProcessRequest call. Failing to call "Done" results in the client's Execute call not completing.
- A BatchArray, this interface provides access to the actions requested by the client.
- A start and end index for the batch array. This allows the router to create one batch which is then shared by the various plug-ins. The plug-ins may be executing in parallel if the client requests parallel execution semantics.

The batch array has the following interface:

```
typedef struct
{
    EImgBatchOptions               eItemType;
    EImgActionCompletionStatus     eCompletionStatus;
    HRESULT                        hrCallResult;
    IImgErrorInfo                  *pErrorInfo;
    [switch_is(eItemType)] union
    {
    [case(BatchGetObjectData)]
        ImgBatchGetObjectData      ObjectGetData;
    [case(BatchSetObjectData)]
        ImgBatchSetObjectData      ObjectSetData;
    [case(BatchObjectCommand)]
        ImgBatchObjectCommand      ObjectCommand;
    [case(BatchObjectQuery)]
        ImgBatchObjectQuery        ObjectQuery;
    [case(BatchNotifyRegistration)]
        ImgBatchNotifyRegistration NotifyRegistration;
    };
} ImgBatchItem;
interface IImgBatchArray : IUnknown
{
    HRESULT
    ItemAt(
        [in]     ULONG          Index,
        [out]    ImgBatchItem   **ppBatchItem
    );
    //
    // These accessors provide access to other data in the batch array.
    //
    EImgBatchSemantics
    GetBatchSemantics(
        void
    );
    IImgBatchTransaction *
    GetAliasedBatchTransaction(
        void
    );
    IImgWorkFlow *
    GetAliasedWorkFlow(
        void
    );
};
```

The batch semantics, any associated transaction and the work flow can be retrieved from the batch array. The interfaces are not returned with an increased reference count since they are aliased to the batch array. The ItemAt method returns the batch action at a given index. This contains an enumeration giving the type of item. It also contains fields that the plug-in can set to indicate whether the item completed and any error information. It contains a union which contains the parameters passed in by the caller for the corresponding action.

Interception

Now that the plug-in interface and router have been defined, a discussion of the implementation of interception follows. Interception is implemented, in the illustrated and described embodiment, as another plug-in interface to which the batching router can send data. However, unlike the configuration information stored for a normal plug-in, which only requires the collection id (or class for queries) for routing, an intercepting plug-in specifies the following pieces of information:

The intercepting action. The interceptor can specify whether it wants to trap Gets, Sets, Queries, Commands or Notification.

The intercepting class. The interceptor specifies what class of object it wants to be invoked for. The class can be specified as '*' in which can it will be registered for all classes.

The intercepting collection. The interceptor specifies the unique GUID of the collection whose objects it wishes to intercept. This collection can be specified as '*' in which case it will be registered for all collections.

The intercepting object. The interceptor can specify the unique object id of the object it wants to monitor (if it does this it should intercept the object's Delete command to remove the interception). If '*' is specified, then the interceptor is invoked for all classes.

Each registration in the interception table is assigned a GUID. The interception mechanism will utilize the "Chain of command" pattern. The actions taken by the batching router are as follows:

1. Before routing a given item in the batch to a collection, the router first checks to see whether there is an interceptor registered for the call using the fields described above.
2. If there is, a contiguous set of actions is found that are destined to the same interceptor on the same rule.
3. The GUID associated with the interception registration is inserted onto the work flow and the interceptor is invoked.

The interceptor at this point is passed the batch actions, like any other plug-in would be. It changes the execution of the action in one of two ways:

1. It calls RecurseBatchActions( ) against the router and passes in the work flow again, plus the original batch actions. This does not result in any of the actions being modified, but it allows the interceptor to read them and perform additional actions itself (for instance, if it is a synchronizer, it will use this to trigger a synchronization action if the cached data is stale).
2. It interprets each batch action and then modifies them by calling RecurseDataBatch and passing in the work flow again. This option allows the interceptor to change the outcome of an action, but it is (intentionally) much more difficult to implement. For example, to change the outcome of a 'Get', a temporary proxy object would have to be instantiated to hold the result of the real objects get, and a new type map would have to be registered to write to this temporary object.

Either of these calls will result in a call back into the batching router. The batching router performs exactly the same lookup as before, except, it will not call into any interceptor that has its GUID token listed in the work flow. Thus, each interception in turn will be exhausted until the action is routed to the destination object. This same mechanism prevents a well behaved set of interceptors and objects from exhibiting recursion since the router will automatically ignore interceptors that have already been called if the call becomes recursive.

Because the interceptor is responsible for chaining the call, it can choose to execute actions before or after chaining. It can change the semantics of a batch. Typically, if the batch isn't transactional, it might want to ensure that the interception is transactional. Since it is invoked asynchronously, it could even execute its interception in parallel with the intercepted action.

Uses of Interception

Interception is useful for two purposes—system extension or aspect extension. Interception can be used by IHVs to extend the behavior of a batch action. For example, when a queue is paused, another action might need to be taken by the driver. These extensions are reasonably safe as long as they do not attempt to change the outcome of the original action. For this reason, the RecurseBatchActions method is made much simpler to implement. Changing the outcome of a batch action will be much more difficult since it requires interception and modifying all of the parameters, including some sticky ones like type maps, client objects and client object collections. Interceptions could also be conceivable used as mechanism for maintaining compatibility and for patching systems. For example, if a revision of the system results in a plug-in misbehaving, an interceptor could be created that changes the calls into it to ones that it understands. A system could, then, be serviced by supplying interceptors that, for example, patch a security hole by intercepting a call with a string that is too large before it reaches the target object. This could even be done quite generically, e.g., an interceptor could be written that rejects all strings that are larger than MAX_PATH, or, a table of appropriate string lengths per field could be provided.

Where interception is most useful is in implementing an aspect of the system that cross/cuts a large number of objects. For example, an interceptor could be written that logs all of the actions in the system that follow a particular pattern (for example, they fail with "Access Denied").

Object Commands

Object commands are different from object properties in that object commands are only invoked on the server side. This is because the command invocation is performed by passing an array of variants from the client to the server and back. There is no notion of a client side proxy object that is invoked. The data representation is shown just below.

```
typedef struct
{
    ULONG                          cParams;
    [size_is(cParams)] ImgVariant  *aParams;
} ImgReturnParams;
interface IImgCommand : IUnknown
{
    HRESULT
    BeginCommand(
        [in]                          void                  *pObject,
        [in]                          ULONG                 cInputParams,
        [in, size_is(cInputParams)]   ImgVariant            *aInputParams,
        [in]                          IImgWorkFlow          *pIWorkFlow,
        [in]                          IImgCommonDataServer  *pICDIS,
```

```
        [in]              IImgServerItemCompletion  *pIComplete,
            [out]         void                      **ppContext
        );
    HRESULT
    EndCommand(
        [in, unique]      void                      *pContext,
            [out]         ImgReturnParams           *pReturnParams
        );
};
//
// Define a structure to describe a parameter.
//
typedef struct
{
    ImgType                  type;
    [string] const wchar_t   *description;
} ImgParameterDescriptions;
//
// Define a structure to describe parameters.
//
typedef struct
{
    ULONG                                        cParams;
    [size_is(cParams)] ImgParameterDescriptions  *aParams;
} ImgParametersDescription;
//
// Define a structure to hold commands
//
typedef struct
{
    [string] const wchar_t    *type;
    [string] const wchar_t    *command;
    IImgCommand               *pICommand;
    [string] const wchar_t    *description;
    ImgParametersDescription  inputParameters;
    ImgParametersDescription  outputParameters;
} ImgCommand;
//
// Define a number of commands.
//
typedef struct
{
    ULONG                              cCommands;
    [size_is(cCommands)] ImgCommand    *aImgCommand;
} ImgCommandsDescription;
//
// A server class description can contain commands, unlike a client class description.
//
typedef struct
{
    ImgClassDescription       values;
    ImgCommandsDescription    commands;
} ImgServerClassDescription;
```

As can be seen above, a server class description is the same as a client class description, but also includes a description of a set of commands. A command has a type, a command and a description. It contains a pointer to a command interface. The command interface works analogously to an accessor interface used in accessing properties. The command interface is passed the object to which it must apply the command and an array of ImgVariant's that contain the input parameters for the command. Every command can be asynchronously executed, which is why the interface has both a BeginCommand and EndCommand method.

Each command also defines the type of all of its parameters and also has a list of all the descriptions for each command.

Like property accessors, commands can be built on top of dynamic types. However, since at a fundamental level they correspond to performing an action (as opposed to retrieving data) and since dynamic proxy objects don't have to be constructed for wire marshalling purposes when invoking commands this is not likely to be as useful as for properties. It might have utility if a command were extended via interception.

IATL Commands

IATL provides a mechanism to map CDI commands directly to C++ class method invocations, exactly like it provides a mechanism to map CDI type map properties directly to C++ fields and methods.

IATL allows the caller to implement the command as a single method in which as the asynchronous BeginCommand, EndCommand pair is automatically built for the implementer. This is useful if the implementer wants to implement a command which does not do any IO. Alternately, IATL lets the class provide two methods and implement the command asynchronously. The mechanism used to build IATL commands is summarized in the code excerpt just below.

```
namespace Img
{
namespace iatl
{
struct CommandParams
{
    IImgWorkFlow            *pIWorkFlow;
    IImgCommonData          *pICDI;
};
struct InCommandParams
{
    IImgServerItemCompletion    *pIItemCompletion;
    IImgWorkFlow                *pIWorkFlow;
    IImgCommonDataServer        *pICDIS;
    void                        **ppContext;
};
struct OutCommandParams
{
    void                    *pContext;
};
} // namespace iatl
} // namespace Img
class ServerPrinterCommandBase
{
public:
    ServerPrinterCommandBase(
        void
        );
    ServerPrinterCommandBase(
        const ServerPrinterCommandBase    &source
        );
    HRESULT
    Print(
        IN      Img::iatl::CommandParams    *pParams,
        IN      BSTR                        pszPrintJob
        );
};
class ServerPrinter :   public Img::iatl::TIMCServerObject<ServerPrinter>,
                        public ServerPrinterCommandBase
{
public:
    HRESULT
    Random(
        IN          Img::iatl::CommandParams    *pParams,
            OUT     ULONG                       *pRand
        );
    HRESULT
    PrintAndRandom(
        IN          Img::iatl::CommandParams    *pParams,
        IN          BSTR                        pszPrint,
            OUT     DOUBLE                      *pRand
        );
    HRESULT
    BeginNothing(
        IN          Img::iatl::InCommandParams  *pParams,
        IN          BSTR                        pszPrint
        );
    HRESULT
    EndNothing(
        IN          Img::iatl::OutCommandParams *pParams,
            OUT     BSTR                        *pbstrPrint
        );
    HRESULT
    StartNotifications(
        IN          Img::iatl::CommandParams    *pParams
        );
    HRESULT
    BeginDelete(
        IN          Img::iatl::InCommandParams  *pParams
        );
    HRESULT
    EndDelete(
        IN          Img::iatl::OutCommandParams *pParams
        );
};
//
// IATL table for building command invocation for ServerPrinterCommandBase
//
IMG_ATTR_TABLE_BEGIN(ServerPrinterCommandBase, Img::iatl::CommandMap)
    Type(L"PrinterBase"),
```

-continued

```
        Command(g1In,      IMG_ATTR_METHOD(ServerPrinter::Print),    L"Print",
L"This prints Out something"),
            InDescrip(L"The name of the file to print"),
IMG_ATTR_TABLE_END
//
// IATL table for building command invocation for ServerPrinter
//
IMG_ATTR_TABLE_BEGIN(ServerPrinter, Img::iatl::CommandMap)
    Type(L"PrinterBasic"),
        Command(g1Out,     IMG_ATTR_METHOD(ServerPrinter::Random)),
            OutDescrip(L"A random number is returned"),
        Command(g1In1Out,  IMG_ATTR_METHOD(ServerPrinter::PrintAndRandom)),
            InDescrip(L"Something that will be output to the debugger"),
            OutDescrip(L"A fractional random number"),
        Inherits(IMG_ATTR_INHERIT_TABLE(ServerPrinterCommandBase)),
        Command(IMG_ATTR_METHOD(ServerPrinter::BeginNothing),
IMG_ATTR_METHOD(ServerPrinter::EndNothing), L"Nothing"),
            InDescrip(L"Something that will be output to the debugger"),
            OutDescrip(L"Something else that will be returned"),
        Command(IMG_ATTR_METHOD(ServerPrinter::BeginDelete),
IMG_ATTR_METHOD(ServerPrinter::EndDelete), L"Delete", L"Delete the object"),
        Command(IMG_ATTR_METHOD(ServerPrinter::StartNotifications)),
        Command(g1In, IMG_ATTR_METHOD(ServerPrinter::Clone)),
            InDescrip(L"The new name of the printer that is cloned"),
IMG_ATTR_TABLE_END
```

This excerpt shows a number of different ways that methods from a class can be exposed as a CDI command.

The Print command is implemented in ServerPrinterCommandBase and is implemented as a single synchronous method. All synchronous methods receive a IImg::iatl::CommandParams parameter as their first argument. This structure holds the workflow and common data interface associated with the command. The second parameter maps to the first command argument and so on. In order to disambiguate which parameters are input and which are output parameters, the caller must supply a parameter to the Command function to indicate how many input and output functions the method has. For example, when the print command is referenced:

```
        Command(g1In,    IMG_ATTR_METHOD(ServerPrinter::Print),
L"Print", L"This prints out something"),
```

The g1In parameter indicates that this is command that has one input parameter. The input parameters must precede the output parameters in any method that can be invoked as a command.

Just like a property type map, a command type map can be inherited from a base type into a derived type. This is accomplished with the Inherits function:

Inherits(IMG_ATTR_INHERIT_TABLE(ServerPrinter-CommandBase)),

The types of the command parameters will automatically be deduced from the method arguments. However, the optional description field must be supplied in the table. This is done via the InDescrip and OutDescrip functions. For example:

```
        Command(g1In1Out,
            IMG_ATTR_METHOD(ServerPrinter::PrintAndRandom)),
            InDescrip(L"Something that will be output to the debugger"),
            OutDescrip(L"A fractional random number"),
```

Here the Command Function provides the basic definition of the command, and the InDescrip and OutDescrip functions describe the first input and parameters respectively. If more that one parameter is described, multiple calls to InDescrip and OutDescrip can be made.

The other noteworthy feature shown by the IATL command map is the ability to implement an asynchronous command. This is illustrated by the BeginNothing and EndNothing methods on the ServerPrinter class:

```
HRESULT
BeginNothing(
    IN       Img::iatl::InCommandParams    *pParams,
    IN       BSTR                          pszPrint
    );
HRESULT
EndNothing(
    IN       Img::iatl::OutCommandParams   *pParams,
    OUT      BSTR                          *pbstrPrint
    );
```

This is referenced by the following in the command description:

```
    Command(IMG_ATTR_METHOD(ServerPrinter::BeginNothing),
IMG_ATTR_METHOD(ServerPrinter::EndNothing), L"Nothing"),
        InDescrip(L"Something that will be output to the debugger"),
        OutDescrip(L"Something else that will be returned"),
```

The Command function in this case does not need to be told which are input and output parameters since input parameters are by definition taken by the Begin method and the output parameters are by definition returned by the End method. In this case, the Begin method and End methods also take different structures to a synchronous (single method) command, namely: Img::iatl::InCommandParams and Img::iatl::OutCommandParams. The InCommandParams contain the callback interface to indicate that the operation is complete and the context information that can be saved and associated with the operation. The End method is passed back the context information and can return the result of the command as an error code or a set of return parameters.

Query Compiler

The query compiler provides a mechanism to compile a CDI query into either a filter that can be applied against any object that has a class description or a parse tree. The interface exposed by the query compiler is shown in the code excerpt just below.

```
typedef struct
{
    EImgParseTypes      eConstType;
    [switch_is(eConstType)] union
    {
    [case(ParseTypeInteger)]
        LONGLONG        intval;
    [case(ParseTypeFloat)]
        DOUBLE          dblval;
    [case(ParseTypeString)]
        [string]        const wchar_t       *String;
    };
} ImgParseConstant;
typedef struct
{
    EImgParseIdentTypes         eType;
    [string] const wchar_t      *ptype;
    [string] const wchar_t      *pfield;
    void                        *pCookie;
} ImgParseIdentifier;
typedef struct
{
    ImgParseIdentifier          *pIdentifier;
    EImgComparisonOperator      compOperator;
    ImgParseConstant            constant;
} ImgParseComparison;
struct _tagImgQueryNode;
typedef struct
{
    EImgBooleanOperator         boolOperator;
    struct _tagImgQueryNode     *pLeft;
    struct _tagImgQueryNode     *pRight;
} ImgBooleanNode;
typedef struct _tagImgQueryNode
{
    EImgNodeType        eNodeType;
    [switch_is(eNodeType)] union
    {
    [case(ComparisonQueryNode)]
        ImgParseComparison      comparison;
    [case(BooleanQueryNode)]
        ImgBooleanNode          Node;
    };
} ImgQueryNode;
typedef struct _tagImgQueryNode
{
    EImgNodeType        eNodeType;
    [switch_is(eNodeType)] union
    {
    [case(ComparisonQueryNode)]
        ImgParseComparison      comparison;
    [case(BooleanQueryNode)]
        ImgBooleanNode          Node;
    };
} ImgQueryNode;
interface IImgQueryTree : IUnknown
{
    ImgQueryNode *
    Root(
        void
        );
}
interface IImgQueryFilter : IUnknown
{
    HRESULT
    DoesMatch(
        [in]            void                *ServerClass,
        [out]           BOOL                *pbMatch
        );
    HRESULT
    ClassMapping(
        [out]           IImgOptimizedMap    **ppIOptMap
        );
}
interface IImgQueryFilterFactory : IUnknown
```

```
{
    HRESULT
    GetFilter(
        [in]      const ImgClassDescription    *ServerClass,
        [in]      REFGUID                      ClassId,
        [out]     IImgQueryFilter              **ppIExec
    );
}
interface IImgCommonDataServer : IImgCommonData
{
    //
    // These methods are used to compile queries against server objects.
    //
    HRESULT
    CompileQuery(
        [in, string]   const wchar_t              *pQuery,
        [out]          IImgQueryFilterFactory     **ppIQueryFilterFactory
    );
    HRESULT
    CompileQueryTree(
        [in, string]   const wchar_t              *pQuery,
        [out]          IImgQueryTree              **ppIQueryTree
    );
}
```

A server side CDI instance provides the mechanisms to compile a query. If a query filter is desired, then the CompileQuery method of the IImgCommonData server interface is used. If a parse tree is required, then the CompileQueryTree method is called.

The query filter is returned as a factory. When a particular class description is passed to the query filter factory then a query filter is returned. The query filter under the covers builds a type map against a class that is dynamically generated by the query. When it is bound to the server object is builds an optimized map against the server object. This optimized map is used to populate the query object against which the query is then applied.

The query filter that is returned from the query filter factory is bound by definition to a particular server class. It can be applied against multiple server class object instances. It is not thread safe. If the caller wants to use the same query from a different thread then they can obtain a different query filter instance from the same query filter factory and use that in a different thread.

A query filter has the advantage that it can be applied against any class that supports a class description. However, for a filter to be applied against a class the class must be instantiated and all instances that could potentially be matched by the filter must be evaluated. This is fine for a reasonably small set of objects (possibly on the order of 10,000 for a modern computer), but it performs extremely poorly for a large set of objects. For a large set of objects, a query mechanism such as used by SQL should be used. However, the CDI query syntax is not identical to the SQL syntax. To solve this problem, a query tree can instead be compiled and then translated to a SQL query. Allowing the CDI query compiler to run allows issues such as operator precedence and parentheses to be evaluated by the CDI compiler consistently with how it would handle the same query for a query filter.

The returned interface from the CompileQueryTree method returns an alias to a compiled query tree through the Root method. The memory occupied by the returned parse tree will be returned to the system when the IImgQueryTree interface is released.

In one embodiment, a parse tree starts with a query node; the query node can either be a comparison, or it could be a Boolean node. If it is a Boolean node, then the node has an operator and in turn consists of two query nodes. This is the construct that allows a parse tree to be built. If it is a comparison node, then the comparison consists of a parse identifier and a constant. If the identifier has appeared twice in the same expression, as would be found in the following query: "Printer.cJobs>10 AND Printer.cJobs<100", then the same ImgParseIdentifier instance will appear twice in the parse tree. The pCookie field is a placeholder in the tree that allows a caller to store their notion of an identifier in the cookie. For example, if Printer.cJobs translated to the NumberOfJobs column in a database, this could be stored in the cookie. Aside from providing an extensibility point, the cookie is ignored.

Transactions

Transactions are the mechanism that the CDI uses to ensure that an operation either succeeds completely, and that if it fails, no intermediate state is stored on the machine. The actual mechanism to handle transactions is distributed between the CDI and the CAS. The CDI provides the interfaces to handle transactions and work flows. The CAS provides the mechanisms required to ensure transactional correctness and to provide for deadlock-free locking strategies.

Each transaction is controlled by precisely one transaction object. Each transaction object has one logical store object. Each logical store in the system is referenced by a GUID. The store object coordinates handling any persistent state that the transaction needs to coordinate. The restriction of only one store is reasonable if one considers that the system cannot guarantee that two commits to two transactional stores can be guaranteed to succeed if the stores are not distributed resource managers (DRMs). In the case that they are DRMs, then the transaction will be coordinately across one logical store, namely that provided by a distributed transaction coordinator (DTC), like that found in COM+.

Each transaction also holds a number of dependent actions. The rule is that a dependent action cannot fail to either Commit or Revert its operations. The dependent actions are generally used to couple cached state (or locks) to the state of the persistent store. For example, the CAS clones each object before applying the transaction to the store, if the store successfully commits the changes, then the cloned objects are swapped into the cache. The transaction interfaces are shown just below.

```
typedef enum
{
  TransactionCollectionSet,
  TransactionCollectionIncompatible,
  TransactionCollectionAlreadySet
} ETransactionSetResult;
typedef enum
{
  TransactionOrderFirst,
  TransactionOrderLast
}
ETransactionDependentOrder;
[
  async_uuid(5200cad2-8198-4c2a-98d8-f2cdfb0ab311),
]
interface IImgTransactionDependentItem : IUnknown
{
  HRESULT
  Commit(
    void
  );
  HRESULT
  Revert(
    void
  );
}
[
  async_uuid(67ea48a1-7853-4a5c-862d-8af843855e23),
]
interface IImgBatchTransaction : IUnknown
{
  HRESULT
  GetTransactionalCollection(
      [out]    GUID                         *pCollectionID,
      [out]    IUnknown                     **ppIUnknown
  );
  HRESULT
  SetTransactionalCollection(
      [in]     IImgTransactionDependentItem *pITransCollection,
      [in]     REFGUID                      collectionID,
      [out]    ETransactionSetResult        *peSetResult,
      [out]    IUnknown                     **ppIResultingCollection
  );
  HRESULT
  InsertDependentAction(
      [in]     IImgTransactionDependentItem *pIDependent,
      [in]     ETransactionDependentOrder   eTransactionOrder
  );
  HRESULT
  Commit(
    void
  );
  HRESULT
  Revert(
    void
  );
}
```

Note that all of the interfaces use the COM asynchronous calling pattern if the caller or the implementer desires to use an asynchronous calling mechanism. If they do not, they can still make synchronous calls to the interface or implement synchronous transaction dependent actions.

Anyone wishing either to implement a store or a transaction dependent item must implement the IImgTransactionDependentItem interface. This interface has two methods, Commit or Revert. A store may fail a commit (but not a revert) any other dependent item must always succeed its Commit and Revert methods.

Each transaction can have precisely one store. The current store and its store GUID can be retrieved with the GetTransactionalCollection method.

If the caller wants to set a transactional store, the SetTransactionalCollection call is used. Since transactions are a multi-threaded interface, the SetTransactionalCollection takes both a GUID, the collection to be set, and it returns the existing collection, if it is there. There are three cases (as indicated by the ETransactionSetResult return parameter).

The transaction currently does not have an associated store object. In this case, the return will be TransactionCollectionSet and the passed in collection will become the store associated with the transaction.

The transaction currently has a store object, but it has the same GUID as the one you are specifying. In this case, the transaction object will return the existing collection to the caller. The caller should release their previous collection and continue the call with the persistent store currently in the transaction.

The transaction currently has a store object, and it is a different store (it has a different store GUID). In this case, the transaction object will return TransactionCollectionIncompatible. The caller will typically fail the operation at this point. (This will cause the transaction to revert).

Since the transaction coordinator cannot know the interface to the store object (it could be anything from a transactional file system to a SQL database), this is returned to the caller as an Wunknown from which they can retrieve the real store interface via QueryInterface. The store must implement the IImgTransactionDependentItem so that the transaction object can correctly Commit or Revert the changes to the store.

Transaction dependent items are committed or reverted in two phases. This is specified via the TransactionOrderFirst and TransactionOrderLast parameter to InsertDependentAction. Transactions that rely on the CAS for locking should only use TransactionOrderFirst since the CAS uses dependent items of TransactionOrderLast to ensure that object locks are released after the coordination transaction is committed or reverted.

Work Flow

The CDI interfaces are largely asynchronous. Thus, a single operation can be completed on one thread, or it could be completed on multiple threads. Systems that use less asynchronous programming often can associate state with a thread, for example, a thread could have an associated transaction that is always implied on any methods issues from the thread once the transaction is started. The notion of a work flow replaces this general concept of thread in the CDI. A work-flow always corresponds precisely to a batch that is submitted by the user. The user does not create a work flow. It is created automatically by the CDI when a new batch is issued. A server plug in can create a work flow from scratch if it wants to for its own purposes.

A work flow also provides support for creating new asynchronous work items and associating it with the work flow and hence the origination batch. When the batch is cancelled, the work flow is cancelled and hence, all items on the work flow are requested to cancel. Using this mechanism results in the CDI not having to support an explicit cancellation method on every interface, the method just receives a work flow instead.

The work flow interface is shown just below.

```
typedef enum
{
  WorkFlowIsRunning,
  WorkFlowIsShutdown
} EImgWorkFlowState;
typedef enum
{
  ExecuteNormal,
  ExecuteLongFunction,
  ExecuteIOThread
} EImgWorkItemExecutionFlags;
[
  object,
  uuid(cdeaa3da-a58f-462c-a186-f4e462f0f74c),
  local,
  helpstring("Server side item completion interface."),
  pointer_default(ref)
]
interface IImgWorkItemControl : IUnknown
{
  HANDLE
  WaitHandle(
    void
    );
}
interface IImgWorkItem : IUnknown
{
  HRESULT
  Run(
    void
    );
  HRESULT
  NotifyCancel(
    void
    );
}
interface IImgWorkFlow : IUnknown
{
  //
  // If you request a control, then you can delete the item later. This
  // results in a cancelation being sent to the work item. The work item
  // must voluntarily terminate. If you ask for the work flow state, then
  // if it has been shut down, the item will not be queued and the state
  // of the flow will be returned, otherwise the call will fail.
  //
  HRESULT
  AddItem(
      [in]          IImgWorkItem                *pIWorkItem,
      [in]          EImgWorkItemExecutionFlags  Flags,
      [out, unique] IImgWorkItemControl         **ppIItemControl,
      [out, unique] EImgWorkFlowState           *peWorkFlowState
      );
  HRESULT
  AddWaitableItem(
      [in]          IImgWorkItem                *pIWorkItem,
      [in]          EImgWorkItemExecutionFlags  Flags,
      [out]         IImgWorkItemControl         **ppIItemControl,
      [out, unique] EImgWorkFlowState           *peWorkFlowState
      );
  HRESULT
  AddDependentItem(
      [in]          IImgWorkItem                *pIWorkItem,
      [out]         IImgWorkItemControl         **ppIItemControl,
      [out, unique] EImgworkFlowState           *peWorkFlowState
      );
  HRESULT
  Shutdown(
      void
      );
  HRESULT
  AddToken(
      [in]          REFGUID                     Guid
      );
  HRESULT
  FindToken(
      [in]          REFGUID                     Guid,
      [out]         BOOL                        *pbFound
      );
```

-continued

```
    HRESULT
    DeleteToken(
        [in]        REFGUID              Guid
    );
    HRESULT
    CreateNewScope(
        [out]       IImgWorkFlow         **ppIWorkFlow
    );
    HRESULT
    CreateTransaction(
        [out]       IImgBatchTransaction         **ppIBatchTransaction,
        [out]       EImgBatchTransactionCreation *peBatchTransactionCreation
    );
    HRESULT
    GetBatchTransaction(
        [out]       IImgBatchTransaction         **ppIBatchTransaction
    );
    HRESULT
    InsertTransactionalCollection(
        [in]        IUnknown             *pITransCollection,
        [in]        REFGUID              collectionID,
        [out]       IUnknown             **ppISetTransCollection
    );
    HRESULT
    GetTransactionalCollection(
        [out]       IUnknown             **ppITransCollection,
        [out]       GUID                 *pCollectionID
    );
}
interface IImgCommonDataServer : IImgCommonData
{
    HRESULT
    GetNewWorkFlow(
        [out]           IImgWorkFlow             **ppIWorkFlow
    );
}
```

We will focus the discussion on the following services provided by the work flow: work items, tokens, scopes and transactions. Transactions are covered independently above, but the work flow has some special handling for them.

Work Items

In order to implement a work item, the caller must implement the IImgWorkItem interface. The Run method is called on the interface when the work item executes and the Cancel method is called if the work flow is canceled.

There are three basic types of work item:

A normal work item, created with "AddWorkItem". This sort of work item will run as soon as sufficient resources are available. Like all work items, the caller can specify what sort of work item is running through the work item flags.

A wait-able work item, created with "AddWaitableItem". A wait-able work item will run when its associated event is signaled.

A dependent work item, created with "AddDependentItem". A dependent work item isn't run, but its "Cancel" method is called if the work flow is cancelled. This allows the caller to use a different asynchronous method (for example, they might call ReadFile with an overlapped structure), but still receive cancellation notifications from the original work flow.

The IImgWorkItemControl interface fulfills two purposes—it allows a wait-able work item to return an event handle that can be set to trigger the work item. It also allows the caller to cancel a particular work item by releasing the interface. The cancel call in this case is always asynchronous, i.e. the work item is informed of cancellation but the Release call on the interface does not wait for the cancellation to complete.

This is unlike the behavior of the Shutdown method on a work flow. The shutdown method synchronously waits for all of the work items in the work flow to be cancelled.

Tokens

Tokens are used for marking particular state on the work flow. They are intended to be used to prevent infinite recursion when implementing interception. Namely, a particular type of interception can add a token to the work flow and then prevent that sort of interception from occurring again.

A token is a GUID—tokens can be added to a work flow, found in a work flow and removed from a work flow.

Transactions

A work flow can have precisely one transaction. The work flow is the only interface from which transactions can be created. The work flow provides a number of helper methods for dealing with the current transaction.

CreateTransaction creates a transaction and associates it with the current work flow. If the transaction already exists, this is considered benign, the current transaction is returned. (The caller can deduce that this occurred through the EImgBatchTransactionCreation return).

GetBatchTransaction returns the batch transaction currently associated with the work flow, if it exists. It returns NULL if it does not.

InsertTransactionalCollection inserts a collection into the transaction associated with the work flow. The inserted collection or the existing collection is returned via the ppISetTransCollection returned. If the collections are incompatible (they use different GUIDs), the call will fail.

GetTransactionalCollection retrieves the transactional collection associated with the transaction associated with the work flow.

Scoped Work Flows

A work flow can contain other work flows. When a work flow is scoped within another work-flow, it automatically inherits all work items and tokens from its parent. It also inherits any transaction that is in progress from the parent work flow. Scoping work-flows allows two main types of functionality:

- Tokens in parent work flows cannot be deleted. This allows the set of tokens in a work-flow to be "locked" until the work flow invocation recurses back out to the caller. This is useful in that it can prevent an interceptor from inadvertently removing tokens that it shouldn't.
- A non-transactional request from a user might require a transaction in order to be executed as an implementation detail. For example, a deletion request might require a number of sub-objects to also be deleted. Since the original batch might contain other items that should not or can not be made transactional, we wouldn't want to add a transaction to the work flow created by the caller. The solution is to produce a work flow scoped inside the first work flow and then associate the transaction with the inner work flow. This allows any cancellation requests on any work-items to be maintained and also allows any tokens on the original work flow to be preserved without making the original work flow transactional.

Server Side Notifications

The CDI supplies support for plug in collections wishing to support notifications. This allows a notification channel to retrieve data from a remote collection and a local (in-proc or sandboxed) collection at the same time and still consistently handle the notification channel on behalf of the client. The CAS provides additional support for notifications on particular objects (such as ensuring that notifications are correctly serialized through its locking infrastructure).

Each batch collection is given a IImgNotificationDataServer interface that is used to push data through to the client collection for each notification channel. The CDI itself maintains the client collection and other infrastructure for the notifications.

```
typedef enum
{
   ImgNotificationCollectFieldHistory,
   ImgNotificationDoNotCollectFieldHistory
} EImgNotificationFieldOptions;
typedef enum
{
   NotifyAddNewObject,
   NotifyAddMatchedFilter
} EImgNotifyAddReason;
typedef enum
{
   NotifyRemoveDeletedObject,
   NotifyRemoveDoesNotMatchFilter
} EImgNotifyRemoveReason;
typedef enum
{
   NotifyUpdatePopulate,
   NotifyUpdate
} EImgNotifyUpdateReason;
interface IImgNotificationChannelShutdown : IUnknown
{
   void
   ShutdownChannel(
      void
      );
}
interface IImgPushNotifyDataThroughChannel : IUnknown
{
   HRESULT
   SendChangeDataNotify(
      [in]         EImgNotificationFieldOptions    fieldOption,
      [in]         const ImgVariant                *pVariantData,
      [in]         ULONG                           MapIndex,
      [in]         IImgCanonicalName               *objectID
      );
   HRESULT
   SendAddObjectNotify(
      [in]         EImgNotifyAddReason             reason,
      [in]         IImgCanonicalName               *objectID
      );
   HRESULT
   SendRemoveObjectNotify(
      [in]         EImgNotifyRemoveReason          reason,
      [in]         IImgCanonicalName               *objectID
      );
   HRESULT
   SendDone(
      [in]         EImgNotifyUpdateReason          reason
      );
}
interface IImgNotificationDataServer : IUnknown
{
   HRESULT
   RegisterShutdown(
```

```
        [in]           IImgNotificationChannelShutdown   *pINotifyChannelShutdown
    );
    HRESULT
    CreateNotificationObject(
        [out]          IImgPushNotifyDataThroughChannel  **ppPushNotifyData
    );
    void
    SendFailure(
        [in]           HRESULT                           ErrorCode,
        [in, unique]   IImgErrorInfo                     *pIErrorInfo
    );
}
```

The notification data server interface exposes three methods:

RegisterShutdown—This allows the caller to register an interest in the channel being shut down. For example, a remote access adapter might need to know to pull down its own notification channel when the client notification channel is pulled down.

CreateNotificationObject—This create a new notification interface that must be used to push data through the notification channel. Each IImgPushNotifyDataThroughChannel instance is not thread safe. The system provides the guarantee that any changes sent through an IImgPushNotifyDataThroughChannel instance are sent as a group or not at all.

SendFailure—It is possible that a fatal error occurs that prevents notifications being sent through the channel. In this case, the SendFailure method can be called. It is guaranteed to tear down the channel. It will also send the error information to the caller in a best effort manner.

The push notify data through channel interface has the following methods:

SendAddObjectNotify—This tells the channel that a new notification object has been added. The object could either have been added because the object really has just been created, or it might instead have changed state to match a query filter.

SendRemoveObjectNotify—This tell the channel that either an object has really been deleted, or that it no longer matches the query filter and hence has logically been removed from the client collection.

SendChangeDataNotify—This sends individual field information down the channel to the client. The map index is the index of the field in the client's registered class description. Each change sent can have one of two behaviors. If the change is buffered somewhere in the system and another change to the same field occurs, then the new field value takes its place. This has the advantage of minimizing the storage required for any buffered notification data. Alternately, every change might be significant, in which case the caller can request that the history of every change is kept.

SendDone—This finishes the changes the have been sent to the IImgPushNotifyData interface. Either the initial data for the notification is being sent, in which case NotifyUpdatePopulate variation can be used, or this is a notification about a subsequent change in object state in which case NotifyUpdate can be specified.

Friendly Name Resolution Plug-Ins

The mechanism that a plug-in batch collection uses to plug into the canonical name-space is described in section entitled "Plug-In Interface" above. Basically, each collection is identified by a GUID. If the batch collection also wants to support friendly names it must register a friendly name resolution handler. This translates a friendly name of the requested class to the canonical name if possible. Friendly name resolvers are registered with the CDI in the same way that normal plug-ins are registered, except that the friendly name class is used instead of a collection GUID and a different class factory and interface are used instead. The class factory and plug in interface are shown just below.

```
interface IImgClassNameResolvingHandlerFactory : IUnknown
{
    HRESULT
    LockServer(
        [in]           BOOL             fLock
    );
    HRESULT
    CreateInstance(
        [in]           IImgCommonData          *pICommonData,
        [in, unique]   IXMLDOMNode             *pXmlInitData,
        [in]           REFIID                  riid,
        [out]          void                    **ppvObj
    );
}
interface IImgClassNameResolvingHandler : IUnknown
{
    HRESULT
    BeginResolveName(
        [in, string]   const wchar_t           *pszName,
        [in, string]   const wchar_t           *pszClass,
        [in, unique]   IImgServerItemCompletion *pICompletion,
        [out, unique]  void                    **ppContext
    );
    HRESULT
    EndResolveName(
        [in]           void                    *pContext,
        [out]          IImgCanonicalNameIterator **ppIterator
    );
}
```

When the client requests a name resolution, if the friendly name resolver cannot find the name in the cache, the name resolving handler for each registered plug-in for that class is called (in a parallel invocation). Each name resolver attempts to resolve the name, when the name resolution is finished, the resolver calls Done on the IImgServerItemCompletion interface. The name resolver will then call EndResolveName with the same context returned by BeginResolveName. The name resolver then returns an IImgCanonicalName iterator that contains any canonical names that the name resolver has determined to correspond to the friendly name.

Note that the name resolver plug-in will typically perform its name resolution by using Gets, Queries or Commands against the CDI interface. Thus, implementing an asynchronous interface will typically not be too problematic since it will in turn be calling another asynchronous interface.

In order to prevent the caller from having to implement an IImgCanonicalName iterator for every query collection, a collection interface is provided that accumulates canonical names and from which an iterator instance can be returned. This interface is shown just below.

```
interface IImgCommonData : IUnknown
{
  HRESULT
  CreateCanonicalNameCollection(
      [out]      IImgCanonicalNameCollection    **ppINameCollection
      );
}
interface IImgCanonicalNameCollection : IUnknown
{
  HRESULT
  AddCanonicalName(
      [in]       IImgCanonicalName              *pIImgCanonicalName
      );
  HRESULT
  Merge(
      [in]       IImgCanonicalNameIterator      *pIImgCanonicalNameEnum
      );
  HRESULT
  GetIterator(
      [out]      IImgCanonicalNameIterator      **ppIterator
      );
}
```

Collection Adapter Service

In the illustrated and described embodiment, the IImgBatchCollection interface is deceptively complex to implement. The caller must run through each batch item, decode it, and decide how to respond to it. Generally, the only reason why a collection would want access to the batch is to preserve the batch for transmission across machine or process boundaries. In the case where the batch actually interacts with a group of objects that are loaded to and from a persistent store, this is a great deal of complexity for the plug-in to handle. For this reason the Collection Adapter Service is provided. The Collection Adapter Service provides the following functionality:

It retrieves objects from a set of plug-in collections.
It caches instantiated objects and flushes them when not in use.
It manages the binding of the client objects to the server objects through the type map.
It coordinates transactions between compatible collections.
It manages object locking in conjunction with transactions.
It manages both synchronous and asynchronous objects.
It interacts with the query compiler to implement the object filters.
It makes best use of resources by dynamically choosing to execute calls in serial or in parallel.
It maintains object concurrency through an optimistic locking scheme.
It handles object change notifications.

Figure 14:
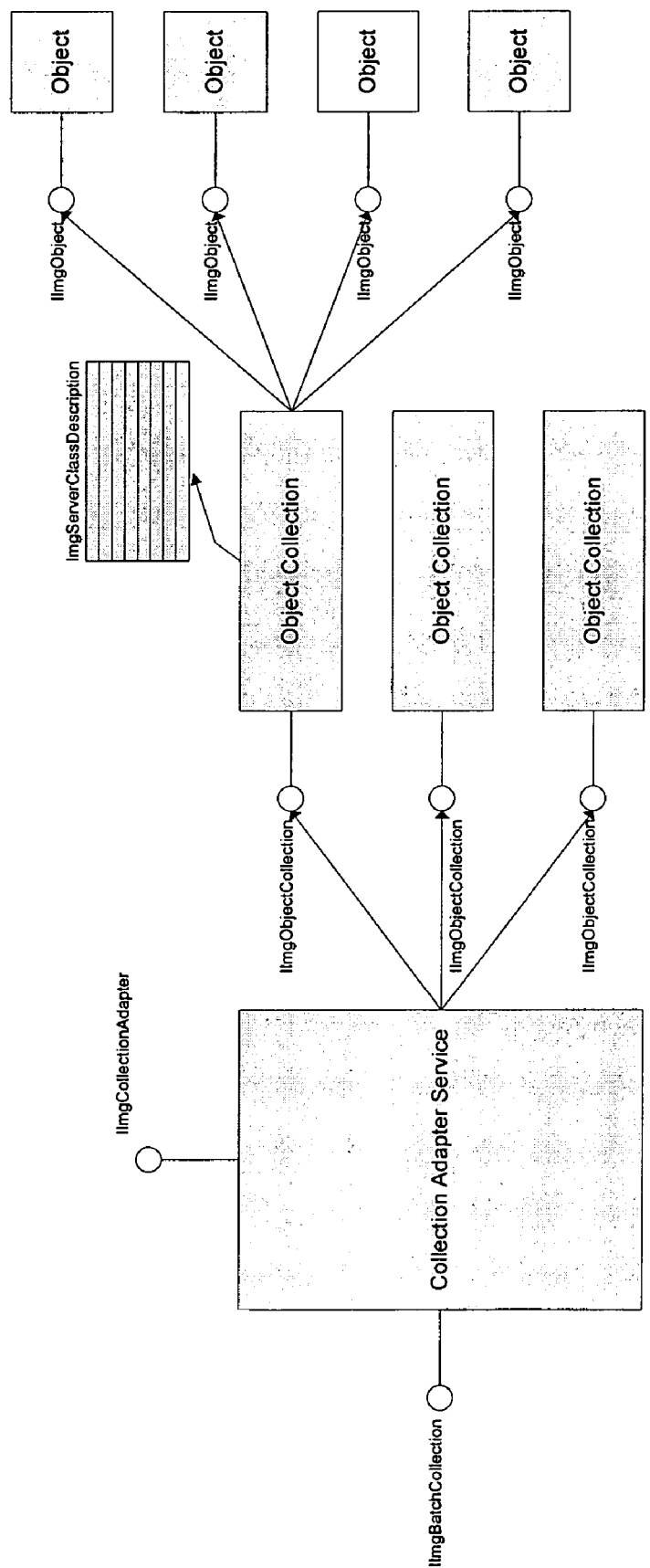
FIG. 14 is a block diagram of an object model that is used by a collection adapter service in accordance with one embodiment.

If the basic CDI is the glue that holds the various plug-ins together, then the Collection Adapter Service is responsible for ensuring that a smart, asynchronous, high performance plug-in is as simple to implement as possible. The collection adapter service model is shown in FIG. 14 in accordance with one embodiment.

A given CAS instance can have multiple object collections plugged into it. Each object collection supports a single class name, for example, "Printers" and all the objects in a given object collection are homogenous. Thus, they can be described by a single class description which expresses all of the properties and commands that a given server object implements. The collection adapter service uses the server class description to transfer data between the client and the server objects and execute object commands. Each object in the server implements some basic functionality via its IImgObject interface. The IImgCollectionAdapter has the following interface:

```
interface IImgCollectionAdapter : IImgBatchCollection
{
  HRESULT
  Initialize(
      [in]      IImgCommonDataServer    *pICommonDataServer
      );
  HRESULT
  RegisterObjectCollection(
      [in]      IImgObjectCollection    *pIObjectCollection
      );
}
```

The client instantiates a collection adapter by calling "CoCreateInstance" in its IImgBatchCollectionFactory::CreateInstance method. It calls IImgCollectionAdapter::Initialize and passes it the IImgCommonDataServer interface that it was passed. It then instantiates and registers each of its object collections through the RegisterObjectCollection call.

An IImgObjectCollection has the following methods:

```
interface IImgObjectCollection : IUnknown
{
  //
  // If this object collection under the covers does not support transactions,
  // then this call should be failed with E_NOTIMPL.
  //
  HRESULT
  GetTransactionalCollectionData(
      [out]      IUnknown                  **ppITransactionalCollection,
      [out]      ETransactionSupport       *peTransactionSupport,
      [out]      GUID                      *pCollectionID
      );
  HRESULT
  GetCollectionData(
      [out]      IImgImmutableString       **ppIObjectClass,
      [out]      GUID                      *pObjectID,
      [out]      ImgServerClassDescription *pServerClassDescription
      );
  HRESULT
  BeginGet(
      [in]       IImgWorkFlow              *pIWorkFlow,
```

```
        [in]           IImgServerItemCompletion  *pIItemCompletion,
        [in]           IImgImmutableString       *pIObjectName,
        [out]          void                      **ppContext
    );
    HRESULT
    EndGet(
        [in, unique]   void                      *pContext,
        [out]          IImgObject                **ppIObject
    );
    HRESULT
    BeginEnum(
        [in]           IImgWorkFlow              *pIWorkFlow,
        [in]           IImgServerItemCompletion  *pIItemCompletion,
        [in]           IImgCanonicalName         *pIObjectBase,
        [in]           IImgImmutableString       *pIObjectBaseClass,
        [in]           IImgImmutableString       *pIQueryString,
        [out]          void                      **ppContext
    );
    HRESULT
    EndEnum(
        [in, unique]   void                      *pContext,
        [out]          IImgObjectIterator        **ppIObjects
    );
    HRESULT
    Shutdown(
        [in]           EImgShutdownReason        eReason
    );
}
```

The GetTransactionCollectionData call returns how the collection supports it transactions, a collection can support no transactions, transactions as dependent item (this can be supported by transient collections) or it can support transactions by returning a custom transaction interface that depends on the underlying storage system and an ID that uniquely identifies the scope over which a transaction can be successful.

The GetCollectionData call returns the object class name, the ObjectId used in the optimized type map binding and the server class description that describes each object. The remaining calls, BeginGet and EndGet and BeginEnum/EndEnum allow objects to be retrieved from the collection. The shutdown method is called by the CAS when the IImgBatchCollection::Shutdown method is called.

Any call that the CAS executes that is likely to be time consuming will take the form of a Begin/End pair. Each Begin call takes an IImgServerItemCompletion interface and allows a context to be returned through the ppContext parameter. The CAS provides the following guarantees to the implementer of the interface:

If the Begin call fails, the End call will not be called.
  If the Begin call succeeds, the End call is guaranteed to be called.
  The End call will not be called until the IImgServerItemCompletion::Done method is called.
  The End call will not be made until the Begin method returns.
  The End call will be passed the context returned in the Begin call.

These guarantees allow the Begin method to implement a synchronous call by calling Done within the Begin method. Any 10 bound operation it performs should be executed either in another thread (preferably consolidated with other operations), or it should be implemented in turn as an asynchronous call. When the asynchronous item completes, then the IImgServerItemCompletion::Done method should be called. If the begin method needs to keep track of any state specific to the call, then it can be returned in the ppContext parameter. Since the CAS guarantees that the End call will be made, the context can always be freed. The CAS uses the following mechanism for scheduling calls:

If the call is synchronous (Done is called inside the Begin method), and the caller requests parallel execution, the execution of the method is assumed to be CPU bound. Thus, the next call will be serialized on the first. If a call fails, the result is recorded, but all subsequent calls are still made.

If the call is asynchronous and the client request parallel execution, then the next "Begin" method is called immediately in the origination thread.

If the call is asynchronous and the client requests sequential or transactional semantics, then the remainder of the work will be performed in the same thread as the IImgServerItemCompletion::Done method is called on.

These rules mean that a client collection or object of the CAS must ensure that IO bound operations are executed in the asynchronous calling pattern, otherwise it can prevent parallel execution of other work items.

Objects have the following interface:

```
interface IImgObject : IUnknown
{
    HRESULT
    Initialize(
        [in]    IImgObjectHandler    *pIChangeHandler,
        [out]   ULONG                *pCallFilterFlags
    );
```

-continued

```
HRESULT
GetRealObjectAddress(
        [out]              void                   **ppObject
        );
HRESULT
BeginGet(
        [in]               IImgWorkFlow           *pIWorkFlow,
        [in]               IImgServerItemCompletion
*pICallCompletion,
        [in]               ULONG                  cTags,
        [in, size_is(cTags)] ULONG_PTR            *aTags,
        [out]              void                   **ppContext
        );
HRESULT
EndGet(
        [in, unique]       void                   *pContext
        );
HRESULT
CloneObject(
        [out]              IImgObject
**ppISettableObject
        );
HRESULT
BeginSet(
        [in]               IImgWorkFlow           *pIWorkFlow,
        [in]               IImgServerItemCompletion
*pICallCompletion,
        [in, unique]       IImgBatchTransaction
*pIBatchTransaction,
        [in, unique]       IUnknown
*pITransactionalCollection,
        [in]               ULONG                  cTags,
        [in, size_is(cTags)] ULONG_PTR            *aTags,
        [out]              void                   **ppContext
        );
HRESULT
EndSet(
        [in, unique]       void                   *pContext
        );
}
```

The methods to be implemented are as follows:

Initialize call is called by the CAS when the object is first returned to it from a collection. It passes the object a handler interface that allows the object to delete itself, lock itself, interact with transactions and send change notifications to the rest of the system. It can also return a call filter. The call filter indicates whether the object supports partial instantiation (in which case the BeginGet/EndGet methods will be called on it before reading any data from it). It also indicates whether it supports persisting the object by only writing out certain fields. In this case the BeginSet/EndSet methods will be called specifying precisely which properties the caller specified in the set.

GetRealObjectAddress returns the object address that the ImgServerClassDescription accessors are relative to. This is necessary because if the object is implemented using multiple inheritance the IImgObject interface address is not necessarily the same as the real object address.

BeginGet/EndGet—These methods are only called if the object indicates it supports a partial object in its call filter. The object will be passed the tags that indicate which fields the optimized map is about to read. The object can use this to fetch heavy fields after its first instantiation from a persistent store. If the object does this and the call is 10 bound (which it almost invariably will be), then it must use an asynchronous calling pattern.

CloneObject—The CAS assumes that the object is implemented in an immutable fashion. This allows the object to remain unlocked while data is being read from it. It simplifies transactions since the object can be held in its duplicated state until the transaction commits. Thus, the object will be asked to Clone itself before a set occurs. Object must be coded in an immutable fashion to be compatible with the CAS.

BeginSet/EndSet—This pair of methods is called in a set after the object has been cloned and its accessors have been used to change its state. The object can validate that its new state is valid in this call. If it requests it in the call filter, it will, be told which fields were specified by the client when the set occurred.

Object Handler

The object handler is the interface that is passed to each object by the CAS to allow the object to interact with the CAS in various ways. There is precisely one instance of an object handler for each object that is held cached in the CAS. The IImgObjectHandler also exposes an asynchronous lock for each object. This lock is used by the CAS to logically serialize access to the object for state changes which includes both transactions and change notifications. Several actions on the object require the object to be locked. The object handler interface enforces this semantic. The object handler interface is shown just below.

```
interface IImgObjectHandler : IUnknown
{
    HRESULT
    GetObjectLock(
        [out]       IImgAsyncLock       **ppIObjectLock
    );
    HRESULT
    DeleteObject(
        [in]        ImgLockContext      lockLogicalID
    );
    HRESULT
    CurrentObject(
        [in]        ImgLockContext      lockLogicalID,
        [out]       IImgObject          **ppIObject
    );
    HRESULT
    ReplaceObject(
        [in]        ImgLockContext      lockLogicalID,
        [in]        IImgObject          *pIObject
    );
    HRESULT
    GetChangeHandler(
        [in]        ImgLockContext              lockLogicalID,
        [out]       IImgObjectChangeHandler     **ppIChangeHandler
    );
    HRESULT
    HoldObjectInCache(
        void
    );
    HRESULT
    ReleaseObjectFromCache(
        void
    );
}
```

Object Asynchronous Lock

An important method is GetObjectLock, which allows the caller to retrieve the lock associated with the object. The lock returned is an asynchronous lock with support for transactional locking. The lock and the associated semantics are used by the CAS and the same semantics should be used by other callers. The interfaces are shown just below.

```
interface IImgLockEntry : IUnknown
{
    HRESULT
    EnterLock(
        [in]        INT_PTR             entryContext,
        [in]        ImgLockContext      logicalID
    );
    HRESULT
    NotifyCancel(
        void
    );
}
interface IImgLockSequence : IUnknown
{
    //
    // This can only fail if the arguments aren't valid. Once a sequence has been
    // acquired, you are guaranteed to be able to enter the object. A sequence must
    // be acquired serially, but not necessarily in the same thread.
    //
    HRESULT
    AcquireLock(
        [in]        INT_PTR             entryContext
    );
    HRESULT
    TryAcquireLock(
        [out]       BOOL                *pbAcquired,
        [out]       ImgLockContext      *pLogicalID
    );
    HRESULT
    IsCancelled(
        [out]       BOOL                *pbCancelled
    );
}
interface IImgAsyncLock : IUnknown
{
    HRESULT
    GetLockSequence(
        [in]            IImgWorkFlow        *pIWorkFlow,
        [in]            IImgLockEntry       *pIEntryInterface,
        [out]           IImgLockSequence    **ppILockSequence,
        [out, unique]   EImgWorkFlowState   *peWorkFlowState
    );
    HRESULT
    ReleaseLock(
        [in]        ImgLockContext      logicalID
    );
    HRESULT
    AddTransactionToLock(
        [in]        IImgBatchTransaction    *pIBatchTransaction,
        [out]       BOOL                    *pbTransactionAdded
    );
    HRESULT
    WaitForTransactionToFinish(
```

| | | |
|---|---|---|
| [in] | IImgWorkFlow | *pIWorkFlow, |
| [in] | IImgServerItemCompletion | *pIItemCompletion, |
| [out, unique] | EImgWorkFlowState | *peWorkFlowState |
| ); | | |
| }; | | |

The lock is asynchronous, i.e. it calls you back when you can acquire the lock. This is an intentional design choice that provides for the following capabilities:

A work flow attempting to acquire a lock can be cancelled. Since the lock interface is asynchronous, the caller can be notified that the lock acquisition attempt was cancelled.

Since locks are used for serializing object access across transactions and since transactions might have to acquire many objects and will have to typically write the state to a store, an object lock could potentially be held for a long period of time. Thus, any lock access could potentially be waiting on an operation which is IO bound. Using an asynchronous lock allows the thread to be reused for other CPU bound operations, rather than having to wait for the IO to complete.

Note that the CAS does not use the object lock for Gets/Queries and Commands. This means that although a transaction might be logically holding an operation, it only serializes sets and notifications. If the caller wishes a command to be transactional, they-must create the transaction themselves and acquire the object lock.

A caller wishing to acquire the lock must implement the IImgLockEntry interface. This interface has two methods, EnterLock and Notify Cancel.

EnterLock is called when the caller has acquired the lock. An ImgLockContext is passed to the EnterLock function. This lock context is precisely associated with that particular acquisition of the lock and must be handed to the lock interface when the lock is released. This fulfills two purposes:

If another caller erroneously tries to release the lock without acquiring it, the release has no effect.

The fact that a lock must be held can be expressed semantically by other interfaces by requiring the lock context to be presented. This can also check that the lock is indeed held before doing the associated action.

In addition, if the workflow on which the caller acquired the lock is cancelled, then the NotifyCancel method on their interface will be called. They can then decide whether they still must acquire the lock, or whether to abort their access to the lock. They can cancel their acquisition of the lock by releasing the returned lock sequence interface on which they called AcquireLock.

It would be undesirable if the caller couldn't guarantee that a lock could be acquired. For example, they might wish to acquire a lock, increment a reference count and then release the lock. Then they might perform some actions on the object, acquire the lock again and decrement a reference count. If they couldn't acquire the lock for the second operation, then the reference count would never be correctly decremented.

The ability for the caller to guarantee access to the lock is provided by the IImgLockSequence interface. Once a lock sequence is returned from the lock any sequential acquisitions and releases of the lock are guaranteed to succeed. This works because as an implementation detail, the IImgLockSequence interface is implemented by an object that reserves enough storage to always be able to acquire the lock.

Locks and Transactions

A transaction might need to lock many objects in sequence. This provides an opportunity for the system to deadlock if there is any cyclical acquisition of locks between more than one transaction. It is semantically illogical for two transactions to be holding the same lock, so the lock provides special support for transactions. This is automatically utilized by the CAS when locking the object before setting properties and it should be used by any objects that wish to implement transactional semantics.

A lock can be held by precisely one transaction at a time. A transaction wishing to acquire a lock uses the AddTransactionToLock call. If there is already a transaction holding the lock, the call will return FALSE in the pbTransactionAdded parameter. The transaction should then be reverted (which frees any locks or resources currently held by the transaction) and wait for the existing transaction to complete before returning a failure to the caller. The caller calls WaitForTransactionToFinish to wait for any transaction holding the lock to complete (they will be notified asynchronously). If there is no transaction holding the lock, they will be called back immediately. The lock will automatically be disassociated with the transaction if the transaction is committed or reverted.

The reason that the caller should wait for the existing transaction to finish is to guarantee that if the caller retries the operation they will not simply retrieve the old (unchanged) object state again and "spin" against the transaction holding the lock.

CDI/CAS Optimistic Locking Model

The CDI intentionally does not expose any locking constructs to clients. There are a number of reasons for this:

Each lock would have to add additional context overhead to the server that could be maintained by a client.

If a client went into an error state and held onto a lock, it could cripple the operation of the server.

In order to handle clients not releasing locks, a manual lock-breaking mechanism would have to be added to the server. This is additional UI and maintenance that is otherwise simply avoided.

However, it is desirable that the server state is maintained correctly and that the "dueling administrators" problem is avoided. If two administrators simultaneously tried to rename a printer, we would want to ensure that one rename succeeded and the other failed.

The system maintains these semantics partly by the mechanism that transactions use to acquire object locks. It is also maintained by giving every object an "Object:LockId" property. Simply put, in order to change an object state, you must also supply a lock id that matches the current object lock id. This indicates that you were aware of the last object state before attempting to change the object. If you supply an object id that does not match, the attempt to change state will fail. In response the caller must re-get the properties that they wish to change and hence re-get the lock id. A well written client would then check the properties to ensure that the change they wish to effect is still meaningful and then attempt the operation again.

Object Change Handler

In order to retrieve a change handler for an object, the object lock must be acquired and then the GetChangeHander method on the object handler must be called. The GetChangeHandler method requires the lock context. The other mechanism that an object can use to acquire a change handler is that it is passed in to the property accessor as a parameter during a set. (The CAS in this case acquires the object lock before setting any object properties for you). The object change handler interface is shown just below.

```
interface IImgObjectChangeHandler : IUnknown
{
    HRESULT
    NotifyChange(
        [in]            ULONG_PTR           tag
    );
    HRESULT
    NotifyChangeData(
        [in]            EImgNotificationFieldOptions  fieldOptions,
        [in]            ULONG_PTR           tag,
        [in]            ImgVariant          *data
    );
    HRESULT
    SendChanges(
        void
    );
}
```

The CDI change handler interface is discussed in section above. That interface provides the capability to send changes down a particular channel. The CAS adds the capability to correctly scope queries and handle all of the channels that might be interested in a particular object. All that the object has to do is indicate which properties have changed. The simplest mechanism is to call NotifyChange and pass the tag for the field which has changed. The CAS will then retrieve the data for that field via the property accessor and send the property change notification to all channels that are interested in the change.

In order the save the CAS the effort of retrieving the property, the caller can also directly specify the data via the NotifyChangeData call.

Finally when all of the changes have been accumulated into the change handler, they can be sent via the SendChanges method. If any of the changes cannot be sent, the CAS will tear down all notification channels that might target that object.

IATL Support for Change Notifications

Change notifications are not difficult for an object to implement. To make it even easier, if a property of your object is only modified by through a CDI property get or set and that property is implemented as a data member, then IATL will automatically generate the change notification code for you. When specifying the field, the gNotify modifier need only be passed to the Field function in the type map. This is shown just below.

```
class Job
{
public:
    IImgImmutableString    *Name;
};
IMG_ATTR_TABLE_BEGIN(Job, Img::iatl::TypeMap)
    Type(L"Job.State"),
```

-continued

```
    Field(
        IMG_ATTR_FIELD(Name),
        gNotify),
IMG_ATTR_TABLE_END
```

This will automatically build a get and set accessor for the property. If the property changes, the change will be sent to the change handler supplied to the property accessor by the CAS.

Remaining Object Handler Functions

Delete Object

This function deletes the object from the CAS's cache. This will also send a change notification to the clients. The object must be locked and the lock context presented in order to delete the object.

Current Object

The CAS uses an immutable object model. When an object is modified, it is cloned and then inserted into the cache if its state is changed. If an error occurs, the new object is discarded. An interesting implication of this design is that if the object wishes to send change notifications as a result of an asynchronous event or, if it otherwise needs the latest version of the object during a property get or during a command, it cannot know that the instance of the object it currently holds is the correct one. To handle this case, the object handler can retrieve the current object instance. Since object state changes are protected by the object lock, the lock must be acquired before the current object can be meaningfully retrieved.

HoldObjectInCache and ReleaseObjectFomCache

The CAS normally caches an object in memory for about ten seconds before it is discarded. An object might decide instead to remain permanently in the cache or to remain cached while another object is cached. To handle this requirement, the HoldObjectInCache method can be called on the object handler. When called, the object will be held in the cache until the corresponding ReleaseObjectFromCache call is made. HoldObjectInCache can be called any number of times the object will only be released when the same number of calls to ReleaseObjectFromCache is made.

You can only safely call HoldObjectInCache in cases where the object is actively held in the cache already because of some other operations. Otherwise, there is a potential race condition where the object is being released from the cache while the call to HoldObjectInCache is being made. This will not result in a crash, but, obviously, the HoldObjectInCache call cannot be honored in this case. The points at which HoldObjectInCache are guaranteed to succeed are:

During the Initialize call to the IImgObject interface supported by the object.

During any property get or set or command invocation.

When the caller otherwise knows that they have issued a HoldObjectInCache call in the past.

Framework Provided Collections

Figure 15:
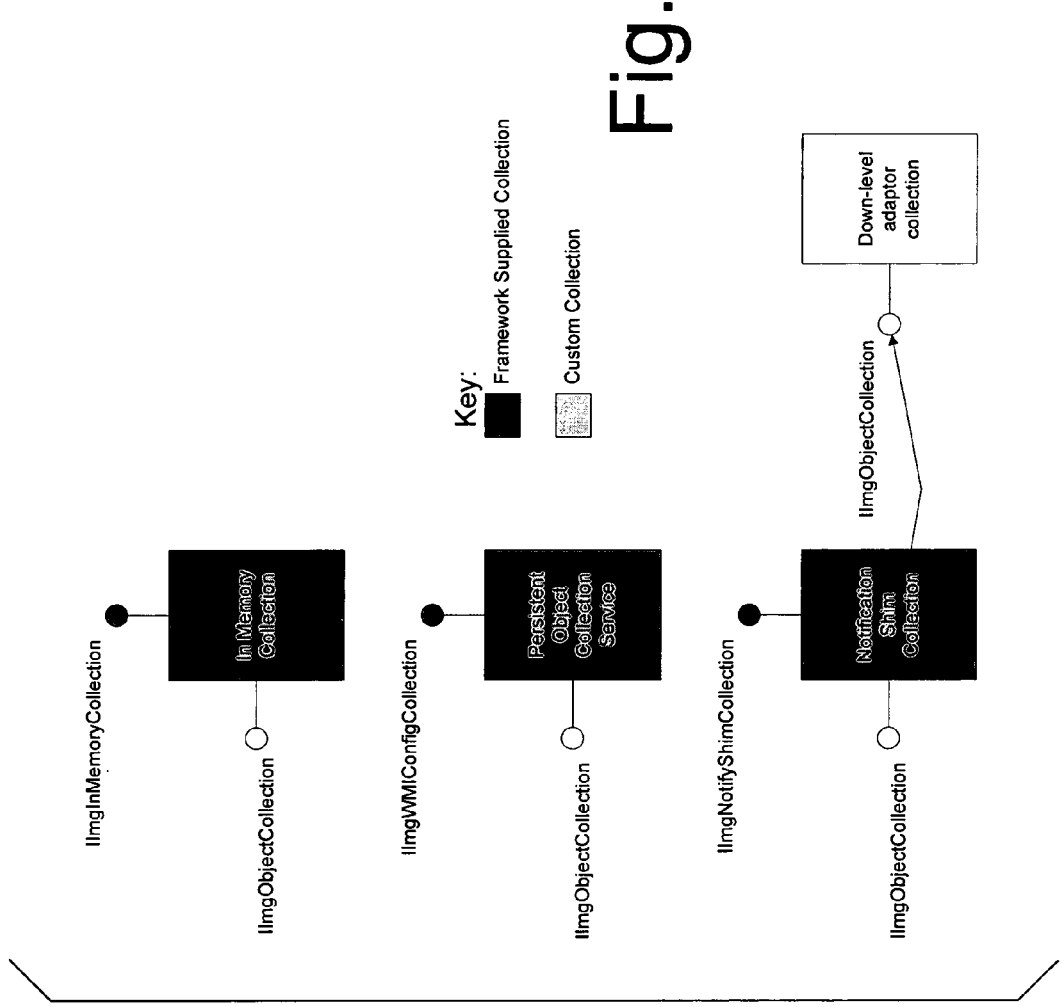
FIG. 15 is a block diagram that illustrates framework-provided collections in accordance with one embodiment.

The IImgObjectCollection and IImgObject interfaces are not particularly difficult to implement, and there will be cases when a plug-in using the CAS will want to or need to implement both. For example, when writing an adaptor that represents objects on a down-level server via the new data model, you will want to provide your own IImgObjectCollection. However, there are many cases where standard framework provided object collections can be used. These are shown in FIG. 15.

The framework provided collections, and their function are as follows.

The In Memory Collection provides a dynamic collection of objects that are not persisted. This collection can be useful when supplied by plug-ins with a few real immutable objects to expose (such as filter factories). It could also be useful in providing a store for light-weight non-persist-able objects in such scenarios as TS printing.

The Persistent Object Collection Service is the collection that provides the ability to persist objects in a persistent store. There might be many stores in which objects can be persisted including the registry, SQL databases or WinFS. Each store will have its own Persistent Object Collection Service instance. The persistent object collection service will provide support for the persistence of the object state into the appropriate store. It will use the server type map (ImgServerClassDescription) to retrieve the necessary object state for storage. In addition, it will where it is able to, map queries directly into the query support provided by the underlying store.

The Notification Shim Collection works as follows. In many cases the system will be bridging to down-level systems that provide limited or no support for notifications. In this case, the caller needs to enumerate all of the objects, check to see when a new object arrives or leaves and fire the appropriate notifications if any fields change. Because the IImgObjectCollection interface is public and the ImgServerClassDescription allows the caller to access all of the fields on an object, a generic shim object collection will be supplied that automates this behavior. This could also be used for callers that just don't want to add the couple of extra lines of code to support notifications. However, a default implementation can be provided for fields that will automatically generate notifications when they change.

In summary, the framework will supply a number of canned object collections that will result in most people never having to implement their own collection interface. An adapter collection interface is the likely exception. A shim collection is provided to automate the generation of events from a down-level adapter.

IATL Implementation of IImgObject

IImgObject is also not a particularly difficult interface to implement. In order to make it as simple as possible to write a standard object, IATL provides a standard implementation of IImgObject that supports non-partial object implementations. The classes it implements are as follows:

TServerObjectBase—Provides a default implementation of IUnknown, Initialize, BeginGet/EndGet and BeginSet/EndSet. The get and set functions don't do anything.

TServerObject—This template adds the GetRealObjectAddress implementation through base class templatization.

TServerDefaultCloneableObject—This template addes the CloneObject method. The caller must supply a copy constructor in their derived class and must either not throw exceptions, throw exceptions if in error, or return an error from their IsValid( ) method after the object has been copied.

TIMCServerObject—This object implements the BeginSet/EndSet method pair for the In Memory Collection.

Managed Objects

IATL is designed to supply automated support for unmanaged C++ classes by providing a template library that allows methods and fields to be expressed as properties and allows methods to be expressed as commands through the CDI. There are many advantages to remaining in the unmanaged space, however, the system will also want to provide data driven support for managed objects, especially as managed code improves in performance, robustness and design stability.

Since the CAS encapsulates a lot of important functionality, it would be ill-advised to have a parallel managed implementation that does the same thing. The solution is to use managed metadata to create an ImgServerClassDescription in the unmanaged space and use it to populate and maintain a shadow unmanaged object.

Figure 16:
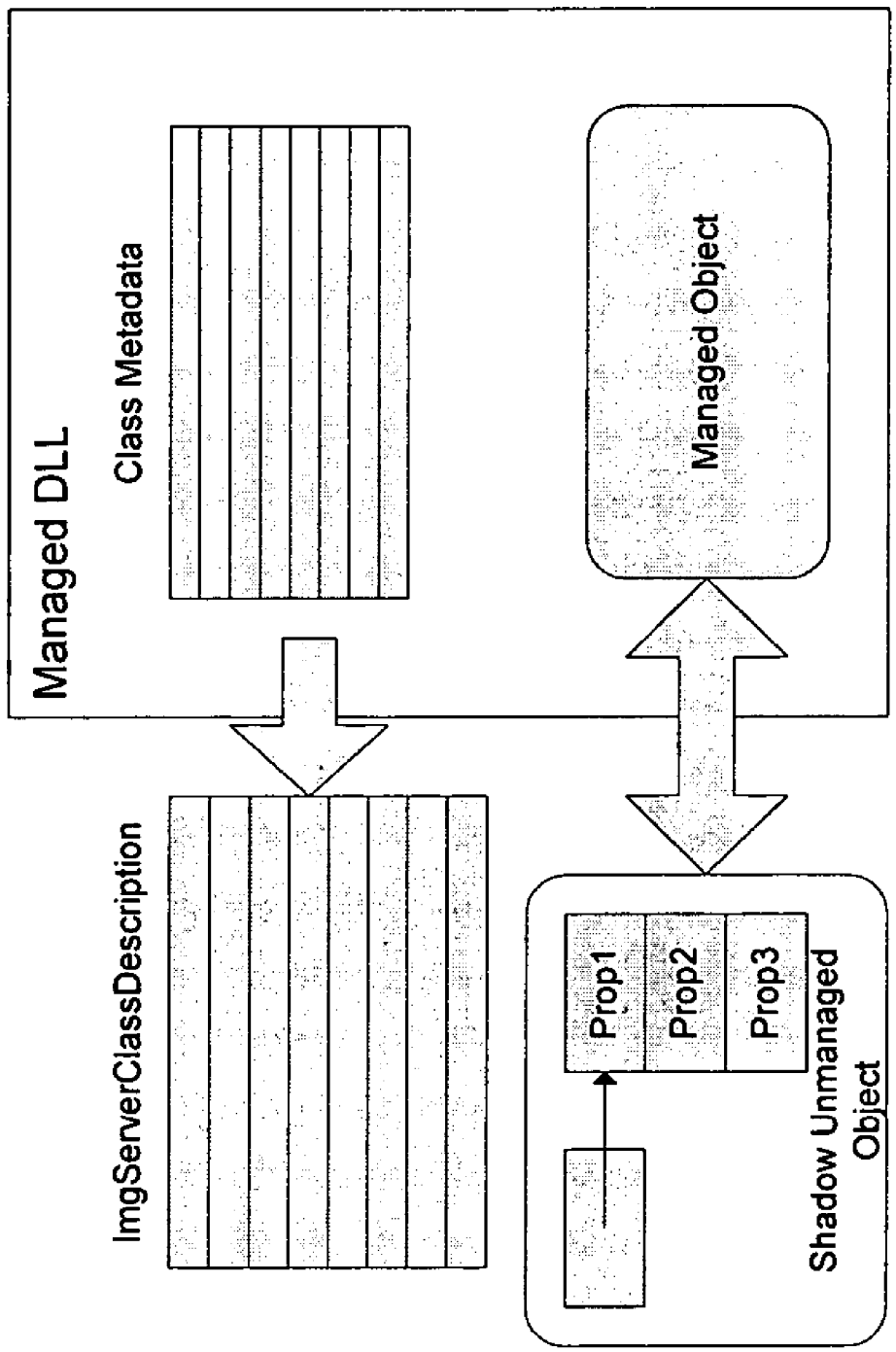
FIG. 16 is block diagram that illustrates interoperability of managed and unmanaged objects in accordance with one embodiment.

The solution, in accordance with one embodiment, is shown in FIG. 16. Here, the class meta-data from the managed object is mapped to an ImgServerClassDescription in the unmanaged space. This class description uses accessors that can manipulate a shadow unmanaged object. Each property in the unmanaged object can be indexed and will correspond to a property in the managed object. The managed object will use a change notification mechanism to propagate asynchronous changes to the shadow unmanaged object. Whenever a set occurs on the unmanaged object, the properties will first be applied to the managed object and then the state of the managed object will be replicated back to the unmanaged object. Commands with be directly mapped to method calls on the managed object.

The advantage of this mechanism is that the most common operations on an object, Gets and Queries, will be executed entirely on the unmanaged shadow object. In addition, the unmanaged shadow object can be stored by the unmanaged Persistent Object Collection Service and can be placed in the In Memory Collection. This also bypasses the slow reflection mechanisms that would otherwise be needed to perform a property get. Changes to the managed object can be constrained to one interop thunk per batch action. Since this occurs after the CAS, we cannot marshal the entire batch over before it is interpreted. This limitation should be offset by avoiding the managed path at all in the query and get cases.

Exemplary Client Device/Print Server Components

Figure 17:
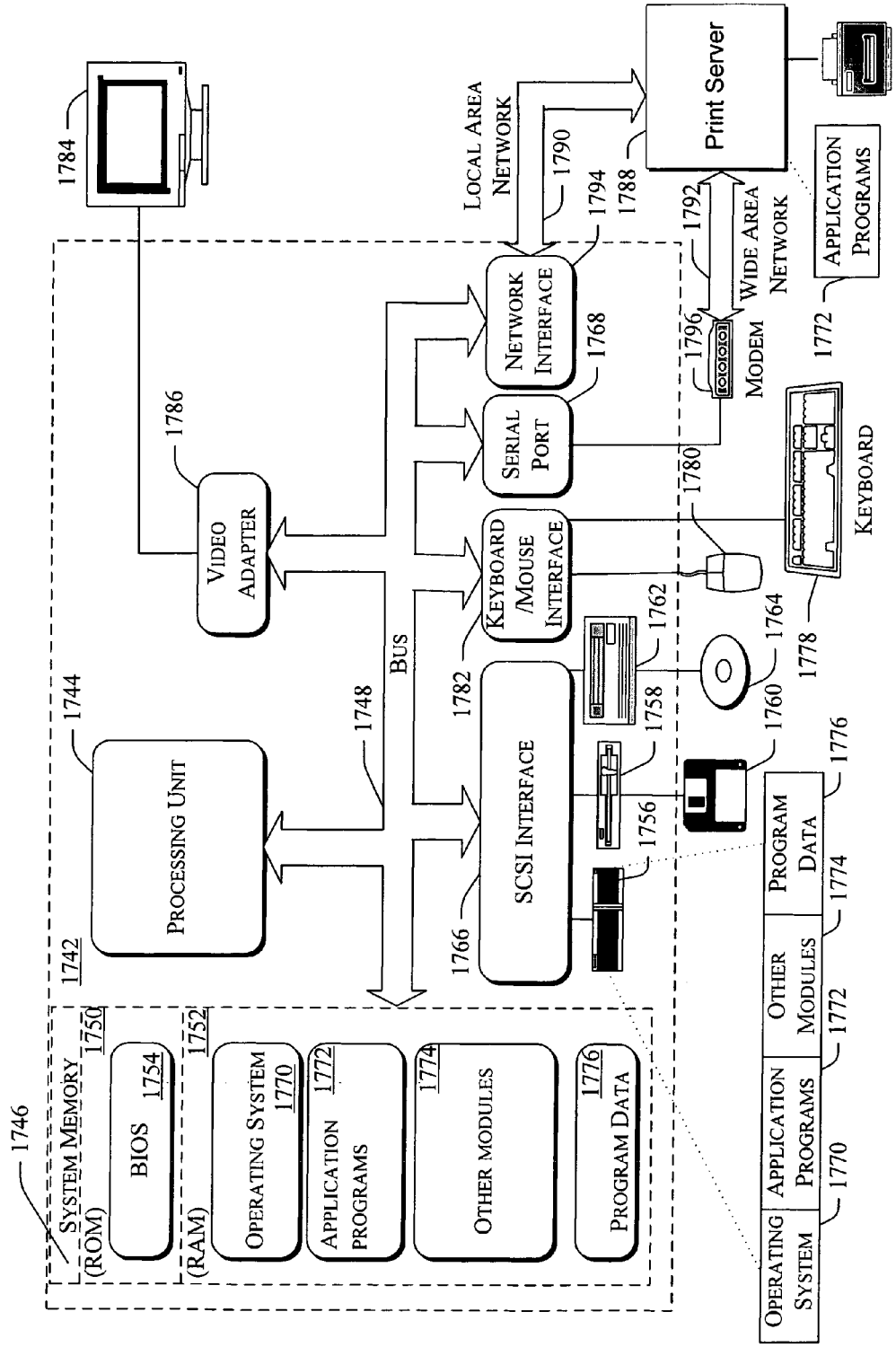
FIG. 17 is a block diagram that illustrates exemplary components of a computing device that can be utilized to implement one or more embodiments.

FIG. 17 shows an exemplary computing device having components that can be employed in both a client device and a print system to implement the embodiments described above.

Computing device 1742 comprises one or more processors or processing units 1744, a system memory 1746, and a bus 1748 that couples various system components including the system memory 1746 to processors 1744. The bus 1748 represents one or more of any of several types of bus structures, including a memory bus or memory controller, a peripheral bus, an accelerated graphics port, and a processor or local bus using any of a variety of bus architectures. The system memory 1746 comprises read only memory (ROM) 1750 and random access memory (RAM) 1752. A basic input/output system (BIOS) 1754, containing the basic routines that help to transfer information between elements within computing device 1742, such as during start-up, is stored in ROM 1750.

Computing device 1742 can further comprise a hard disk drive 1756 for reading from and writing to a hard disk (not shown), a magnetic disk drive 1758 for reading from and writing to a removable magnetic disk 1760, and an optical disk drive 1762 for reading from or writing to a removable optical disk 1764 such as a CD ROM or other optical media. The hard disk drive 1756, magnetic disk drive 1758, and optical disk drive 1762 are connected to the bus 1748 by an SCSI interface 1766 or some other appropriate interface. The drives and their associated computer-readable media provide nonvolatile storage of computer-readable instructions, data structures, program modules and other data for computer 1742. Although the exemplary environment described herein employs a hard disk, a removable magnetic disk 1760 and a removable optical disk 1764, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1756, magnetic disk 1760, optical disk 1764, ROM 1750, or RAM 1752, including an operating system 1770, one or more application programs 1772 (such as a user agent or browser), other program modules 1774, and program data 1776. A user may enter commands and information into computer 1742 through input devices such as a keyboard 1778 and a pointing device 1780. Other input devices (not shown) may comprise a microphone, joystick, game pad, satellite dish, scanner, or the like. These and other input devices are connected to the processing unit 1744 through an interface 1782 that is coupled to the bus 1748. A monitor 1784 or other type of display device is also connected to the bus 1748 via an interface, such as a video adapter 1786. In addition to the monitor, personal computers typically comprise other peripheral output devices (not shown) such as speakers and printers.

Computer 1742 commonly operates in a networked environment using logical connections to one or more remote computers, such as a print server 1788 which, in turn, is connected to one or more printers. The print server 1788 may be another personal computer, a server, a router, a network PC, a peer device or other common network node, and typically comprises many or all of the elements described above relative to computer 1742. The logical connections depicted in FIG. 17 comprise a local area network (LAN) 1790 and a wide area network (WAN) 1792. Such networking environments are commonplace in offices, enterprise-wide computer networks, intranets, and the Internet.

When used in a LAN networking environment, computer 1742 is connected to the local network through a network interface or adapter 1794. When used in a WAN networking environment, computer 1742 typically comprises a modem 1796 or other means for establishing communications over the wide area network 1792, such as the Internet. The modem 1796, which may be internal or external, is connected to the bus 1748 via a serial port interface 1768. In a networked environment, program modules depicted relative to the personal computer 1742, or portions thereof, may be stored in the remote memory storage device. It will be appreciated that the network connections shown are exemplary and other means of establishing a communications link between the computers may be used.

Generally, the data processors of computer 1742 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The various embodiments described above provide a pluggable architecture that can allow third party component writers to insert new classes easily into the system. A routing system is provided that allows data to be retrieved from multiple data providers. In addition, a name resolution pipeline resolves human supplied names to internal canonical names. Further, the various embodiments provide the ability for a client to precisely specify the data that it wants to retrieve from an object. An extremely efficient mechanism for retrieving data from an object uses optimized type maps. Once the type map has been built, no further string comparisons or searches need to be performed. A single pluggable interface is also provided that that can support any data. This means that as far as setup is concerned, there need be only one type of installable object. Other object types can be obtained from a factory object through the collection. This can be used, for example, to build the pipeline elements.

In addition, a set of services is provided that can allow any object in the system to easily support queries, support notifications-including filtered notifications, support caching and work scheduling.

The described embodiments can also provide the ability to tunnel over any protocol or transport that can handle a set of fundamental types through the access Adapters. Various embodiments also support the ability to provide collections of objects that are transported over down-level protocols, and to allow down-level (and up-level) protocols to be dynamically added to the system.

In addition, an asynchronous data interface is provided. This is important because synchronous interfaces choke the server whenever a large number of ultimately IO bound data writes occur. It also simplifies UI programming since a single UI thread can execute and not stall against the operations it is performing.

In addition, a batching interface allows arbitrary grouping of object commands, gets, sets, queries and notification requests. This is important because it enables clients to support operations such as deleting a collection of printers. It is also advantageous in that it allows the effects of network latency to be reduced. For example, when the UI wants to retrieve a number of properties about a particular queue, it can batch all of its requests in one message which results in one network round trip, rather than the many network round trips that are required if the data is retrieved sequentially.

Further, the various embodiments can provide an almost completely stateless interface, with the exception of notifications.

In addition, the programming model is simplified by making use of a collection of client objects. Once the objects are populated by a successful batch execution, all subsequent operations on the retrieved data are guaranteed to succeed since they are stored in the object state. The programming model also neatly makes the notification and query client semantics almost identical.

In addition, the CDI enables the following in subsequent iterations, or in certain collections. First, the CDI enables the ability to dynamically discover new data types through a standard type metadata system. It allows certain features such as generic debugging interfaces and data query interfaces. Second, since all collections have the same interface, they can easily be sandboxed in another process or App-domain. Third, since all collections have the same interface, it allows the system to put any collection in a maintenance mode and unload it by implementing a call counting shim. This is extremely usefull for setup when it upgrades an existing component. Fourth, transactional support can be added quite easily by allowing batches to also be transactional. Lastly, since all objects use the same interface, patterns such a decorators can be added easily to the system. This provides the potential to have the system be extended by third parties in a very flexible manner.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    providing, by a routing and service layer data interface of a print system, a generic data model supporting objects that have a set of properties and that support commands with a set of parameters;
    providing, by the routing and service layer data interface, asynchronous client dispatch which allows a client to begin a data request which immediately returns control to a client thread, wherein a result of the data request is interrupt driven by a network card at a device level;
    providing, by the routing and service layer data interface, asynchronous server dispatch in which a server can service requests from the client asynchronously;
    providing, by the routing and service layer data interface, batching in which the client builds up a batch of actions and sends the actions to the server as a unit; and
    providing, by the routing and service layer data interface, transactional invocation in which the batch of actions are assigned semantics requiring that the batch of actions must execute entirely or not change a state of the server, wherein the client is informed by the server through a callback, the callback enabling the client to retrieve the result of the data request from the server.

2. The method of claim 1, further comprising providing cancellation in which calls that are in progress on the server can be cancelled by the client at any time.

3. The method of claim 1, further comprising providing parallel invocation in which the batch of actions are assigned semantics enabling all items to execute in parallel.

4. The method of claim 1, further comprising providing interception in which components are inserted into the data interface that perform one or more of the following: monitor an associated system, synchronously respond to the associated system or modify the behavior of the associated system.

5. The method of claim 1, further comprising providing reflection through which properties that are supported by a given class of object are retrieved.

6. A print system comprising a routing and service layer data interface configured to provide:
    a generic data model supporting objects that have a set of properties and that support commands with a set of parameters;
    asynchronous client dispatch which allows a client to begin a data request which immediately returns control to a client thread, wherein a result of the data request is interrupt driven by a network card at a device level;
    asynchronous server dispatch in which a server can service requests from the client asynchronously;
    batching in which the client builds up a batch of actions and sends the actions to the server as a unit; and
    transactional invocation in which the batch of actions are assigned semantics requiring that the batch of actions must execute entirely or not change a state of the server, wherein the client is informed by the server through a callback, the callback enabling the client to retrieve the result of the data request from the server.

7. The print system of claim 6, wherein the routing and service layer data interface is configured to provide cancellation in which calls that are in progress on the server can be cancelled by the client at any time.

8. The print system of claim 6, wherein the routing and service layer data interface is configured to provide parallel invocation in which the batch of actions are assigned semantics enabling all items to execute in parallel.

9. The print system of claim 6, wherein the routing and service layer data interface is configured to provide interception in which components are inserted into the data interface that perform one or more of the following: monitor an associated system, synchronously respond to the associated system or modify the behavior of the associated system.

10. The print system of claim 6, wherein the routing and service layer data interface is configured to provide reflection through which properties that are supported by a given class of object are retrieved.

* * * * *